(12) United States Patent
Wettlaufer et al.

(10) Patent No.: US 12,543,892 B2
(45) Date of Patent: Feb. 10, 2026

(54) JUICING DEVICES WITH A REMOVABLE GRINDER ASSEMBLY

(71) Applicant: Goodnature Products, Inc., Buffalo, NY (US)

(72) Inventors: Eric Wettlaufer, Buffalo, NY (US); Dale Wettlaufer, Sarasota, FL (US); Thomas Heyden, Glenwood, NY (US)

(73) Assignee: Goodnature Products, Inc., Buffalo, NY (US)

( * ) Notice: Subject to any disclaimer, the term of this patent is extended or adjusted under 35 U.S.C. 154(b) by 0 days.

(21) Appl. No.: 18/517,680

(22) Filed: Nov. 22, 2023

(65) Prior Publication Data

US 2024/0349947 A1    Oct. 24, 2024

Related U.S. Application Data

(63) Continuation of application No. 16/880,758, filed on May 21, 2020, now Pat. No. 11,844,466.

(60) Provisional application No. 62/968,856, filed on Jan. 31, 2020, provisional application No. 62/899,507, filed on Sep. 12, 2019, provisional application No. 62/852,907, filed on May 24, 2019.

(51) Int. Cl.
| | |
|---|---|
| *A47J 43/07* | (2006.01) |
| *A47J 19/00* | (2006.01) |
| *A47J 43/044* | (2006.01) |

(52) U.S. Cl.
CPC ......... *A47J 43/0711* (2013.01); *A47J 43/044* (2013.01); *A47J 19/00* (2013.01)

(58) Field of Classification Search
CPC .. A47J 19/00; A47J 19/02; A47J 19/023–027; A47J 19/06
See application file for complete search history.

(56) References Cited

U.S. PATENT DOCUMENTS

| | | | | |
|---|---|---|---|---|
| 4,214,519 | A * | 7/1980 | Stollenwerk | B30B 9/067 100/37 |
| 5,207,152 | A * | 5/1993 | Wettlaufer | B30B 9/02 100/96 |
| 5,340,036 | A * | 8/1994 | Riley | B02C 18/12 241/56 |
| 7,337,996 | B2 * | 3/2008 | Hanson | B02C 18/062 241/46.013 |
| 7,950,601 | B2 * | 5/2011 | Watts | F04D 19/002 241/55 |
| 9,204,659 | B2 * | 12/2015 | Lee | A23G 9/22 |
| 10,645,966 | B2 * | 5/2020 | Wettlaufer | A47J 19/02 |
| 11,785,977 | B2 * | 10/2023 | Wettlaufer | B30B 9/06 206/557 |
| 11,844,466 | B2 * | 12/2023 | Wettlaufer | A47J 43/044 |
| 2006/0065133 | A1 * | 3/2006 | Moline | A47J 19/027 99/511 |
| 2008/0116305 | A1 * | 5/2008 | Hanson | E03C 1/2665 241/46.013 |

(Continued)

*Primary Examiner* — Adam J Eiseman
*Assistant Examiner* — Richard D Crosby, Jr.
(74) *Attorney, Agent, or Firm* — Hodgson Russ LLP

(57) ABSTRACT

Various juicing devices, systems, and methods are disclosed. The juicing device has a removable grinder assembly. The removable grinder assembly can be quickly and conveniently decoupled into individual components. The juicing device has a removable press chamber that can be quickly and conveniently removed from the juicing device.

4 Claims, 59 Drawing Sheets

(56) References Cited

U.S. PATENT DOCUMENTS

| | | | | |
|---|---|---|---|---|
| 2012/0037013 A1* | 2/2012 | Bertocchi | ................ | A23N 1/02 |
| | | | | 99/511 |
| 2013/0074708 A1* | 3/2013 | Asbury | ................ | A47J 19/025 |
| | | | | 99/513 |
| 2015/0257435 A1* | 9/2015 | Feinberg | ................ | A47J 19/025 |
| | | | | 99/510 |
| 2015/0359256 A1* | 12/2015 | Wettlaufer | .............. | B30B 9/045 |
| | | | | 206/557 |
| 2018/0084818 A1* | 3/2018 | Wettlaufer | .............. | B30B 9/045 |
| 2019/0159507 A1* | 5/2019 | Wettlaufer | .............. | A47J 19/06 |

* cited by examiner

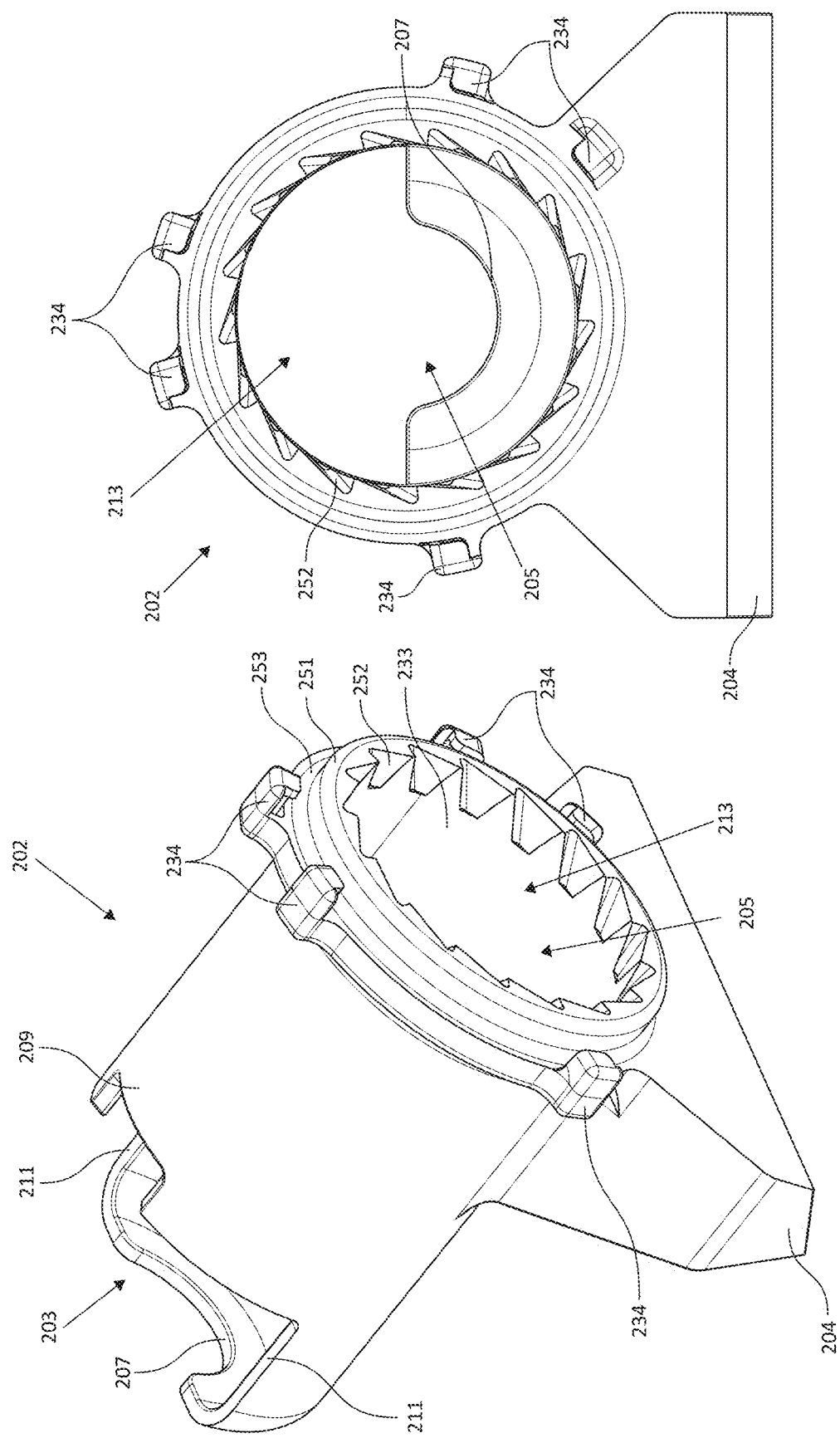

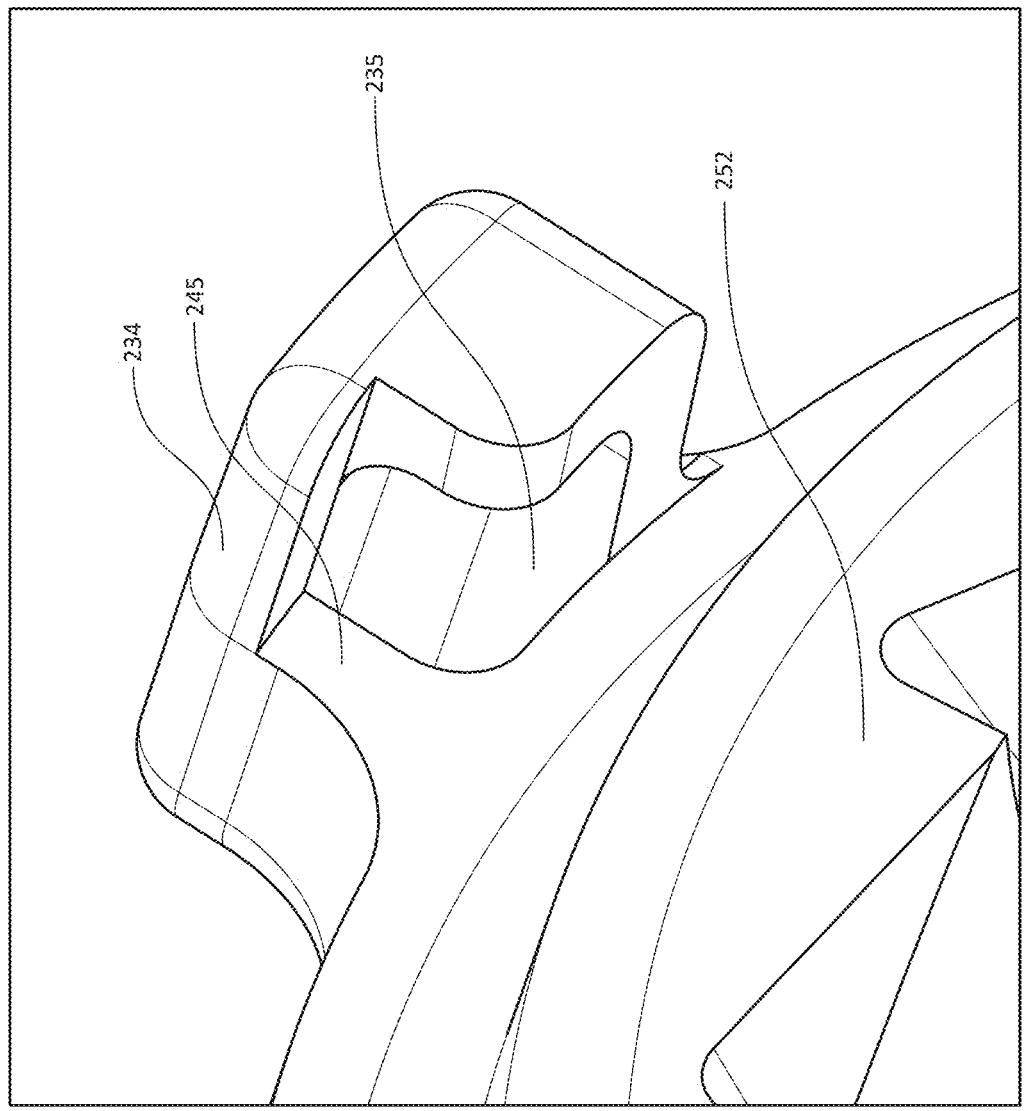

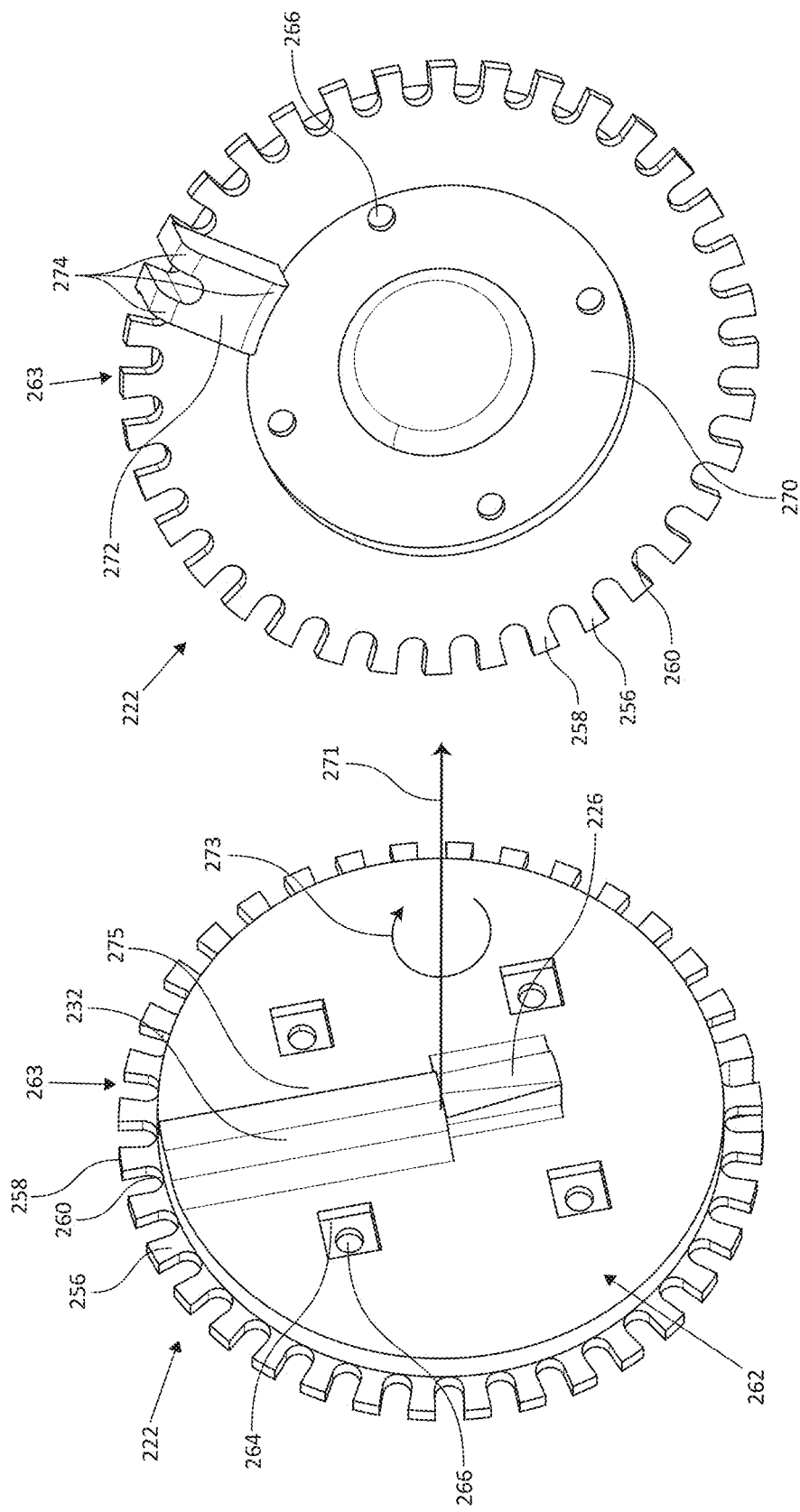

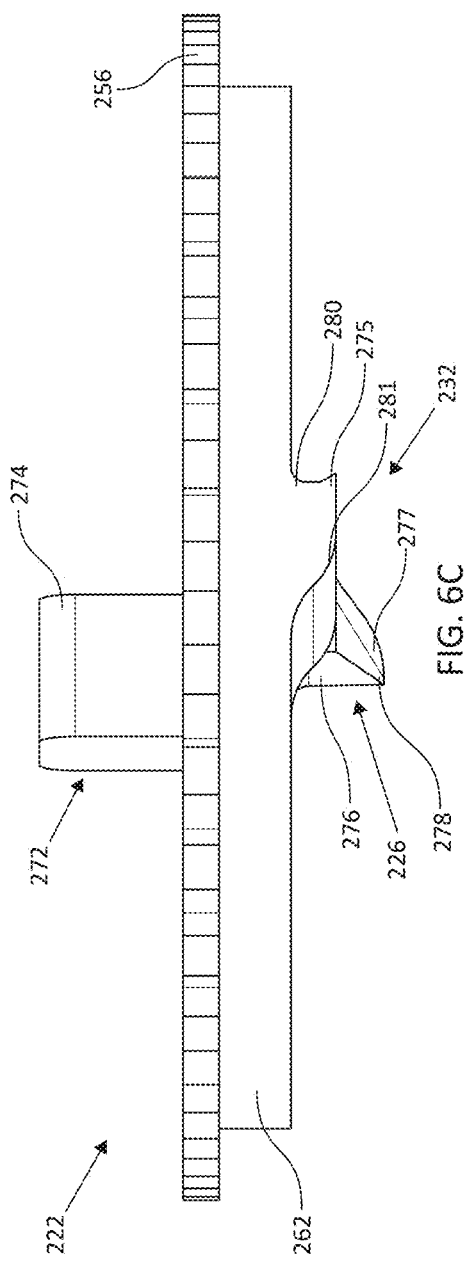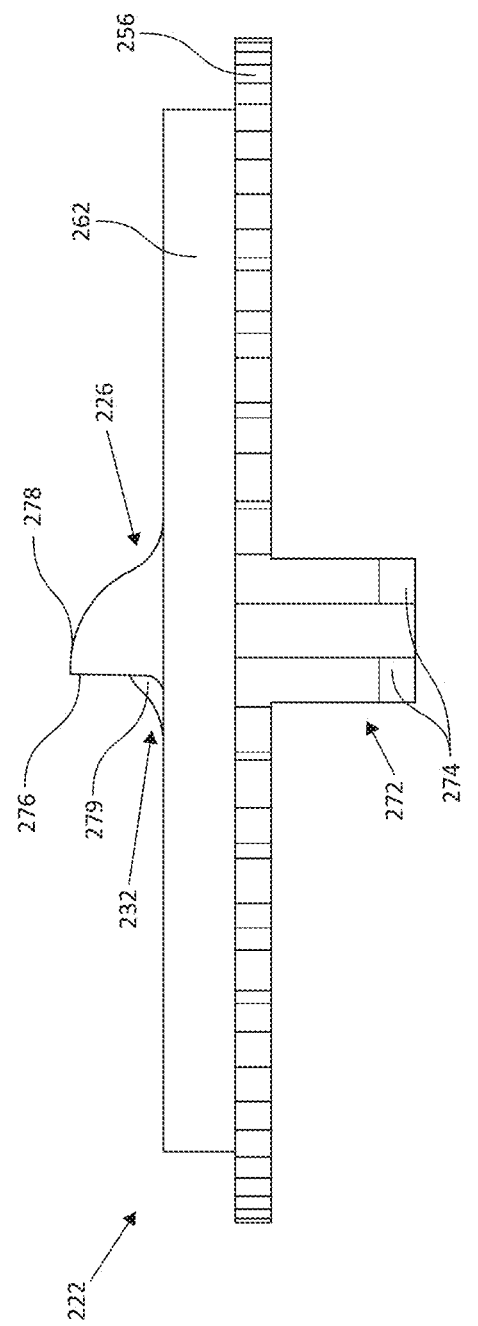

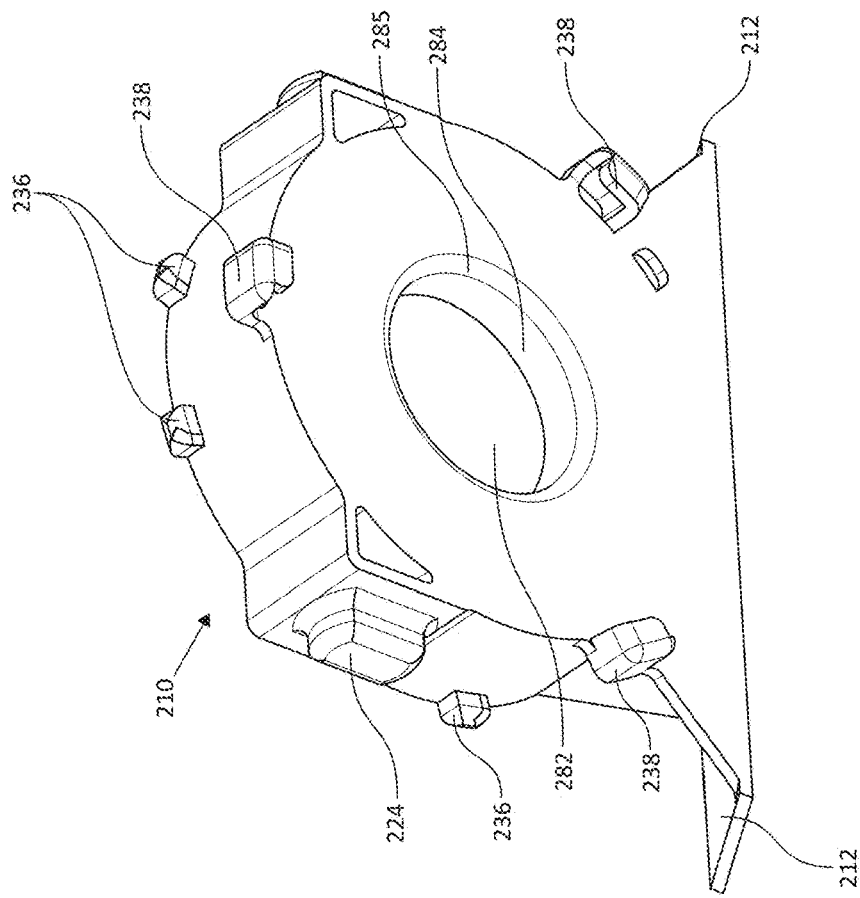
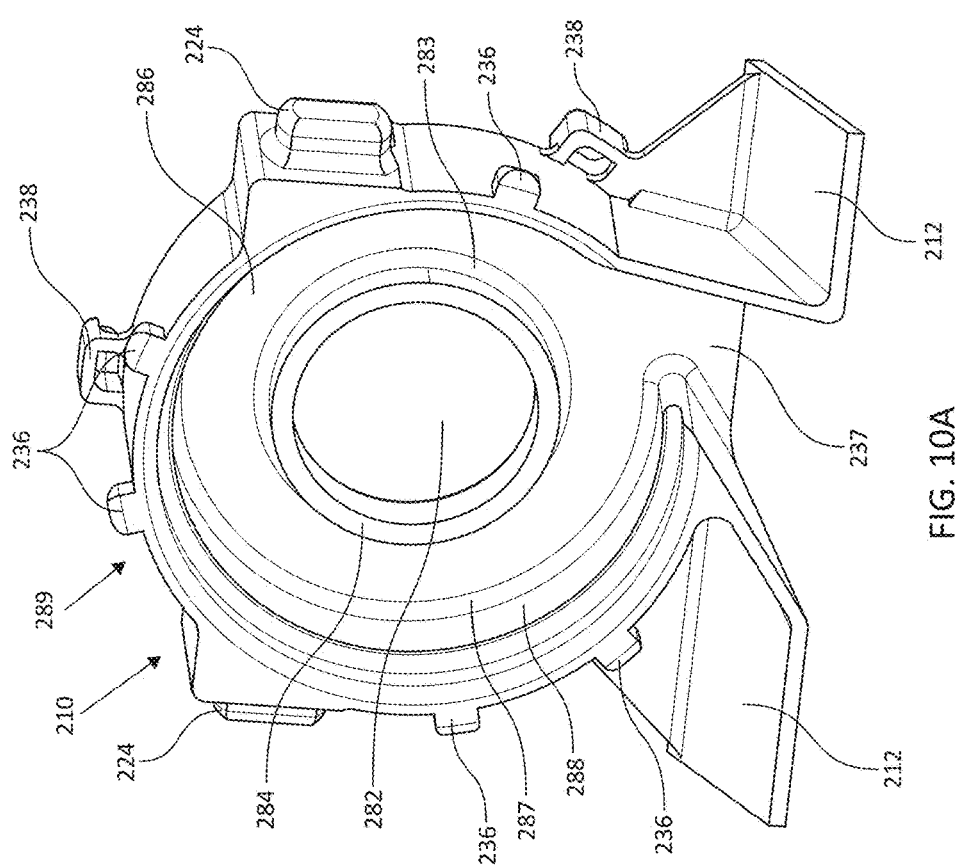
FIG. 10B
FIG. 10A

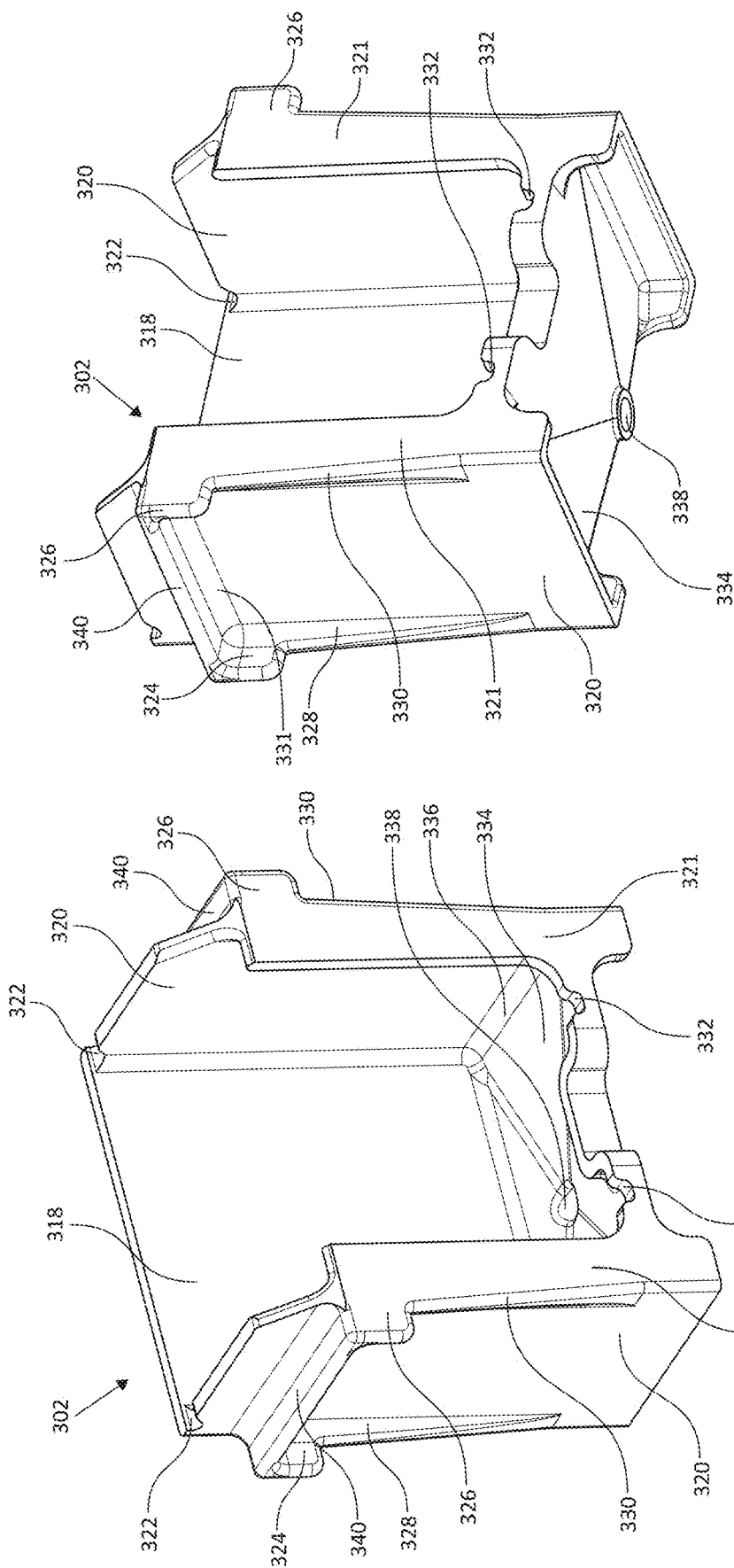

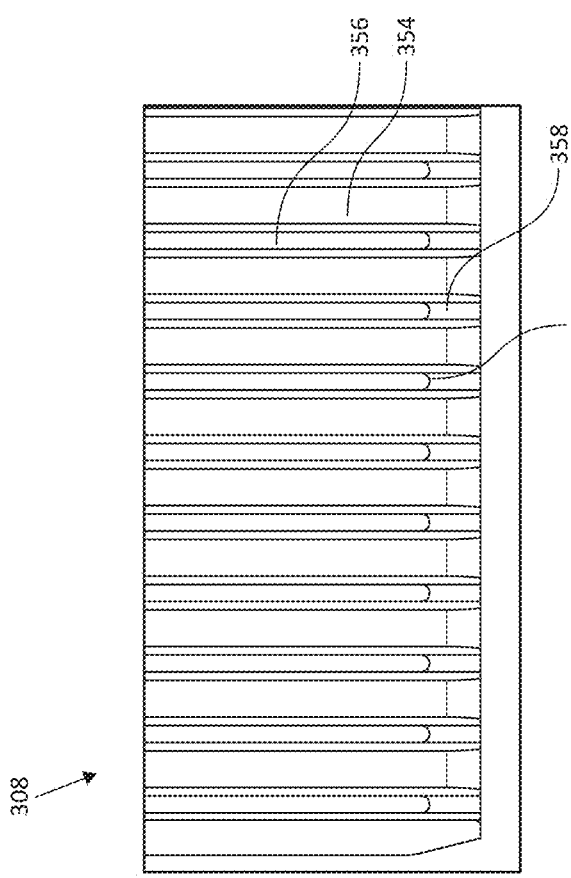
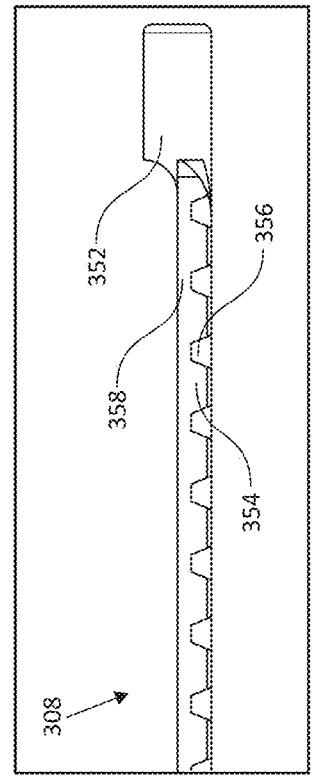
FIG. 17B
FIG. 17C
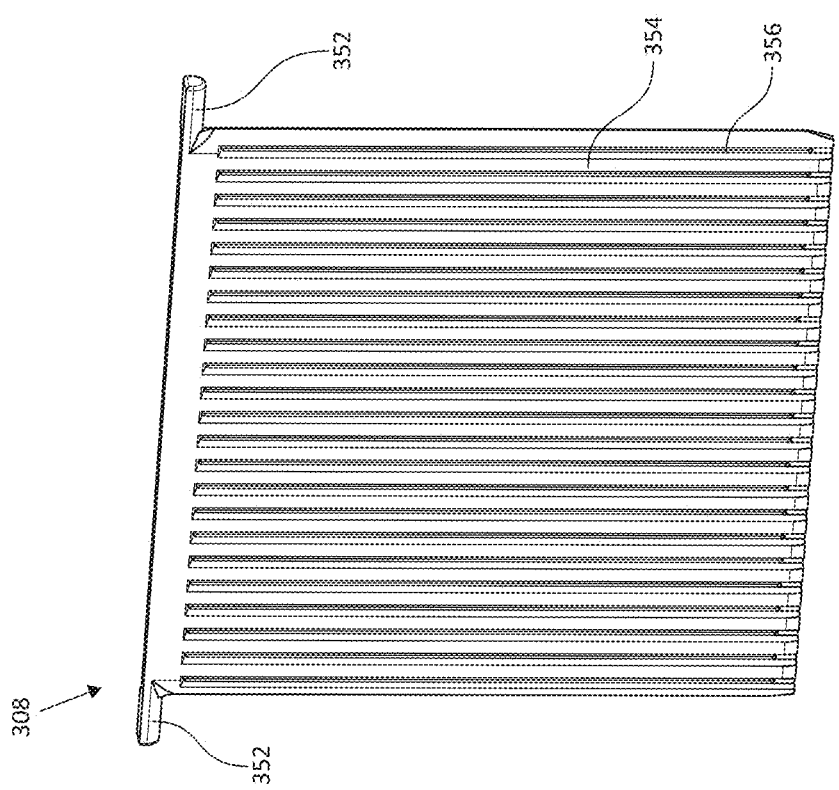
FIG. 17A

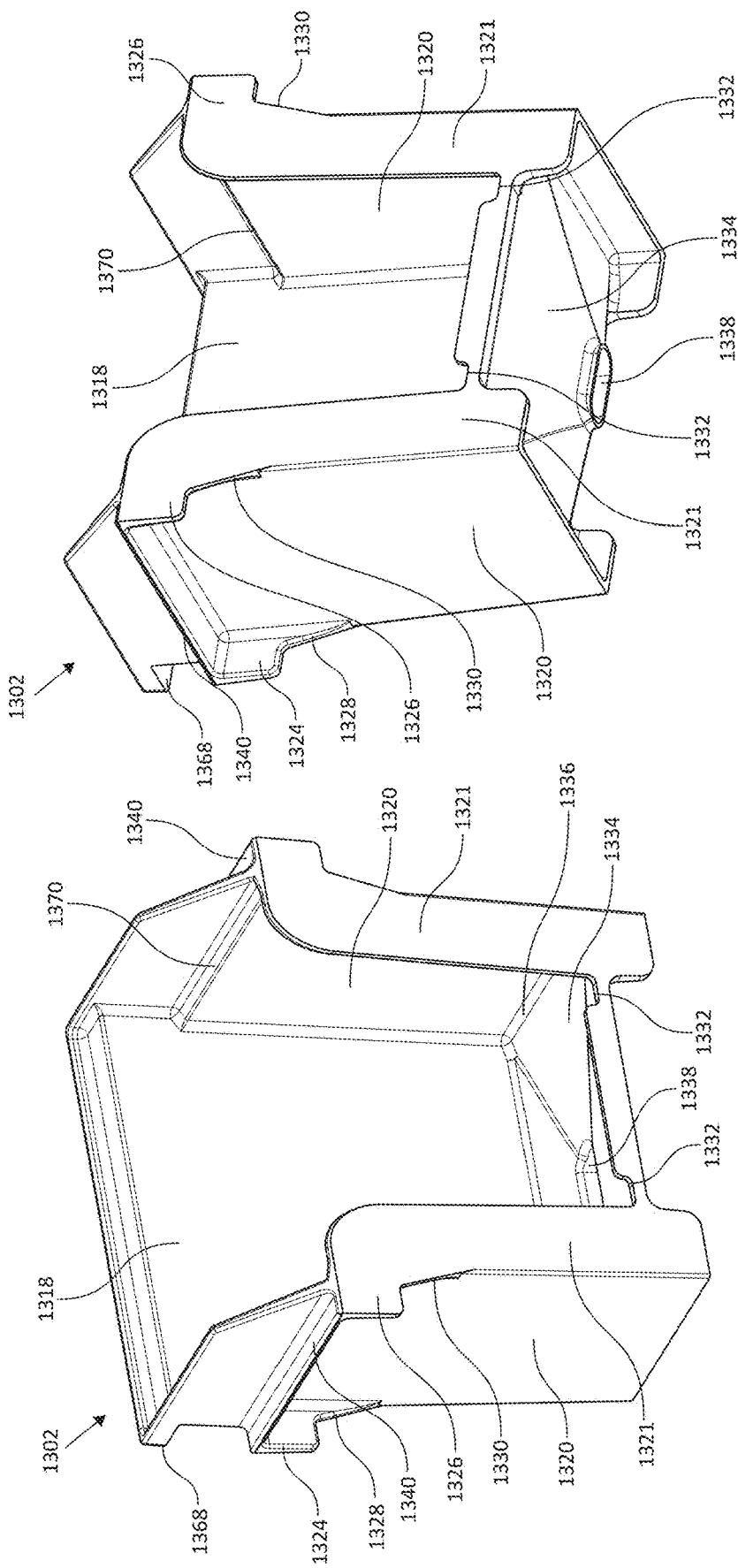

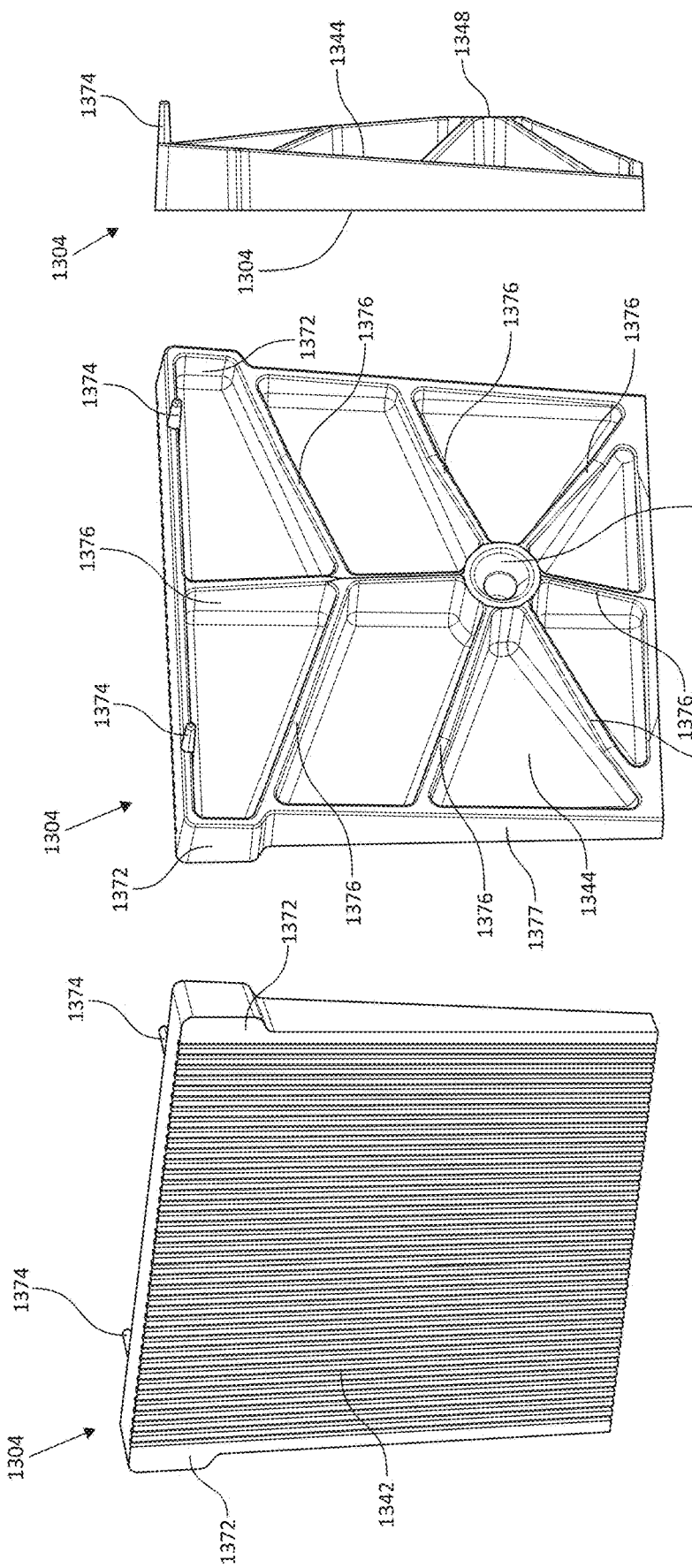

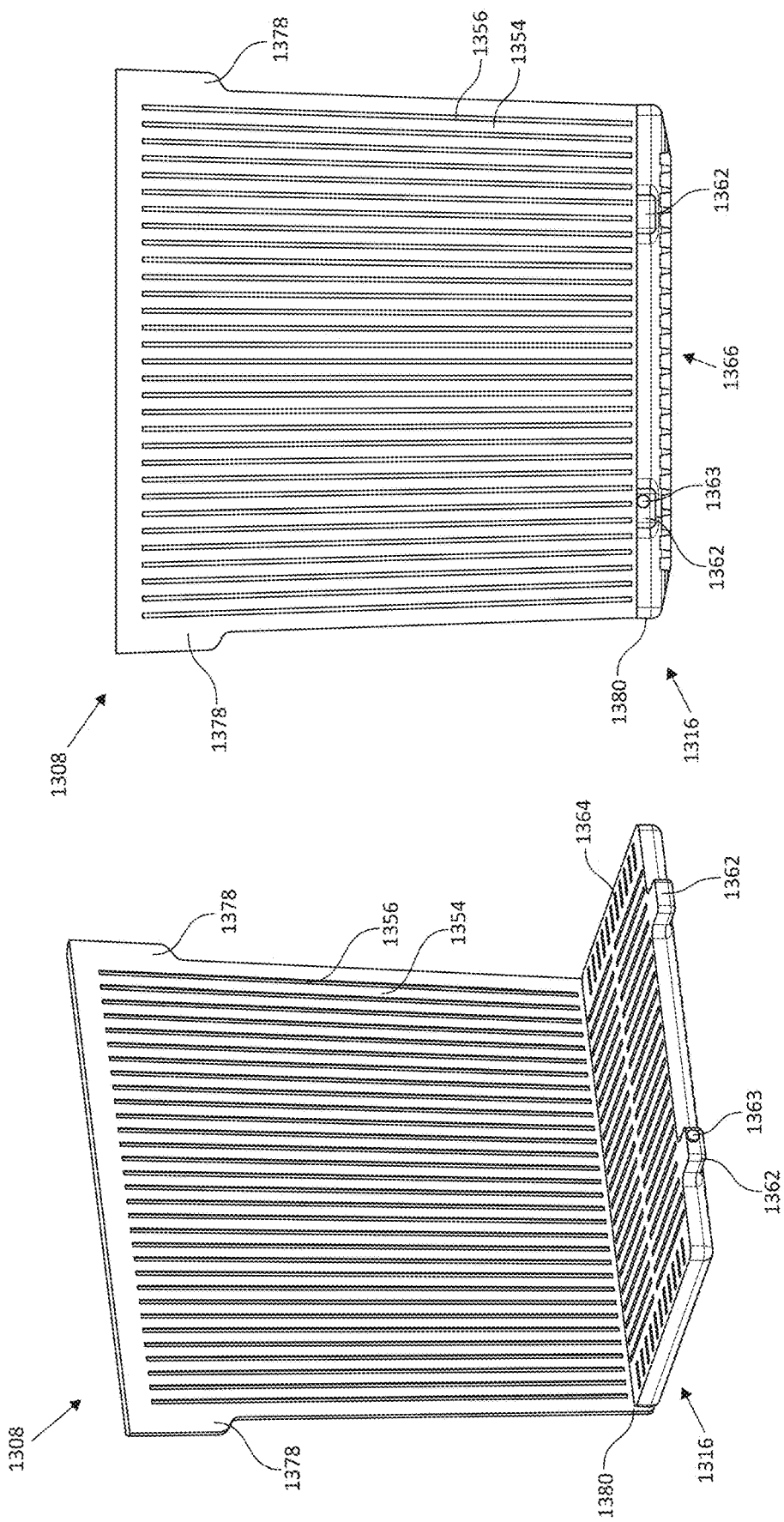

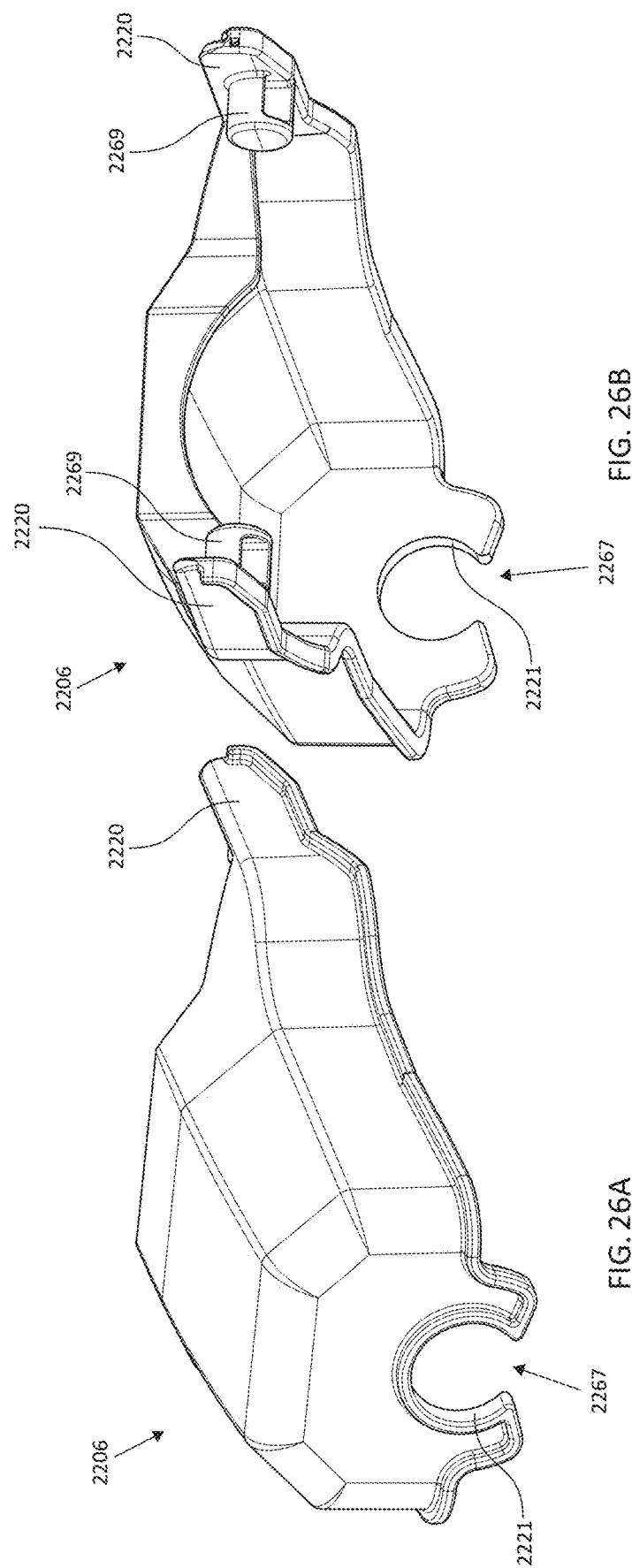

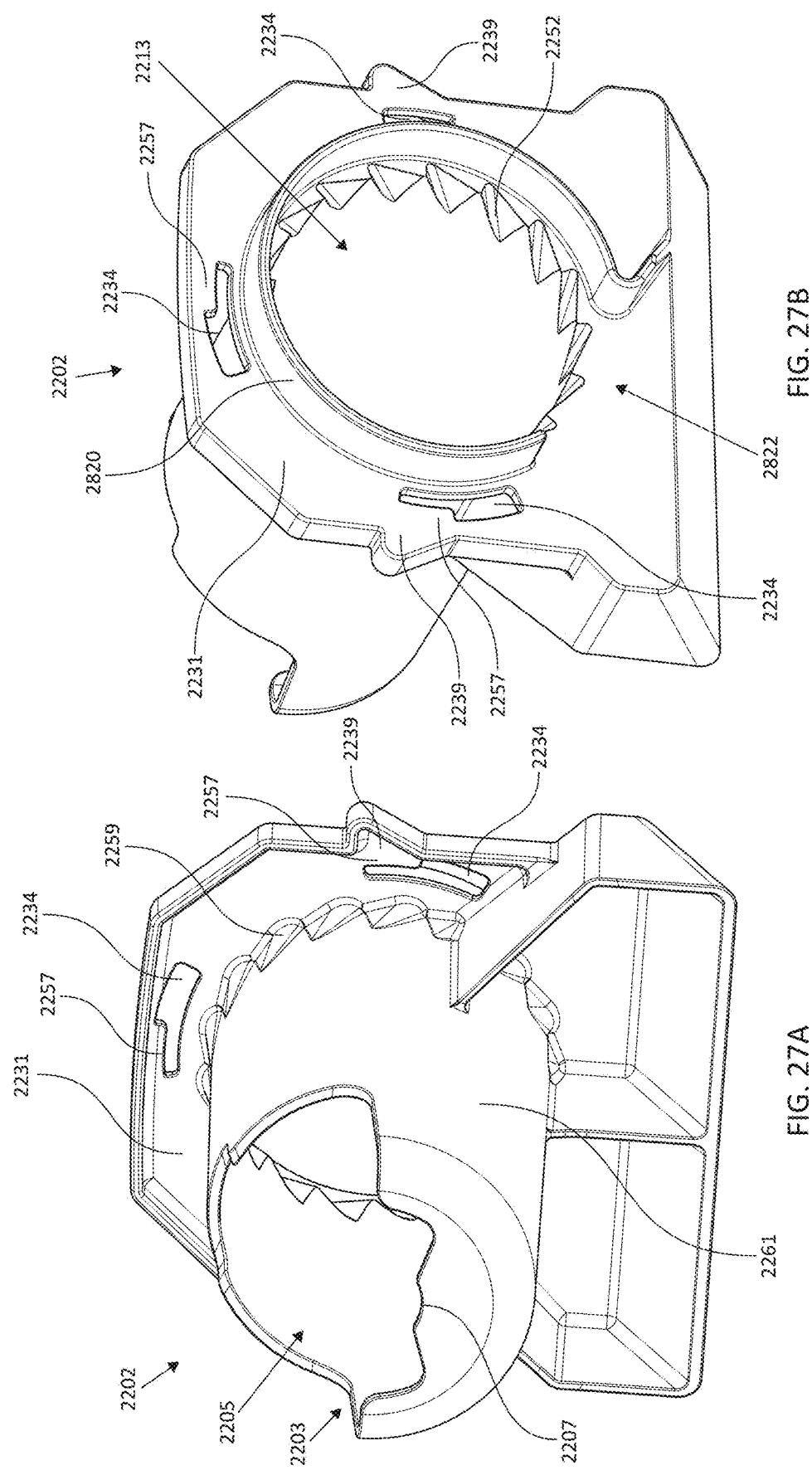

JUICING DEVICES WITH A REMOVABLE GRINDER ASSEMBLY

CROSS REFERENCE

This application is a continuation of U.S. application Ser. No. 16/880,758, filed May 21, 2020, which claims the priority benefit of U.S. Application No. 62/852,907, filed May 24, 2019, U.S. Application No. 62/899,507, filed Sep. 12, 2019, and U.S. Application No. 62/968,856, filed Jan. 31, 2020, all of which are hereby incorporated by reference in their entireties. All applications for which a foreign or domestic priority is identified in the Application Data Sheet as filed with the present application are hereby incorporated by reference under 37 CFR 1.57.

FIELD

This disclosure relates to juicing devices, such as cold press juicing devices with removable grinder assemblies and press chambers.

SUMMARY OF CERTAIN FEATURES

Juice is a natural way to provide not only a delicious beverage but also valuable nutrition to the human body. For example, juice can provide essential minerals, vitamins, and other beneficial compounds. Because different foods produce different kinds of juice, each with a unique flavor and nutritional profile, there is a demand for juice produced from an increasingly wide assortment of foods, such as fruits, spongy greens, hard root vegetables, and others. Indeed, consumers are increasingly demanding a diverse assortment of high-quality juices, preferably in single serving sizes (e.g., less than or equal to about 16 fluid ounces).

Some juicing devices have detrimental effects on juice quality or other drawbacks. For example, some juicing devices produce juice using centrifugal force by spinning pulp against a screen. However, centrifugally spinning the pulp against a screen, and other methods that shred and press at the same time, result in heating of the juice, aerating the juice, and/or introducing significant particulates in the juice. This decreases the quality of the juice and/or misses an opportunity for self-filtration. Other juicing devices are time-consuming, complicated to assemble, and/or difficult to clean. Still other juicing devices are inconveniently configured to produce large quantities of juice and/or require large quantities of food during juice production, such as more than would reasonably be used to produce a single serving of juice.

Furthermore, some juicing devices that rely on a screen, cloth, and/or similar device can retain food particulate or juice, which leaves residual color and flavor in the juicing device. Some juicing devices can have holes, slots, crevices, corners, and/or anchor points onto which food fibers, particulates, and/or juices are retained which can result in the same residual color and flavor issues or even health concerns. This residual flavor and/or color can be problematic as the juicing device is required to produce a variety of different juices that are expected to have a specific flavor and/or color. Accordingly, the juicing device must be cleaned to remove the residual color and/or flavor. Removing the residual color and/or flavor can take significant time as significant scrubbing, washing, and/or caustic may be needed, which can be costly and inconvenient at a busy juice bar or other setting.

Many juicing devices are not well suited for use with a variety of foods, which each bring unique demands and challenges. For example, hard root vegetables, like carrots and beets, are used in juicing and put a very high load on the juicing device, causing juicing devices to overheat, jam, and/or grind so inefficiently that little juice is extracted. Certain heterogeneous fibrous foods, like ginger or celery, contain long fibers that tend to snag on holes, slots, crevices, corners, and/or anchor points. Some juicing devices utilize a cheese grater style blade that fiber hooks onto and lays over the cutting edges of the blade holes. This can blunt the blades and inhibit the movement of food through the blade holes. Fleshy and fragile produce, such as cucumber, watermelon, and apples, can deteriorate, separate out in juice, froth, and/or introduce foam if over processed. Spongy leafy greens, like kale, can be squished down into a tough but flexible mass that will skim over teeth or blades such that the kale will continue to build up inside a juicer until the juicing device jams. Leafy greens can also have a low specific density compared to other foods. Unlike foods with higher specific densities (e.g., apples), a juicing device may be unable to use the inertia of the leafy greens to move the leafy greens around the grinder, which can inhibit proper processing of the leafy greens.

Various juicing devices are disclosed herein that address one or more of the problems detailed above, or other problems.

Certain implementations of the juicing devices disclosed herein can produce single serving juices (e.g., less than or equal to about 16 fluid ounces) cleanly, easily, and at a high quality. The juicing devices disclosed herein can employ a cold pressing method. The resulting juice can be smooth, nutritionally dense and close in color and flavor to the food from which the juice was extracted. The food can be cleaned, such as before being loaded into the juicing device. The food can be shredded and pressed in separate mechanisms, resulting in a high-quality juice.

The juicing devices disclosed herein can employ a disposable filter, such as a screen, cloth, or similar device. The filter can be separate from (e.g., readily removable from and/or not permanently attached to) the juicing device and/or can be readily replaceable. The disposable filter can reduce or eliminate issues with residual color and/or flavor from previous pressings. The disposable filter can be single use, eliminating the need to wash and sanitize bags altogether.

Certain implementations of the juicing devices disclosed herein can enable "self-filtration" of the juice. In self-filtration, fibers of the food from which juice is being extracted form a network of fibers that act as a filter for juice passing though the network. This can provide an initial and/or additional filter compared to any filters of the juicing device itself. The juicing device of the present disclosure can be configured to promote the formation of such a network and/or to maintain the network (e.g., by substantially not disturbing the network) during processing. This can enable the network to filter juice being extracted from the food material during the pressing operation. This is in contrast to other methods, such as centrifugal spinning with a screen, which can inhibit the network from forming and/or disturb the network and thus fail to benefit from self-filtration.

The juicing devices disclosed herein can be free or substantially free of features upon which food fibers, particulates, and/or juice can be retained or stuck. For example, in some embodiments, during operation of the juicing device to process a commercially reasonable amount of ginger for at least a single serving of juice, substantially no ginger fibers stick to or wrap around a cutting mechanism and/or other feature of the device.

In several implementations, even when cleaning is necessary, all components of the juicing devices that contact food and/or juice are easily removable. This can facilitate transporting the components to a cleaning area, such as a sink. In certain variants, the grinder assembly, while still assembled as a sub-assembly, can be removed from the juicing device as one unit and/or transported (e.g., to a cleaning area for cleaning) separately from the rest of the juicing device. This can reduce or eliminate the need to disassemble the entire grinder assembly to its components.

In some variants, the grinder assembly can quickly and efficiently be decoupled, which can enable washing of individual pieces separately. In some embodiments, the juicing devices disclosed herein shred and press in a closed process, which can reduce the mess that is frequently created when using other juicing devices.

In some embodiments, the juicing devices disclosed herein can effectively process a wide variety of foods (such as the foods detailed above). For example, some embodiments have a grinder assembly that is configured with teeth, and/or a motor with enough speed and power, to enable the processing of large chunks of root vegetables.

In some embodiments, the juicing devices are free from holes, slots, crevices, corners, and/or anchor points in the pathway of the processed food. The juicing devices can provide a path out of the juicing device.

In some embodiments, the juicing devices are configured to grind the food material slowly enough, and/or have large enough components and/or be configured to be gentle enough, to preserve fragile produce.

In some embodiments, the juicing devices have no shoulders under which fibers and particulate can build up (e.g., in the pathway of the food in the device).

In some embodiments, the juicing devices are configured to mechanically clear an infeed or outfeed section and/or to not rely on gravity or centrifugal force to clear the infeed or outfeed.

In some variants, a device for grinding food is disclosed herein. The device can include a hopper having an inner cavity. The inner cavity can be defined, at least in part, by an inner surface. A plurality of cutting implements (e.g., fixed teeth) can be formed into (e.g., molded with) the inner surface. In some embodiments, the plurality of fixed teeth circumferentially surround a portion of the inner cavity.

The device can include a grinder plate. The grinder plate can be movable (e.g., rotatable) relative to the hopper. The grinder plate can have a plurality of cutting implements, such as teeth. A gap can be present between the plurality of teeth of the grinder plate and the plurality of fixed teeth of the hopper. The device can include a motor unit that can drive the grinder plate about an axis of rotation. The grinder plate can be removably coupled to the motor unit when the motor unit is not driving the grinder plate about the axis of rotation. The grinder plate can be fixedly coupled to the motor unit when the motor unit is driving the grinder plate about the axis of rotation.

In some variants, the device can include a drive grip coupled to the grinder plate. The drive grip can have a receiving region and a plurality of grip protrusions circumferentially distributed around the receiving region. The device can include a drive tip that can fixedly couple to a drive shaft of the motor unit. The drive tip can have a plurality of drive protrusions circumferentially positioned about the drive tip. The drive tip can be inserted into the receiving region of the drive grip such that the plurality of drive protrusions of the drive grip extend into gaps between adjacent grip protrusions of the drive grip. The plurality of drive protrusions can engage with the grip protrusions as the motor unit drives the grinder plate about the axis of rotation inhibiting the grinder plate from being decoupled from the motor unit.

In some variants, the plurality of grip protrusions and the plurality of drive protrusions can be rounded such that the drive protrusions can be guided into the gaps between adjacent grip protrusions as the drive tip is inserted into the receiving region of the drive grip.

In some variants, the receiving region can be defined, at least in part, by an annular structure.

In some variants, the device can include a grinder housing that can have a bottom wall with an opening and sidewalls having a gap defining a food exit ramp. The bottom wall can be spaced below the plurality of grinder teeth and the grinder plate such that food passing through the hopper and by the grinder plate can fall toward the bottom wall.

In some variants, the device can include a press chamber that can have a press box with a bottom box wall, opposing box side walls, and front box wall. The bottom box wall can have a drain that can direct fluid out of the press chamber.

In some variants, the grinder plate can have an upper portion and a lower portion. The upper portion can extend partially into the inner cavity and the lower portion can have the plurality of teeth.

In some variants, the upper portion can have a diameter that is smaller than a diameter of the lower portion. The upper portion can have a height that is larger than a height of the lower portion.

In some variants, the device can have a pusher that can extend into the inner cavity of the hopper. The pusher can have a handle and a helical face that can engage with food in the hopper.

In some variants, the grinder plate can have a lopper with a cutting edge. The cutting edge can face the direction of rotation of the grinder plate.

In some variants, the grinder plate can have a wiper positioned on a lower portion of the grinder plate.

In some variants, the hopper can have a wall extending therefrom that can at least partially surround the lower portion of the grinder plate. The wall can include cutting ledges disposed on an inner surface of the wall. The wiper can push food against the cutting ledges.

In some variants, the at least one tooth of the fixed teeth of the hopper can include a projection that divides the at least one tooth.

In some variants, a device for grinding food is disclosed herein. The device can include a chute that can have a ring of fixed teeth. The device can include a grinder plate that can be rotatable relative to the fixed teeth. The grinder plate can have an upper portion and a lower portion. The upper portion can extend into the chute and the lower portion can have a plurality of teeth. A gap can be present between the plurality of teeth of the grinder plate and the plurality of fixed teeth of the chute. The device can include a coupling structure, such as an annular structure. The annular structure can be coupled to the lower portion of the grinder plate. The annular structure can have an internal surface with internal protrusions circumferentially distributed thereon. The device can include a drive cap coupled to a motor unit. The motor unit can drive the grinder plate, such as about an axis of rotation. The drive cap can have a body (e.g., a cylindrical body) with first mating features (e.g., external protrusions) circumferentially distributed thereon. The drive cap can be mated with the annular structure, such as by being inserted into a tube of the annular structure. The first mating features can engage with the second mating features (e.g., internal protrusions). This can retain the annular structure on the drive cap as the motor unit drives the grinder plate about the axis of rotation. The annular structure can be removed from the drive cap as the motor unit does not drive the grinder plate about the axis of rotation.

In some variants, a wall of the chute can include the fixed teeth.

In some variants, the device can include a grinder housing having a bottom wall with an opening and sidewalls having a gap defining a food exit ramp. The bottom wall can be spaced below the plurality of grinder teeth and the grinder plate.

In some variants, the chute can releasably couple to the grinder housing. In some variants, the motor unit only drives the grinder plate about the axis of rotation with the chute coupled to the grinder plate.

In some variants, a magnetic switch can detect if the chute is coupled to the grinder housing.

In some variants, the grinder housing can releasably couple to the motor unit. In some variants, the motor unit only drives the grinder plate about the axis of rotation with the grinder housing coupled to the motor unit.

In some variants, a magnetic switch can detect if the grinder housing is coupled to the motor unit.

In some variants, the device can include a press chamber that can have a press box with a bottom box wall, opposing box side walls, front box wall, and rear retaining tabs. The bottom box wall can have an opening that can direct fluid out of the press chamber.

In some variants, the device can include a drip tray that can be positioned under the drain of the bottom box wall. The drip tray can partially cover a pair of support legs and housing of the device.

In some variants, the device can include a pusher that can extend into the chute. The pusher can have a handle and a helical face that can engage with food in the chute.

In some variants, the grinder plate can have an agitator with an apex. The agitator can deflect food radially outward from the apex.

In some variants, the grinder plate can have a lopper with a cutting edge. The cutting edge can face the direction of rotation of the grinder plate.

In some variants, the grinder plate can have a wiper positioned on a lower portion of the grinder plate.

In some variants, the chute can have a wall extending therefrom that can at least partially surround the lower portion of the grinder plate. The wall can include cutting ledges disposed on an inner surface of the wall. The wiper can push food against the cutting ledges.

In some variants, the at least one tooth of the fixed teeth of the chute can include a projection that divides the at least one tooth.

In some variants, a device for pressing food is disclosed herein. The device can include a press box with a bottom box wall, opposing box side walls, and front box wall. The press box can receive ground food material from a device for grinding food. The movable platen can be displaced toward the front box wall to press food material therebetween. The movable platen can include a drip shield that can catch food material flowing from the device for grinding food as the movable platen is displaced toward the front box wall.

In some variants, the drip shield can be oriented substantially perpendicular relative to a front face of the movable platen.

In some variants, the drip shield can prevent food material from falling onto a piston that can displace the movable platen.

In some variants, the front face of the movable platen can include elongate grooves that can direct fluid pressed from the food material toward the bottom box wall.

In some variants, the bottom box wall can include surfaces that can direct fluid pressed from the food material toward a drain.

In some variants, the device can include a front comb disposed between the front box wall and the moveable platen.

In some variants, the front comb can include a plurality of elongate fluid passages that can direct fluid pressed from the food material toward the bottom box wall.

In some variants, the device can include a bottom comb that can be supported by the bottom box wall. The front comb and bottom comb can be coupled at a hinge.

In some variants, the bottom comb can include a plurality of fluid passages that can allow fluid pressed from the food material to pass through the bottom comb.

In some variants, the device can include a bottom comb that can be supported by the bottom box wall. The bottom comb can include at least one tab that can mate with a notch disposed in the press box to aid a user in properly orienting the bottom comb in the press box.

In some variants, the press box can include one or more retaining flanges disposed opposite the front box wall that can help retain the movable platen within the press box.

Neither the preceding summary nor the following detailed description purports to limit or define the scope of protection. The scope of protection is defined by the claims.

BRIEF DESCRIPTION OF THE DRAWINGS

The abovementioned and other features of the embodiments disclosed herein are described below with reference to the drawings of the embodiments. The illustrated embodiments are intended to illustrate, but not to limit, the scope of protection. Various features of the different disclosed embodiments can be combined to form further embodiments, which are part of this disclosure.

FIGS. 5A-5C illustrate various views of an example hopper or chute.

FIGS. 6A-6D illustrate various views of an example grinder plate.

FIGS. 10A-10D illustrate various views of an example grinder housing.

FIGS. 15A and 15B illustrate various views of an example press box.

FIGS. 17A-17C illustrate various views of a front comb.

FIGS. 20A and 20B illustrate various views of an example press box.

FIGS. 21A-21C illustrate various views of a movable platen.

FIGS. 22A-22C illustrate various views of front and bottom combs.

FIGS. 26A and 26B illustrate various views of the cover of FIGS. 25B and 25C.

FIGS. 27A and 27B illustrate various view of another example hopper.

DETAILED DESCRIPTION OF CERTAIN EMBODIMENTS

Although certain embodiments and examples are described below, this disclosure extends beyond the specifically disclosed embodiments and/or uses and obvious modifications and equivalents thereof. Thus, it is intended that the scope of this disclosure should not be limited by any particular embodiments described below.

Figure 1A:
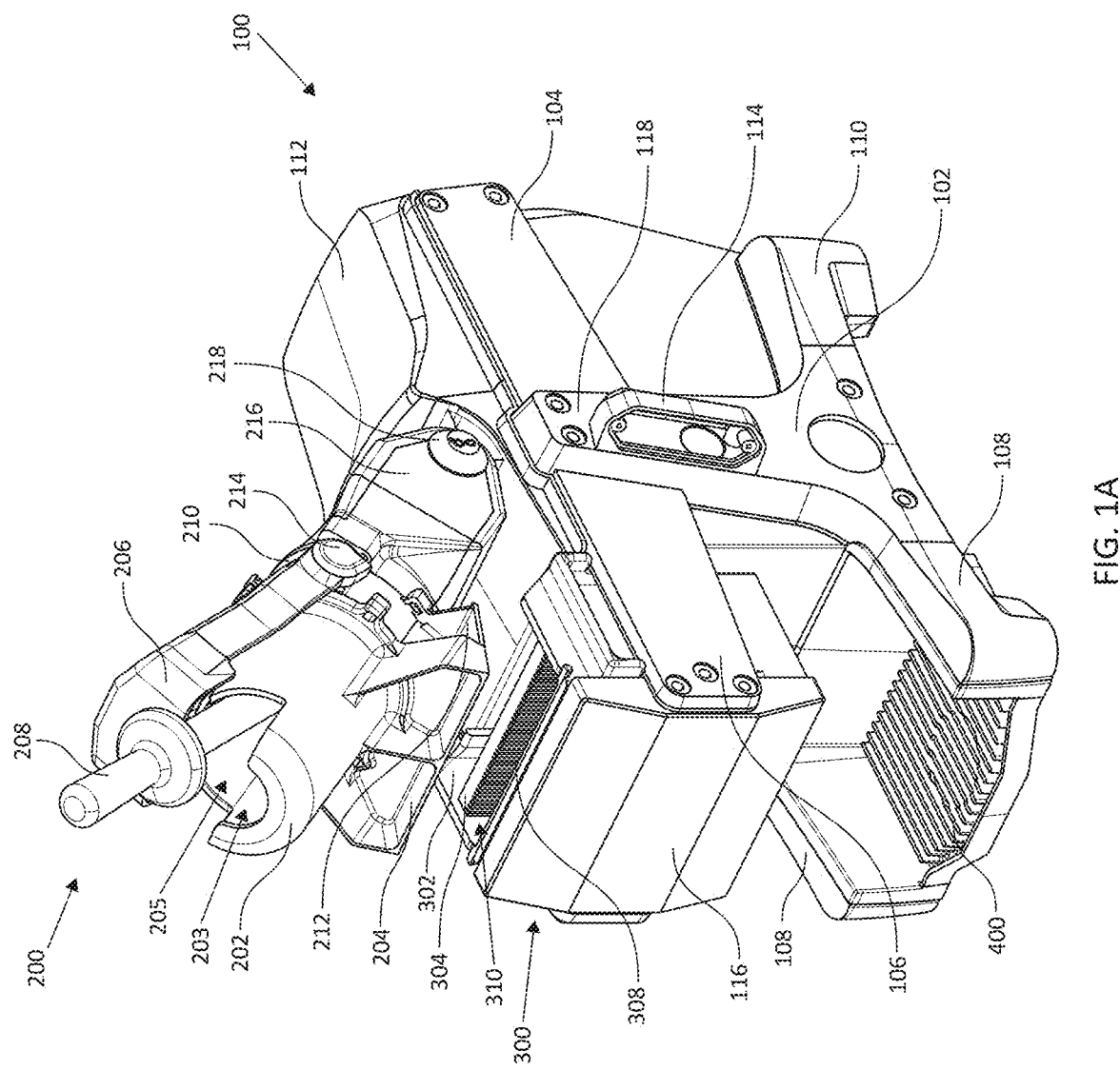
FIGS. 1A and 1B illustrate various views of a juicing device.
Figure 1B:
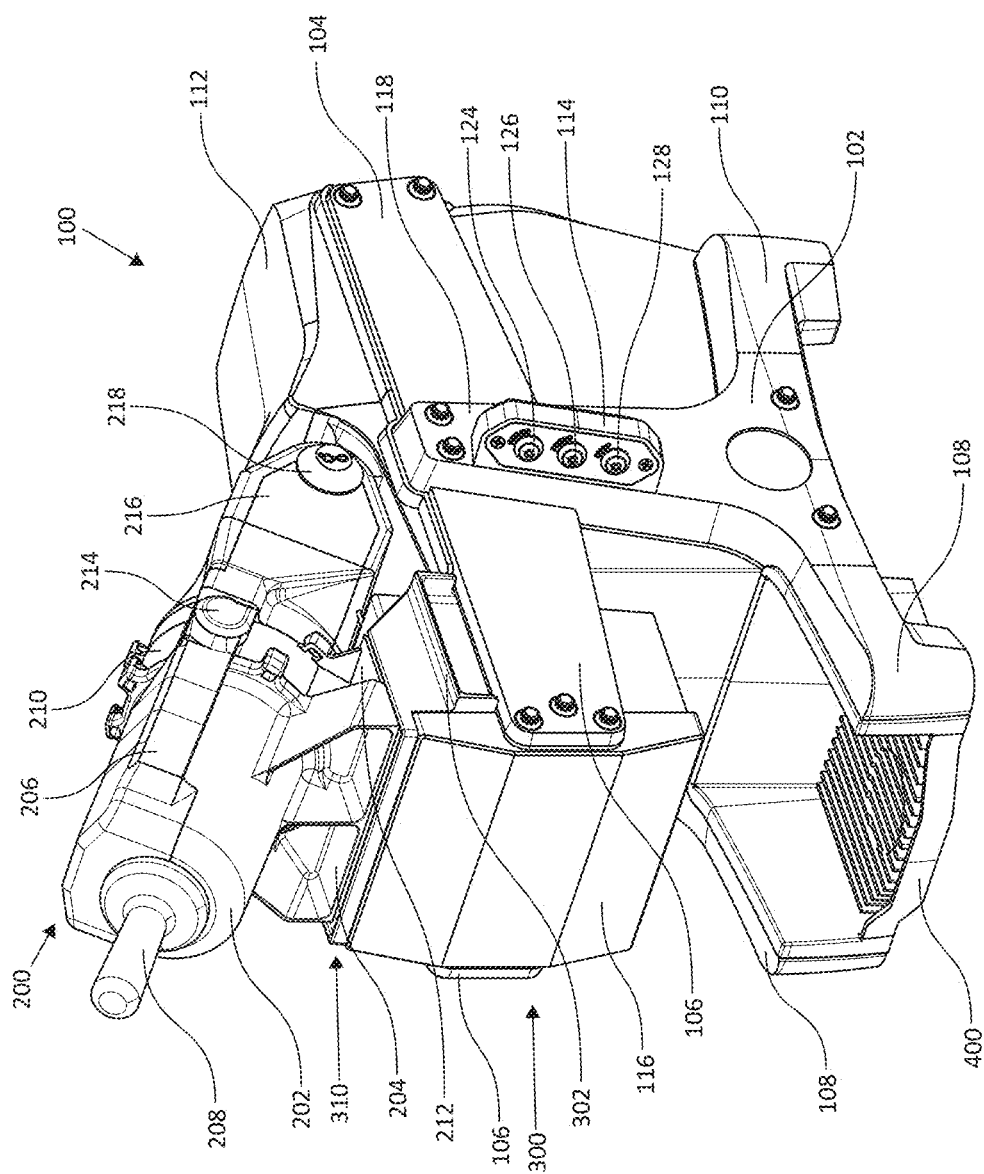

Juicing Device Overview—FIGS. 1A and 1B

Various embodiments and configurations of a juicing device 100 are disclosed herein. FIGS. 1A and 1B illustrate an example of the juicing device 100. The juicing device 100 can process food to extract juices. Food can include any consumable or food that has a consumable juice. The juicing device 100 can include a grinder assembly 200, a press chamber 300, and/or a drip tray 400.

The grinder assembly 200 can be configured to receive and grind food. The grinder assembly 200 can have a hopper 202 to receive food for processing. The hopper 202 can receive food through an opening 203 that leads to an inner cavity 205. A cover 206 can obstruct the opening 203, thereby inhibiting or preventing access to the inner cavity 205 and/or inhibiting or preventing food from escaping through the opening 203. The cover 206 can pivot up or down about a cover joint 214, as shown in FIGS. 1A and 1B. A pusher 208 can be used to push food down through the chute or hopper 202.

The hopper 202 can be releasably coupled to the grinder housing 210 such that a user can remove the hopper 202, cover 206, and/or a pusher 208 quickly and conveniently. The hopper 202 can be releasably coupled to the grinder housing 210 with a twist-lock connection. This can be advantageous for cleaning as the user can remove the hopper 202 to carry over to a cleaning area, such as a sink. In some embodiments, the motor unit 216, which can include a motor and a housing, will not drive the grinder plate unless the hopper 202 is releasably coupled to the grinder housing 21, which can be detected by a magnetic switch. The grinder housing 210 can be releasably coupled to motor unit 216 such that a user can remove the grinder housing 210 from the motor unit 216 quickly and conveniently, which can be advantageous for cleaning. The grinder housing 210 can be releasably coupled to the motor unit 216 with a twist-lock connection. In some embodiments, the motor unit 216 will not drive the grinder plate unless the grinder housing 210 is releasably coupled to the motor unit 216, which can be detected by a magnetic switch.

As described in more detail below, the pusher 208 can push food down through the chute or hopper 202 and into a grind plate. The grind plate can be housed within a grinder housing 210 and rotated by a motor unit 216. The grind plate can include a lopper that is configured to cut food and/or an agitator to distribute food away from a center of the grind plate. The rotation of the grind plate can cause food to be thrown radially, relative to the axis of rotation of the grinder plate. The food can be thrown toward a grinding area. The grinding area can include a plurality of fixed teeth (such as a ring of fixed teeth formed into an inner surface of the chute or hopper 202 or cut into a wall of the chute or hopper 202) and a plurality of spinning teeth (such as on a lower portion of the grinder plate) for grinding. The ground food can fall into the grinder housing 210.

The grinder assembly 200 can be configured to deliver ground food to the press chamber 300 (e.g., directly). The grinder housing 210 can have a food exit ramp through which ground food can exit the grinder housing 210 and enter the press chamber 300 via an opening 310. In various embodiments, the grinder assembly 200 can be rotated to different positions about the grinder assembly joint or hinge 218. For example, in FIG. 1A, the grinder assembly 200 is shown rotated upward to a first position relative to the press chamber 300 (e.g., to a position in which the exit ramp is spaced apart from the press chamber 300). As another example, in FIG. 1B, the grinder assembly 200 is shown rotated downward to a second position relative to the press chamber 300 (e.g., to a position in which the exit ramp is aligned and/or in engagement with the press chamber 300). The grinder assembly 200 can be rotated by hand and/or with a motor.

The press chamber 300 can be configured to press the ground food to extract juice. The press chamber 300 can be supported by one or more (e.g., a pair of) front arms 106 of a frame 102 such that the press chamber 300 is positioned over the drip tray 400. The opening 310 can, as shown in FIG. 1B, be covered by hopper support flanges 212 and/or grinder housing support flange 204 when the grinder assembly 200 is rotated to the second position. In some implementations, the motor unit 216 will not operate if the grinder assembly 200 is not in the second position (e.g., the hopper support flanges 212 and/or grinder housing support flange 204 are not closing the opening 310), which can be detected by a magnetic switch.

The ground food can pass through the opening 310 into a press box 302. A disposable filter, such as a single-use bag, can be placed through the opening 310 and into the press box 302. Food exiting the grinder housing 210 can be directed into the disposable filter. The disposable filter can inhibit or prevent particulate from being included in the finished juice for drinking.

A moveable platen 304 can be positioned in the press box 302 and used to press the ground food to extract juices. The moveable platen 304 can move toward a front wall of the press box 302, a front comb 308, and/or a fixed platen 116. The front comb 308 can be positioned between the movable platen 304 and the fixed platen 116. In some embodiments, the fixed platen 116 can be coupled to the pair of front arms 106. The arms 106 and/or fixed platen 116 can be configured to inhibit or prevent movement of the press box 302 as the moveable platen 304 moves toward the front wall of the press box 302, front comb 308, and/or fixed platen 116.

Fluid extracted by compression within the press chamber 300 can flow down to the drip tray 400. The extracted fluid can be collected by a vessel placed on the drip tray 400. The drip tray 400 can collect spilled fluid or food to enable a user to conveniently and quickly clean after use. The drip tray 400 can be removably secured between one or more (e.g., a pair of) fixed front legs 108 of the frame 102 such that the drip tray 400 can be removed and carried to a cleaning area without requiring movement of the entire juicing device 100.

As mentioned above, the frame 102 can support the various features and components of the juicing device 100, such as the press chamber 300. The frame 102 can include front legs 108, back legs 110, front arms 106, and back arms 104 that extend away from a central support 118. The frame 102 can support a housing 112 that can house electronics, motors, and/or other components used to operate the juicing device 100.

The juicing device 100 can include a user interface 114 that can enable a user to control the juicing device 100. The user interface 114 can include a plurality of input devices, such as buttons, switches, electronic screens, or otherwise. The illustrated embodiment includes a shred button 124, press button 126, and stop button 128. The shred button 124 can cause the motor unit 216 to drive, which can in turn cause a grinder plate 222 to rotate as will be described in more detail below. In some implementations, the shred button 124 can cause the motor unit 216 to drive at a single speed, such as a single speed that is configured to process a variety of foods. The press button 126 can cause the press chamber 300 to press the food to extract juice. For example, a shaft 312 (e.g., a rod), as will be described in more detail below, can extend to push or move the movable platen 302 toward the front wall of the press box 302, front comb 308, and/or fixed platen 116 to press ground food. The stop button 128 can stop operation of the device 100, such as by stopping the juicing device 100 from driving the motor unit 216 and/or stopping the shaft 312 from moving movable platen 304. In various embodiments, in response to a user pushing the shred button 124, the juicing device 100 will operate automatically to grind the food, move the ground food from the grinder to the press box, press the ground food in the press box, and collect the extracted juice.

In various embodiments, all the components of the juicing device that contact food or juice can be quickly and easily disassembled, cleaned, and reassembled between juicing operations with negligible carryover of flavor and color between juicing. For example, in some embodiments, the disassembling, cleaning, and reassembling can be accomplished in less than about 2 minutes, about 1 minute, about 30 seconds, or otherwise. The various components of the juicing device can be manufactured using a variety of techniques. For example, certain components can be made by injection molding, additive manufacturing (e.g., 3D printing), machining, and/or other manufacturing processes. The various components described herein can be made from a variety of materials, which can at least include polymers, such as plastic (e.g., polypropylene, high density polyethylene, etc.), metal (e.g., stainless steel, aluminum, etc.), and/or metal alloys.

Figure 2:
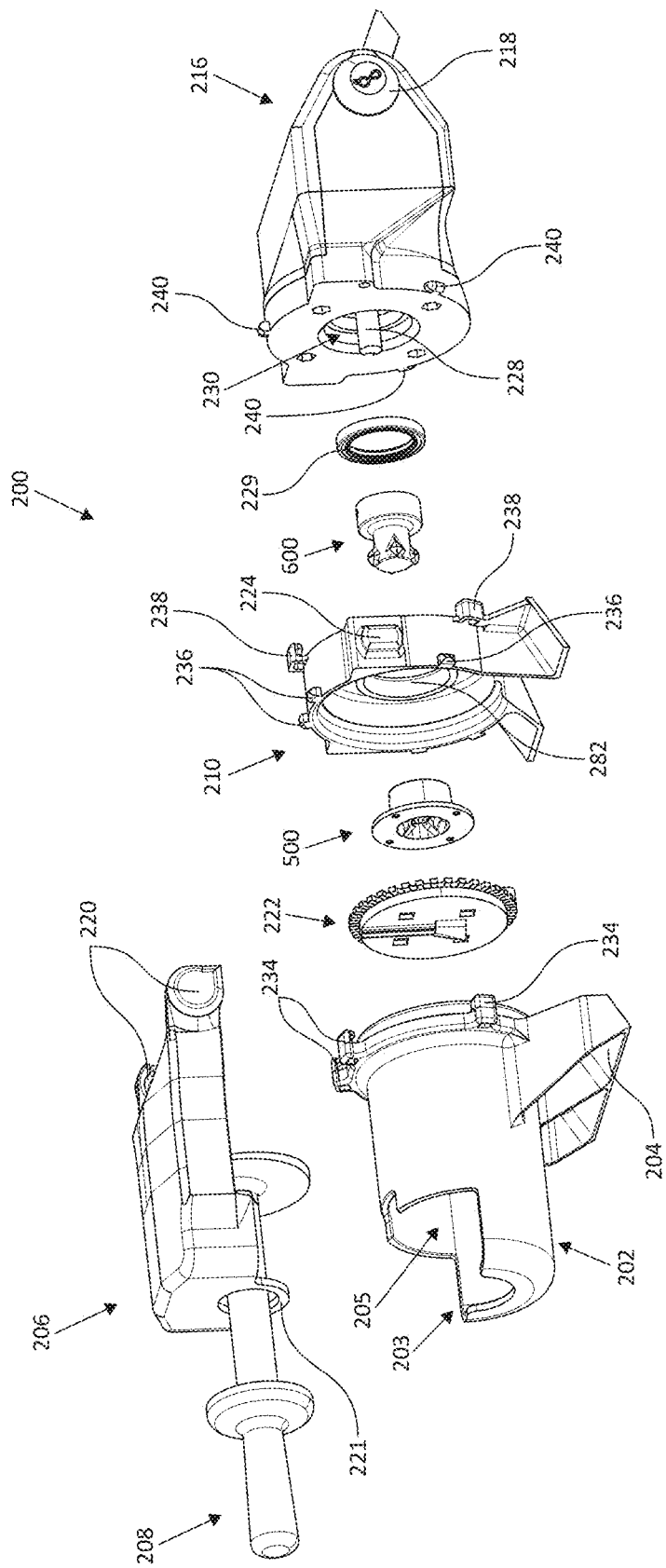
FIG. 2 illustrates an exploded view of an example grinder assembly of the juicing device of FIG. 1.

Grinder Assembly—FIG. 2

FIG. 2 shows an exploded view of the grinder assembly 200. As described above, the grinder assembly 200 can include the hopper 202. The hopper can include a chute configured to receive and hold food to be ground. The hopper 202 can include a plurality of first mating elements (e.g., receiving pockets 234) positioned around a circumference thereof. The receiving pockets 234 can interface with a corresponding plurality of second mating elements (e.g., tabs 236) positioned around a circumference of the grinder housing 210. In some embodiments, the receiving pockets 234 of the hopper 202 can engage (e.g., twist over) the plurality of tabs 236 of the grinder housing 210 such that the hopper 202 is securely coupled to the grinder housing 210.

As illustrated, the grinder assembly 200 can include a grinder plate 222. The grinder plate 222 can be configured to grind the food and/or to radially fling the ground food, as discussed in more detail below. The grinder plate 222 can be fixedly coupled to a drive coupling 500 such that rotation of the drive coupling 500 results in the rotation of the grinder plate 222. The drive coupling 500 can be an annular structure. The hopper 202 and grinder housing 210 can at least partially enclose the grinder plate 222 and the drive coupling 500.

The cover 206 can couple to the grinder housing 210. The cover pivot joint 220 of the cover 206 can interface with the pivot joint protrusion 224 of the grinder housing 210 to form the cover joint 214 described in reference to FIGS. 1A and 1, enabling the cover 206 to rotate up or down to cover and uncover the opening 203 of the hopper 202. The cover 206 can have an aperture (e.g., groove) 221 through which the pusher 208 can extend such that the pusher 208 is coupled to the cover 206 and/or can be moved in the inner cavity 205 of the hopper 202 while the cover 206 is covering the opening 203.

The drive coupling 500 can extend through an opening 282 of the grinder housing 210 to engage with a drive tip 600. The drive tip 600 can be part of or coupled to (e.g., a cap on) a drive shaft 228 of the motor unit 216, such that rotation of the drive shaft 228 causes rotation of the drive tip 600. The drive coupling 500 can engage with the drive tip 600 such that the drive coupling 500 is retained on the drive tip 600 when the drive shaft 228 of the motor unit 216 is rotating. The drive coupling 500 can be decoupled from the drive tip 600 when the motor unit 216 is not rotating the drive shaft 228 and drive tip 600. The drive tip 600 can be at least partially positioned within an opening 230 of the motor unit 216. As described below, the drive coupling 500 and drive tip 600 can be configured to facilitate operative engagement.

A shaft seal 229, which can be a bearing, can be positioned around the drive tip 600. The shaft seal 229 can be positioned between the drive tip 600 and an inner surface of the opening 230 of the motor unit 216. The shaft seal 229 can be a double lipped and/or resistant to oil. The shaft seal 229 can help to inhibit or prevent misalignment of the drive tip 600 while allowing for the rotation thereof.

The grinder housing 210 can have a plurality of first mating features (e.g., receiving pockets 238) positioned around a circumference thereof. The receiving pockets 238 can interface with a plurality of second mating features (e.g., tabs 240) positioned around a circumference of the motor unit 216. The receiving pockets 238 of the grinder housing 210 can engage with (e.g., twist over) the plurality of tabs 240 such that the grinder housing 210 is coupled to the motor unit 216 and/or at least partially enclosing the drive tip 600.

In certain implementations, the hopper 202, pusher 208, cover 206, grinder plate 222, drive coupling 500, and grinder housing 210 are together called the hopper unit. In some embodiments, the hopper unit can be removed from the motor unit 216 and/or other components of the juicing device 100. This can facilitate convenient cleaning of the hopper unit. In some embodiments, removal of the hopper unit is accomplished by decoupling the receiving pockets 238 of the grinder housing 210 from the plurality of tabs 240 of the motor 240. In some variants, the hopper 202, pusher 208, and cover 206 can be decoupled from the juicing device 100 for cleaning as a combined unit. This can be accomplished by decoupling the receiving pockets 234 from the plurality of tabs 236 of the grinder housing 210.

In various embodiments, the juicing device 100 is configured to not operate when the hopper 202 is disconnected. For example, in some embodiments, the juicing device 100 is configured such that the motor unit 216 will not drive the drive shaft 228 (or the drive tip 600, drive coupling 500, and/or grinder plate 222) if the hopper 202 is decoupled from the grinder housing 210 and/or if the grinder housing 210 is decoupled from the motor unit 216, which can increase safety of use. Coupling of the hopper 202 to the grinder housing 210 and/or the grinder housing 210 to the motor unit 216 can be detected via a magnetic switch or other mechanism. In some embodiments, opening of the cover 206, which can include the configuration shown in FIG. 1A, can cause the motor unit 216 to not drive the drive shaft 228. In some embodiments, closing the cover 206, which can include the configuration shown in FIG. 1B, can enable automatic restarting of the motor unit 216 to drive the drive shaft 228.

Figure 3B:
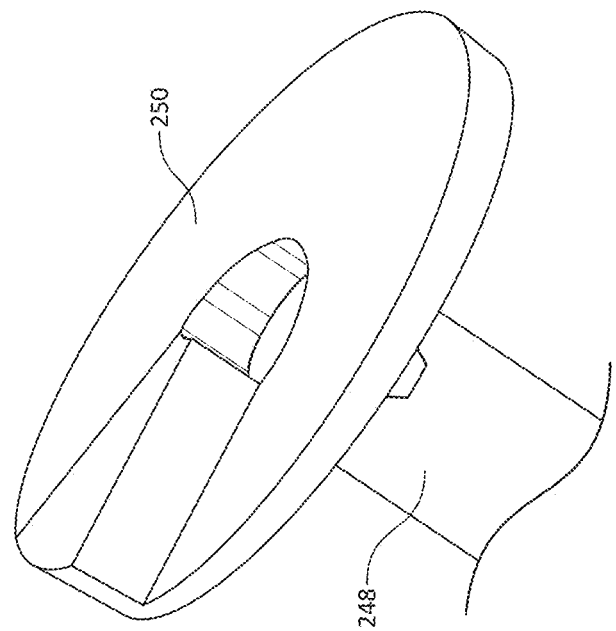
FIGS. 3A and 3B illustrate various views of an example pusher.
Figure 3A:
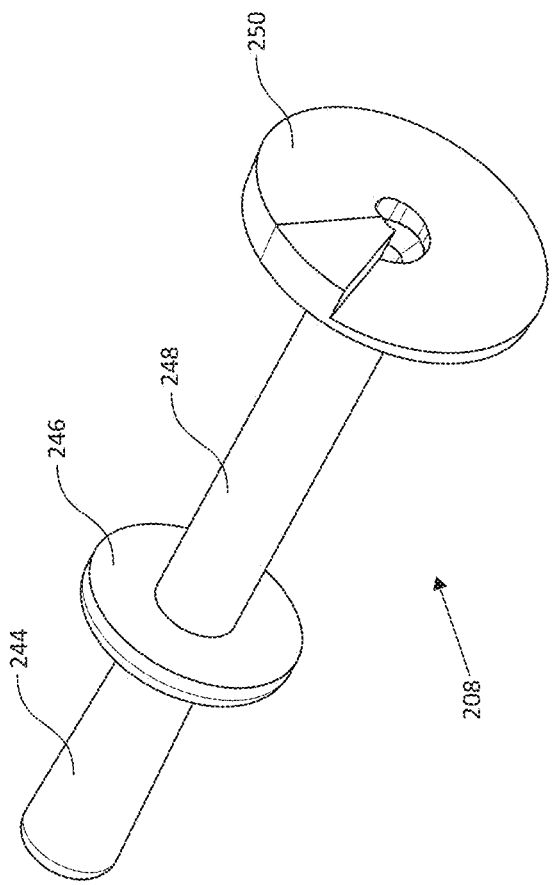

Pusher—FIGS. 3A and 3B

FIGS. 3A and 3B illustrate an example of the pusher 208. As described above, the pusher 208 can push food through the hopper 202. The pusher 208 can include a handle 244 that can be grasped by a user. The handle 244 can be ergonomic, such as having contours to fit a human hand. The pusher 208 can have a shaft 248. The shaft 248 can extend between a retainer 246 and a face 250. The retainer 246 can inhibit or prevent the pusher 208 from extending into the hopper 202 such that the face 250 engages with the grinder plate 222. The retainer 246 can be larger than the aperture (e.g., groove) 221 of the cover 206, thereby inhibiting or preventing further movement of the face 250 toward the grinder plate 222. The retainer 246 can have a periphery that is circular or another shape, such as polygonal, irregular, or others. The shaft 248 can have a length to position the face 250 proximate the grinder plate 222.

As illustrated, the face 250 can be helical in shape. A helical shape can enable a user to apply pressure to different parts of the food as it is being ground up. A helical shape can allow a user to rotate the pusher 208 relative to the hopper 202 and/or the food. This can enable the face 250 to exert different pressures to the food (e.g., depending on which part of the helical face is in contact with a particular portion of the food). In some embodiments, the helical face can aid a user in moving the food within the hopper 202 and/or the grinder plate 222. The ability to apply varying pressure and/or to move the food can be especially advantageous if the food bridges or jams. The face 250 can have a periphery that is circular or another shape, such as polygonal, irregular, or others. In some variants, the face 250 is generally flat, which can facilitate applying even, or substantially even, pressure to food. The face 250 can be sized to extend to or proximate an inner surface 233 of the hopper 202, substantially filling a cross-section of the inner cavity 205.

The face 250 and/or the pusher 208 can be made of a polymer, such as silicone (e.g., food or medical grade silicone) and/or rigid plastic. In certain variants, the face 250 can be removably attached to the shaft 248. This can enable the face 250 to be replaced and/or the pusher 208 to be decoupled from the shaft 248. The face 250 can be coupled to the shaft 248 with a threaded connection, snap-fit, press-fit, set-screw, and/or with other techniques.

Figure 4B:
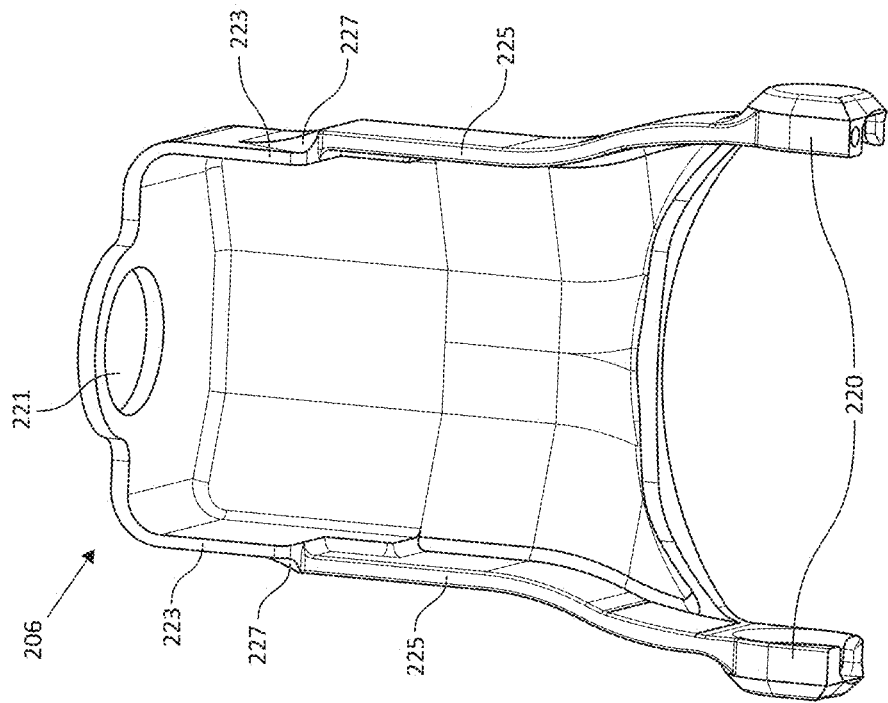
FIGS. 4A and 4B illustrate various views of an example cover.
Figure 4A:
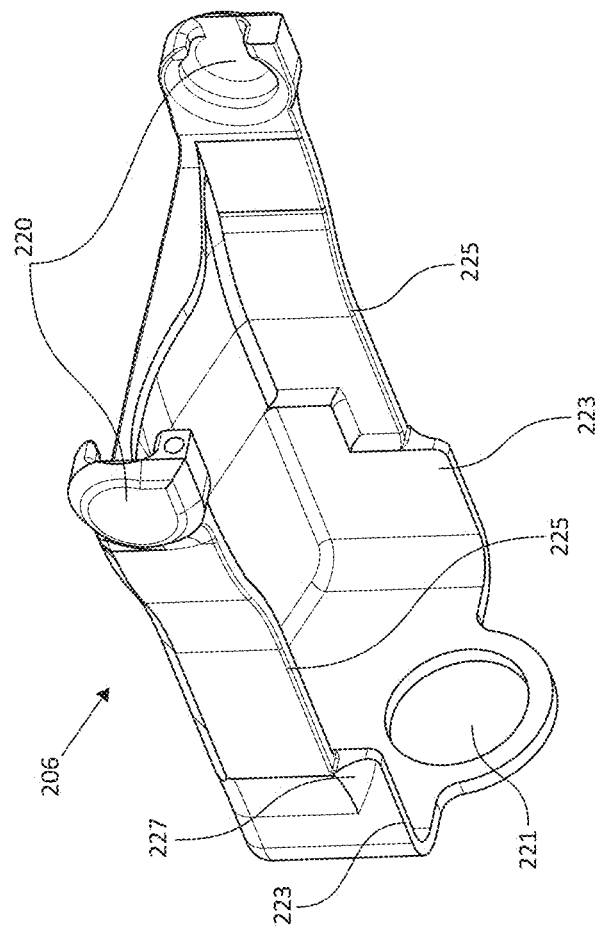

Cover—FIGS. 4A and 4B

FIGS. 4A and 4B illustrate an example of the cover 206. The cover 206 can obstruct the opening 203 that provides access to an inner cavity 205 of the hopper 202. The cover 206 can include one or more cover pivot joints 220. The pair of cover pivot joints 220 can each have a receiving region into which the pivot joint protrusions 224 can be retained. The pair of cover pivot joints 220, as explained above, can rotatably couple to a pivot joint protrusion 224 of the grinder housing 210, thereby enabling the cover 206 to rotate between open and closed positions as shown in FIGS. 1A and 1*i*, respectively. In the open position, food can be inserted through the opening 203 into the hopper 202.

The cover 206 can include an aperture (e.g., groove) 221 through which the shaft 248 of the pusher 208 extends. The aperture 221 can enable the pusher 208 to be moved within the hopper 202 when the cover 206 is in the closed position (e.g., with the cover 206 covering the opening 203). The aperture 221 can be circular, polygonal, irregular, and/or other shapes. The cover 206 can include one or more support edges 223 that interface with the periphery of the opening 203 such that the cover 206 covers the opening 203. In some embodiments, the cover 206 includes flanges 227 (e.g., curves). The flanges 227 can extend from the support edges 223, such as toward outward outer edges 225. The outer edges 225 can extend around at least a portion of the hopper 202 when the cover 206 is covering the opening 203.

As shown in FIG. 1, the shaft 248 of the pusher 208 can be retained in the cover even when the cover 206 is in the open position. This can position the pusher in a location that is convenient yet still allows insertion of food into the hopper 202. As illustrated, the aperture 221 can be bounded by a wall (e.g., a substantially continuous wall) on at least the bottom side. The wall can support and/or retain the pusher 208, such as when the cover 206 is in the open position.

Hopper—FIG. 5A-5C

FIGS. 5A-5C illustrate an example of the hopper 202. As mentioned above, the hopper 202 can have the opening 203 that allows access into the inner cavity 205. The hopper 202 can have one or more support edges 211. The support edges 211 can define a portion of the opening 203. The support edges 211 can engage with the support edges 223 of the cover 206 to position (e.g., orient) the cover 206 over the opening 203. As detailed above, opening and/or closing of the cover 206 can cause the motor unit 216 to engage and/or disengage. A recess 209 can define a portion of the opening 203. The recess 209 can provide the pusher 208 increased area to move such that the cover 208 has an increased ability to rotate without being limited by the pusher 208 when the pusher 208 remains in the inner cavity 205. A lower wall 207 (e.g., a curved wall) can define a portion of the opening 203. The lower wall 207 can receive a portion of the pusher 208 and/or can accommodate a portion of the cover 206 surrounding the aperture 221.

The inner cavity 205 can extend through the entirety of the hopper 202 such that food entering through the opening 203 can continue out via an exit 213 (e.g., the end of the chute). The exit 213 can be positioned opposite the opening 203. The inner cavity 205 can be defined or surrounded by a wall or inner surface 233 of the hopper 202. The wall or inner surface 233 can extend between the opening 203 and the exit 213.

The hopper 202 can include food grinding features, such as a plurality of hopper teeth 252. In various embodiments, the hopper teeth 252 comprise a ring of teeth. The hopper teeth 252 can be positioned at or adjacent the exit 213. The exit 213 can be the portion of the hopper 202 at which food exits the hopper 202 and/or an end of the hopper 202 that is opposite the opening 203. The exit 213 can be the opening (e.g., outlet) through which food exits the hopper 202. The exit 213 can be the opening (e.g., outlet) of the inner cavity 205. The hopper teeth 252 can be cut and/or formed into the wall or inner surface 233 of the hopper 202. The hopper teeth 252 can be integral with the hopper 202. The hopper 202 and the hopper teeth 252 can be monolithically formed as a unit. A configuration in which the hopper teeth 252 and hopper 202 are combined can be advantageous, as compared to having separate components, because it can be more convenient to clean and quicker to assemble. The hopper teeth 252 can circumferentially surround a portion of the inner cavity 205. The hopper teeth 252 can be configured such that food is pulled through the grinder assembly 200 and/or hopper 202 as the grinder plate 222 rotates relative to the hopper 202. The shape of the openings (e.g., gaps) in the hopper teeth 252 can cause food to deflect downward and outward, toward the lower portion 263 and/or plurality of teeth 256 of the grinder plate 222, from the force imparted when food contacts the grinder plate 222. This can be in contrast to having a shape in the openings (e.g., gaps) in the hopper teeth 252 that imparts a force that causes food to deflect immediately reverse the direction of contact (e.g., direction of rotation). The openings (e.g., gaps) in the hopper teeth 252 can increase in the longitudinal direction (e.g., in the opening 203 to exit 213 direction), reducing the likelihood that food (e.g., a seed, hard food material, and/or carrot) will get jammed in the openings (e.g., gaps) in the hopper teeth 252. Stated differently, the openings (e.g., gaps) in the hopper teeth 252 can increase the further the food travels through the hopper teeth 252. This can be advantageous over hopper teeth 252 designs that have uniform vertical profiles, which can have a higher likelihood of food jamming in the openings (e.g., gaps) in the hopper teeth 252. In some implementations, the hopper teeth 252 can have at least one side that is at an angle relative to the longitudinal axis of the hopper 202. For example, as shown in FIG. 5A, the hopper teeth 252 can be generally trapezoidal and/or have lateral sides that are angled (e.g., less than or equal to about 45°) relative to the longitudinal axis of the hopper 202. The angled sides can be configured such that food flung against the teeth 252 can be deflected at least partly downwardly and/or toward the exit 213.

The hopper 202 can include features to facilitate assembly with the grinder housing 210. A fillet 251 can be positioned proximate the exit 213. The fillet 251 can help to guide the hopper 202 into the grinder housing 210 when coupling them together. A curve 253 can be positioned proximate the fillet 251 and assist in interfacing the hopper or chute 202 with the grinder housing 210.

As described above, the hopper 202 can have a plurality of receiving pockets 234. The plurality of receiving pockets 234 can be used to couple the hopper 202 to the grinder housing 210. The receiving pockets 234 can be disposed circumferentially around the hopper 202. The receiving pockets 234 can be positioned proximate the exit 213. In some embodiments, the plurality of receiving pockets 234 includes two, three, four, five, six or more receiving pockets 234.

FIG. 5C shows an enlarged view of one of the receiving pockets 234. The receiving pocket 234 includes a cavity 235 into which a tab can be received. The receiving pocket 234 can include an opening 245 enabling a user to visually verify that a tab is positioned in the receiving pocket 234, indicating that the hopper 202 is coupled to the grinder housing 210. In some embodiments, the device 100 is configured such that the motor unit 216 will not operate unless one or more (e.g., all) of the plurality of receiving pockets 234 has received a tab, indicating that the hopper 202 is coupled to grinder housing 210. This can be detected using a magnetic switch or similar mechanism. Other locking mechanisms can be used to couple the hopper 202 to the grinder housing 210 and/or couple other components described herein, which may or may not be twist-lock couplings.

Grinder Plate—FIG. 6A-6D

FIGS. 6A-6D show an example of the grinder plate 222. As shown, the grinder plate 222 can have an upper portion 262, a lower portion 263, and an axis of rotation 271. During operation of the device 100, the grinder plate 222 can rotate about the axis of rotation 271. As is discussed in more detail below, in several implementations, the device 100 is configured such that food is ejected radially outward (e.g., generally perpendicular to the axis of rotation 271) from the grinder plate 222, such as when food exits the hopper 202.

The lower portion 263 of the grinder plate 222 can have a plurality of teeth 256. The plurality of teeth 256 can extend radially outward from the grinder plate 222. The plurality of teeth 256 can extend radially outward from the axis of rotation 271 of the grinder plate. Each of the plurality of teeth 256 can have an end 258. The end 258 can be a surface that is generally parallel to the axis of rotation 271. The end 258 can be substantially flat. The end 258 can have a shape that is rectangular, circular, polygonal, irregular, and/or other shapes. A gap 260 can extend between two of the adjacent plurality of teeth 256. The gap 260 can be partially defined by a curve extending between two of the adjacent plurality of teeth 256. In some embodiments, the lower portion 263 can include a continuous annular structure around the circumference of the lower portion 263. The continuous annular structure can lack circumferential gaps. In some embodiments, the lower portion 263 can have an annular structure (e.g., solid surface) that includes one or more gaps therein that may be equally or unequally disturbed around the circumference of the lower portion 263. In some embodiments, the plurality of teeth 256 can include one or more teeth that are equally or unequally distributed around the circumference of the lower portion 263. In some embodiments, the lower portion 263 can have one or more portions that is/are a solid annular structure with or without gaps and/or the lower portion 263 can have one or more teeth that are equally or unequally distributed around a portion of the circumference of the lower portion 263.

The lower portion 263 can couple to the drive coupling 500. The lower portion 263 can have a recess 270 that receives a portion of the drive coupling 500. A plurality of grooves (e.g., apertures) 266 can extend along or through the grinder plate 222. The plurality of grooves 266 can be used to couple grinder plate 222 to the drive coupling 500 with screws, bolts, or other similar devices. As shown in FIG. 6A, a recess 264 can surround each of the plurality of grooves 266. The recess 264 can receive some or all of the screw head, bolt head, nut, or other similar device, thereby enabling the maintenance of a low profile.

In some embodiments, the lower portion 263 includes a wiper 272. In some embodiments, the lower portion 263 can include one or more wipers 272. The wiper 272 can be positioned opposite the upper portion 262. The wiper 272 can be positioned on a bottom surface of the lower portion 263. During operation of the device 100, the wiper 272 can be configured to push food that is positioned under the grinder plate 222. For example, the wiper 272 can push food positioned between the grinder plate 222 and a bottom wall of the grinder housing 210, such as towards a food exit ramp, described is in more detail below. The wiper 272 can be a protrusion of a portion of the grinder plate 222. For example, as shown in FIG. 6B, the wiper 272 can be a protrusion having a circumferential width that is approximately the size of two of the teeth 256 and a radial width of about half of the radius of the lower portion 263. The wiper 272 can have a generally flat surface, angled surface, and/or curved surface facing in the direction of rotation 273. The wiper 272 can have one or more curved corners 274 (e.g., radially inwardly and/or outwardly facing corners), which can decrease the likelihood that the food fibers will stick to or become tangled on the wiper 272. The curved corners 274 can allow the wiper 272 to be positioned proximate the walls of the grinder housing 210 as the grinder plate 222 rotates such that it is less likely that food fibers will get stuck in the grinder housing 210.

The upper portion 262 can have a circular periphery that is raised from the lower portion 263. The upper portion 262 can have a diameter that is smaller than a diameter of the lower portion 263. In some embodiments, the upper portion 262 is axially offset from the lower portion 263, such as at least an amount equal to the axial thickness of the teeth 256.

The upper portion 262 can have a lopper 232. The lopper 232 can be configured to push and/or cut food as the grinder plate 222 rotates. The lopper 232 can be an elongate structure. The lopper 232 can be straight, curved, or angled. As seen in FIG. 6A, the lopper 232 can have a cutting edge 275. The cutting edge 275 can face circumferentially and/or in the direction of rotation 273 of the grinder plate 222. As seen in FIG. 6C, the lopper 232 can have a curved front profile 280 and/or a curved back profile 281 that come together at the cutting edge 275. In some embodiments, the curved front profile 280 is straight or angled and/or the curved back profile 281 is straight or angled. The curved front profile 280 and/or the curved back profile 281 can inhibit or prevent buildup and/or tangling of food fibers as the lopper 232 rotates.

The upper portion 262 can have an agitator 226. The agitator 226 can be positioned at or adjacent the center of the grinder plate 222. In some implementations, the agitator 226 is asymmetrically configured relative to the center of the grinder plate 222. For example, as illustrated in FIG. 6A, a radially inner end of the agitator 226 can be positioned at approximately the center of the grinder plate 222 and a radially outer end of the agitator 226 can be positioned closer to the teeth 26. As shown in FIGS. 6C and 6D, the agitator 226 can have an apex 278. The apex 278 can be configured to deflect food delivered through the hopper 202 radially outward so that the food is less likely to remain stuck in the center of the grinder plate 222. The agitator 226 can have a straight front profile 276 and/or a curved back profile 277 that meet at the apex 278. A curve 279 can extend from a top surface of the upper portion 262 to the straight front profile 276, which can reduce the likelihood of food getting stuck. The agitator 226 can help to deflect food into the path of the lopper 232 for cutting and/or pushing. As shown in FIG. 6A, in some embodiments, the agitator 226 is aligned with the lopper 232. For example, a diameter of the grinder plate 222 can pass through the agitator 226 and the lopper 232. In some embodiments, the agitator 226 is on one side of the center of the grinder plate 222 and the lopper 232 is on the other side of the center of the grinder plate 222. In some variants, the different feature(s) and/or surface(s) of the grinder plate 222 can have a textured surface, such as a roughened surface, which can contribute to producing a finer grind. In some embodiments, the grinder plate 222 can be formed by coupling multiple components or pieces (e.g., coupling multiple pieces of plastic and/or sheet metal together). In some embodiments, the lopper 232, agitator 226, and/or wiper 272 can be coupled to the upper portion 262 and/or lower portion 263. In some embodiments, the grinder plate 222 is formed via one investment cast, which can be made of stainless steel.

Figures 7A, 7B:
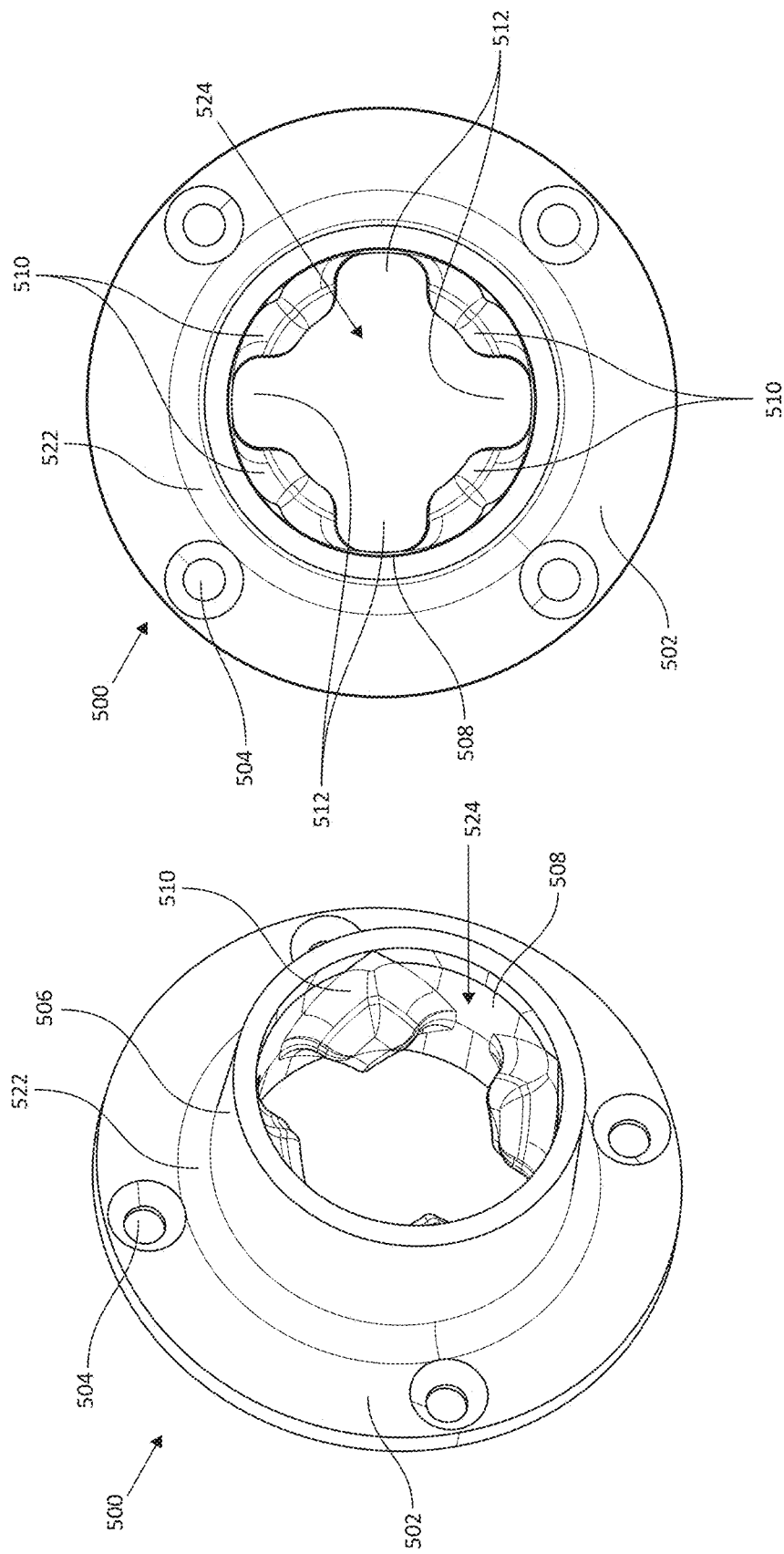
FIGS. 7A-7C illustrate various views of an example drive coupling.
Figure 7C:
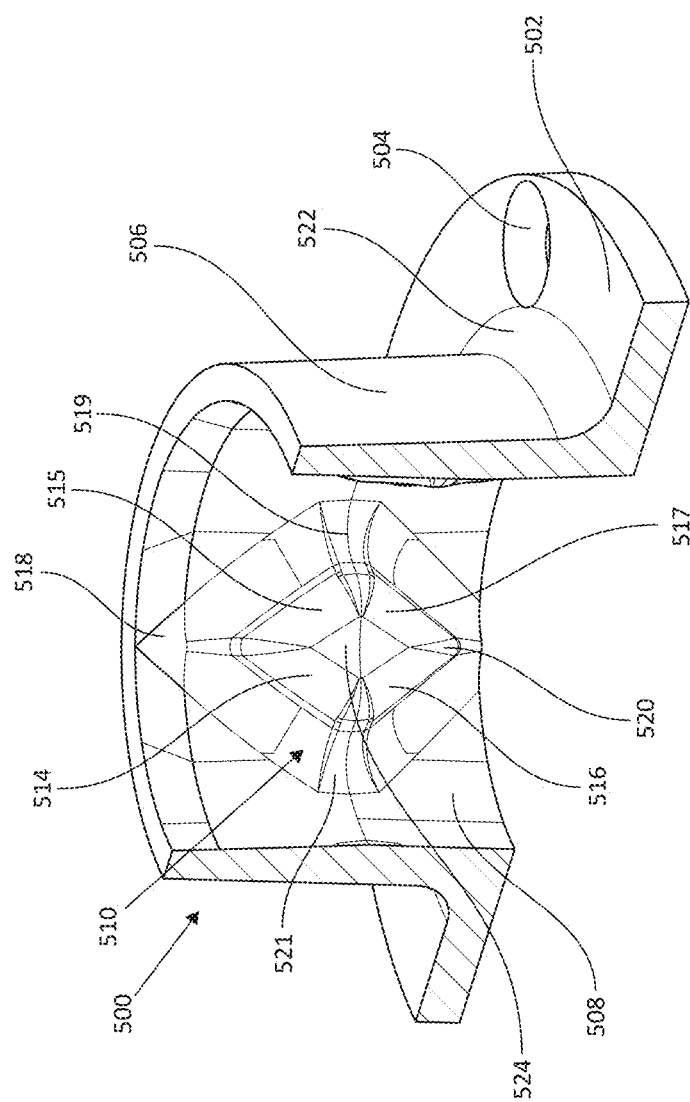

Drive Coupling—FIG. 7A-7C

FIGS. 7A-7C illustrate an example of the drive coupling 500. The drive coupling 500 can have a flange 502 that is sized to mate with (e.g., fit within) the recess 270 of the grinder plate 222. The flange 502 can have a plurality of grooves (e.g., apertures) 504 that can align with the plurality of grooves (e.g., apertures) 266 of the grinder plate 222 for coupling.

The drive coupling 500 can have a tube 506, such as a hollow cylinder. The tube 506 can extend generally perpendicularly relative to the flange 502. A curve 522 can extend between the flange 502 and the tube 506. The curve 522 can reduce the likelihood that food will become stuck between the flange 502 and the tube 506.

The drive coupling 500 can be configured to operatively interface with the drive tip 600. For example, the tube or hollow cylinder 506 can receive the drive tip 600. The drive coupling 500 can have an inner surface 508. The drive coupling 500 can have a receiving region 524, which can receive the drive tip 600. A plurality of grip protrusions or internal protrusions 510 can be circumferentially distributed on the internal surface 508 and/or around the receiving region 524. As shown in FIG. 7B, a plurality of gaps 512 can extend between adjacent grip protrusions or internal protrusions 510. The gaps 512 can be sized to receive drive protrusions 610 of the drive tip 600. In some variants, the drive tip 600 has a plurality of projecting helical splines and the drive coupling 500 has a corresponding plurality of receiving recesses, or vice versa. In several embodiments, the interfacing features of the drive coupling 500 and drive tip 600 are configured to increase the engagement between the drive coupling 500 and drive tip 600 during operation of the motor unit 216, such as by pulling the drive coupling 500 toward the drive tip 600.

As shown in FIG. 7C, each of the plurality of grip protrusions or internal protrusions 510 can include a top longitudinal ridge 520, bottom longitudinal ridge 518, first lateral ridge 521, and/or second lateral ridge 519. The top longitudinal ridge 520 and the bottom longitudinal ridge 518 can be positioned on opposing sides of the grip protrusions or internal protrusions 510. The first lateral ridge 521 and second lateral ridge 519 can be positioned on opposing sides of the grip protrusions or internal protrusions 510. A first top surface 516 can extend between the top longitudinal ridge 520 and the first lateral ridge 521. A second top surface 517 can extend between the top longitudinal ridge 520 and the second lateral ridge 519. A first bottom surface 514 can extend between the bottom longitudinal ridge 518 and the first lateral ridge 521. A second bottom surface 515 can extend between the bottom longitudinal ridge 518 and the second lateral ridge 519. The first top surface 516, second top surface 517, first bottom surface 514, and second bottom surface 515 can curve toward the inner surface 508 of the drive coupling 500. The first top surface 516, second top surface 517, first bottom surface 514, and second bottom surface 515 can curve away from a center surface 526. The second top surface 517 and first bottom surface 514 can extend in opposing directions. The first top surface 516 and second bottom surface 515 can extend in opposing directions. The top longitudinal ridge 520, bottom longitudinal ridge 518, first lateral ridge 521, and/or second lateral ridge 519 can define a change of curvature direction between the first top surface 516, second top surface 517, first bottom surface 514, and second bottom surface 515. As explained in further detail below, the first top surface 16 or the second top surface 517 can engage with portions of the drive tip 600 to retain the drive coupling 500 on the drive tip 600 while the motor unit 216 is driving.

Figure 8:
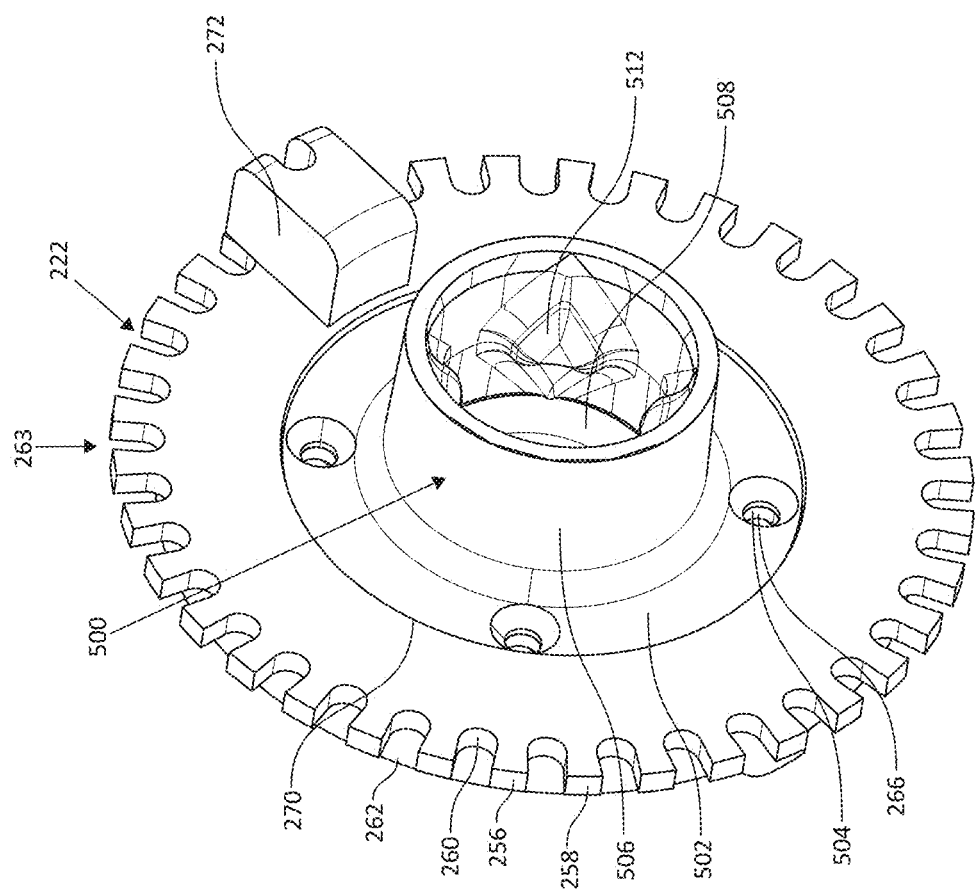
FIG. 8 illustrates various views of the grinder plate of FIGS. 6A-6D assembled to the drive coupling of FIGS. 7A-7C.
Figure 9B:
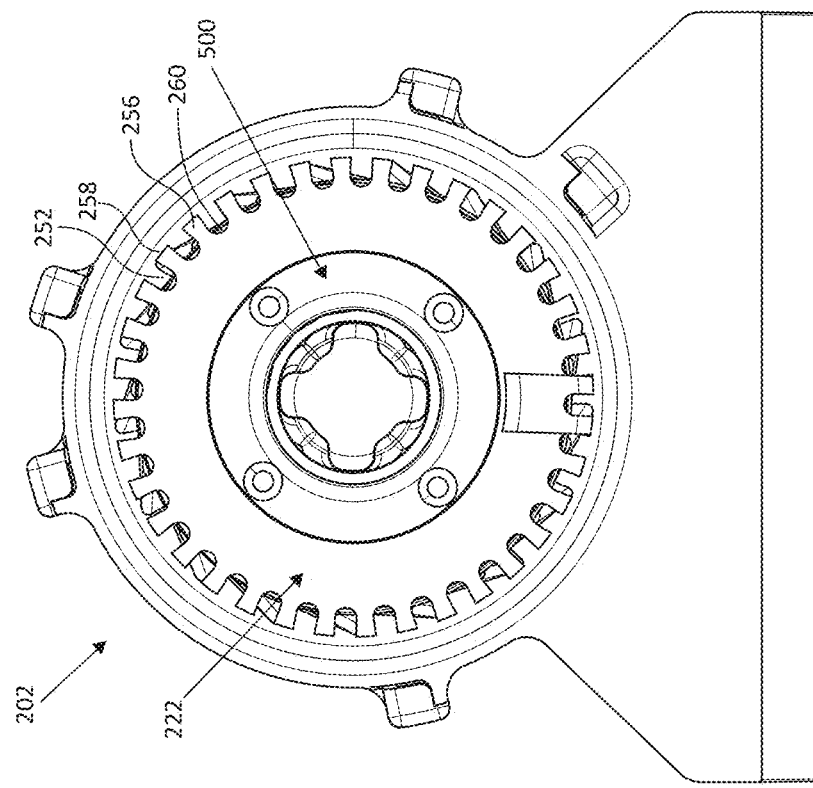
FIGS. 9A-9C illustrate various views of the assembled hopper of FIGS. 5A-5C, grinder plate of FIGS. 6A-6D, and drive coupling of FIGS. 7A-7C.
Figure 9A:
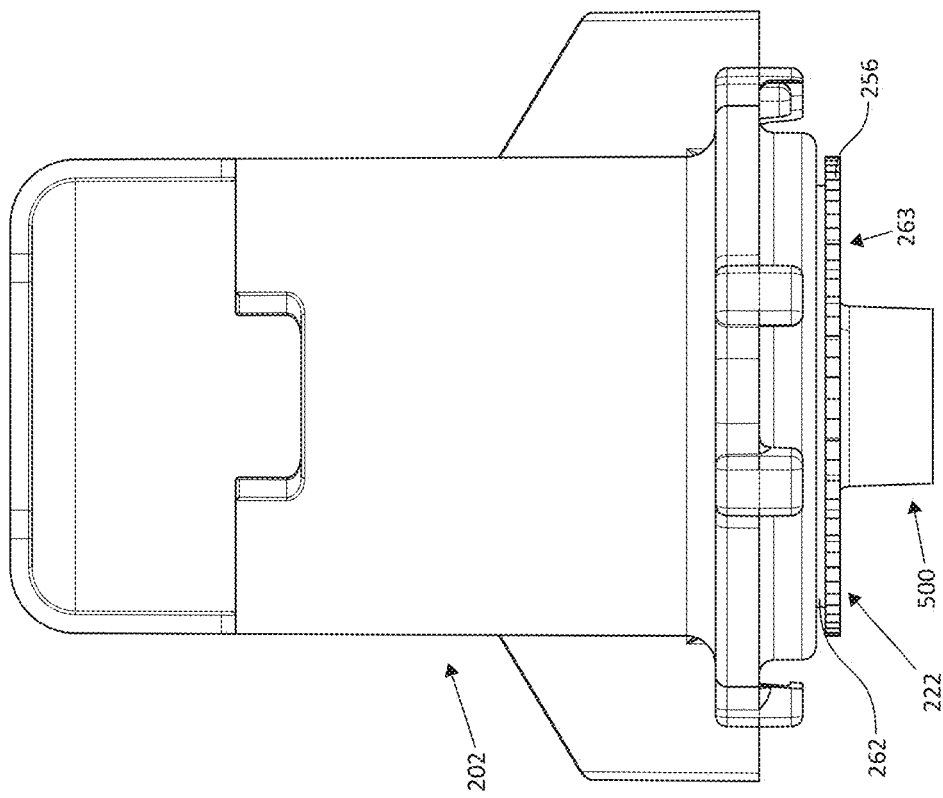
Figure 9C:
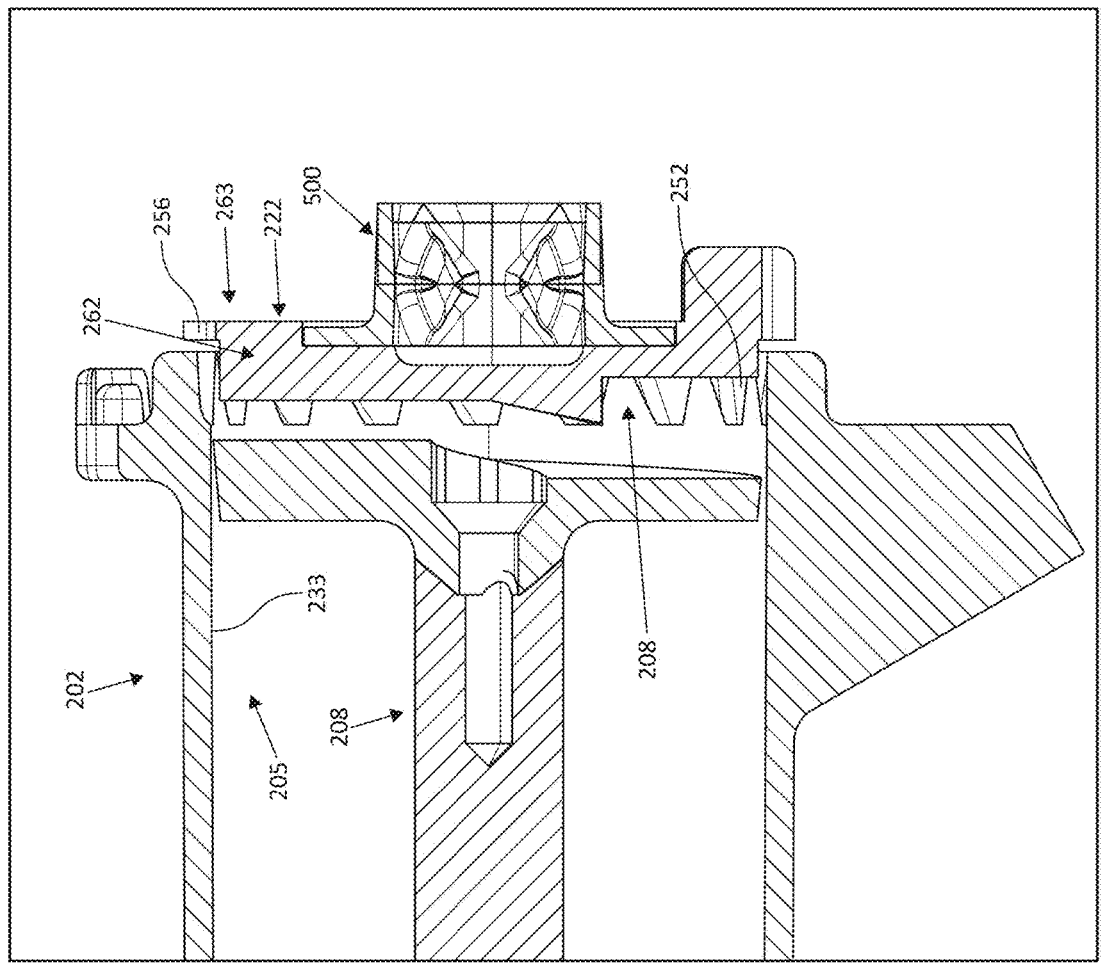

Certain Grinder Sub-Assemblies—FIGS. 8-9C

FIG. 8 illustrates the assembled drive coupling 500 and grinder plate 222. As previously explained, the drive coupling 500 can couple to the grinder plate 222 such that rotation of the drive coupling 500 causes rotation of the grinder plate 222. The drive coupling 500 can couple to the lower portion 263 of the grinder plate 222. Specifically, the flange 502 of the drive coupling 500 can be fit into the recess 270 of the grinder plate 222. The plurality of grooves 504 of the drive coupling 500 can align with the plurality of grooves 266 of the grinder plate 222 to facilitate coupling. In some embodiments, the drive coupling 500 and the grinder plate 22 are a single component.

FIGS. 9A-9C show the assembled hopper 202, drive coupling 500, and grinder plate 222. As shows, the grinder plate 222 can be partially inserted into the hopper 202. The top portion 262 of the grinder plate 222 can be inserted through the exit 213 and into the inner cavity 205 of the hopper 202. The top portion 262 can extend, as shown in FIG. 9C, to a height part way along the length of the hopper teeth 252 such that the top portion 262 does not extend beyond the hopper teeth 252. The top portion 262 can have a diameter that is smaller than the exit 213 and/or inner cavity 205 such that the top portion 262 is radially offset from the hopper teeth 252.

As shown in the cross-section of FIG. 9C, a gap can extend between the top portion 262 and the hopper teeth 252 of the hopper 233. The lower portion 263, which can include the plurality of teeth 256, of the grinder plate 222 can be offset from the hopper teeth 252 and/or the exit 213 of the hopper 202. Accordingly, a gap (e.g., an axial and/or radial gap) can extend between the lower portion 263, which can include the plurality of teeth 256 of the grinder plate 222 and the hopper teeth 252, exit 213, and/or end of the hopper 202.

In various embodiments, the device 100 is configured such that, as the grinder plate 222 rotates, food can be radially thrown through or to the gap. Such food can be ground between the upper portion 262 and/or lower portion 263 (such as the plurality of teeth 256) and the hopper teeth 252 of the hopper 202. As shown in FIG. 9B, when viewed from the bottom, the hopper teeth 252 of the hopper 202 can extend radially inward to a length that is shorter than that of the plurality of teeth 256 of the grinder plate 222. The hopper teeth 252 of the hopper 202 can extend radially inward such that the hopper teeth 252 do not extend inward beyond the curves defining an end of the gaps 260. The hopper teeth 252 of the hopper 202 can extend radially inward to terminate between the curves defining the innermost portion of the gap 260 and the ends 258 of the adjacent plurality of teeth 256. This configuration can cause food ground against the hopper teeth 252 of the hopper 202 to be slung onto the plurality of teeth 256 and/or through the gaps 260 of the grinder plate 222.

Grinder Housing—FIGS. 10A-10D

Figure 10C:
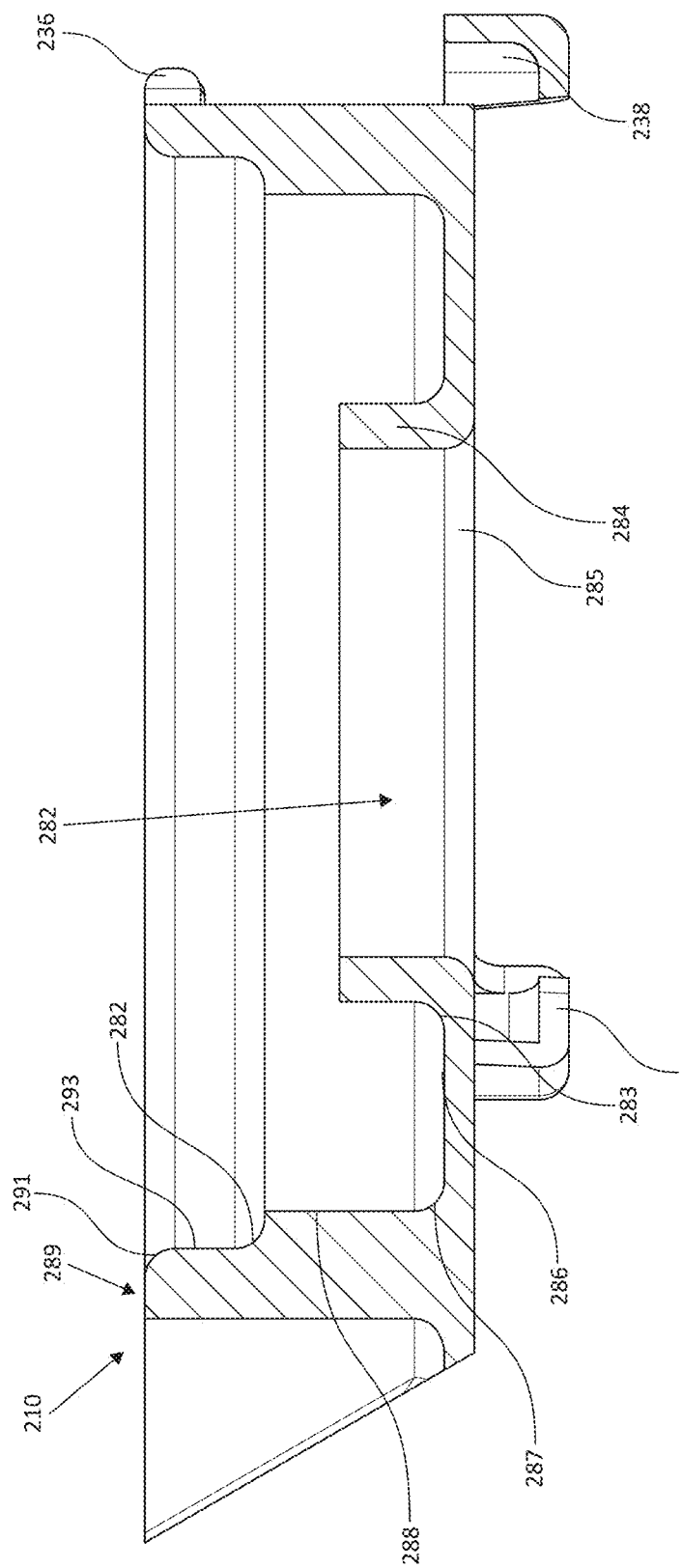

With reference to FIGS. 10A-10D, an example of the grinder housing 210 is shown. The grinder housing 210 can have a side wall 289 extending around a periphery of the grinder housing 210. The side wall 289 can have a circular shape. The side wall 289, as shown in FIG. 10C, can include an inner side wall 288 and/or an outer side wall 293. A curve 282 can transition from the inner sidewall 288 to the outer side wall 293. A top portion of the outer side wall can include a curve 291. The curves 291 and 282 can help to inhibit or prevent food from being trapped in the grinder housing 210 and/or facilitate mating of the grinder housing 210 and the hopper 202.

The grinder housing 210 can have an opening 282 that extends therethrough. The opening 282 can be circular or another suitable shape. The opening 282 can be surrounded by an inner wall 284. The inner wall 282 can circumvent the periphery the opening 282. As shown in FIG. 10C, the inner wall 282 can extend a by length that is less than or equal to a length of the side wall 289. In some embodiments, the inner wall 282 does not extend beyond the inner side wall 288 of the side wall 289. The inner wall 284 can reduce the amount of liquid and/or food that reaches the drive coupling 500 and/or drive tip 600, which can reduce the amount of liquid and/or food that the shaft seal 240 is required to impede. A bottom wall 286 can extend between the inner wall 282 and the side wall 289. A curve 286 can define the transition between the bottom wall 286 and the inner wall 284, which can decrease the likelihood that food be will trapped or stuck, such as compared to a corner at a right angle. A curve 287 can define the transition between the bottom wall 286 and the side wall 289, which can decrease the likelihood that food will be trapped. A curve 285, shown in FIG. 10B, can be formed into the inner wall 284, surrounding the periphery of the opening 282, which can help to guide the drive tip 600 through the opening to interface with the drive coupling 500.

A gap in the side wall 289 can provide a food exit ramp 237. The food exit ramp 237 can be the path through which ground food can exit the grinder housing 210 to the press chamber 30, described in more detail below. The food exit ramp 237 can separate portions of the hopper support flange 212. The hopper support flange 212 can cover an opening 310 of the press chamber 300 as ground food is directed from the food exit ramp 237 and into the press chamber 300 via the opening 310. The hopper support flange 212 can support the grinder assembly 200 to be positioned at an incline, as shown in FIG. 1B.

Figure 10D:
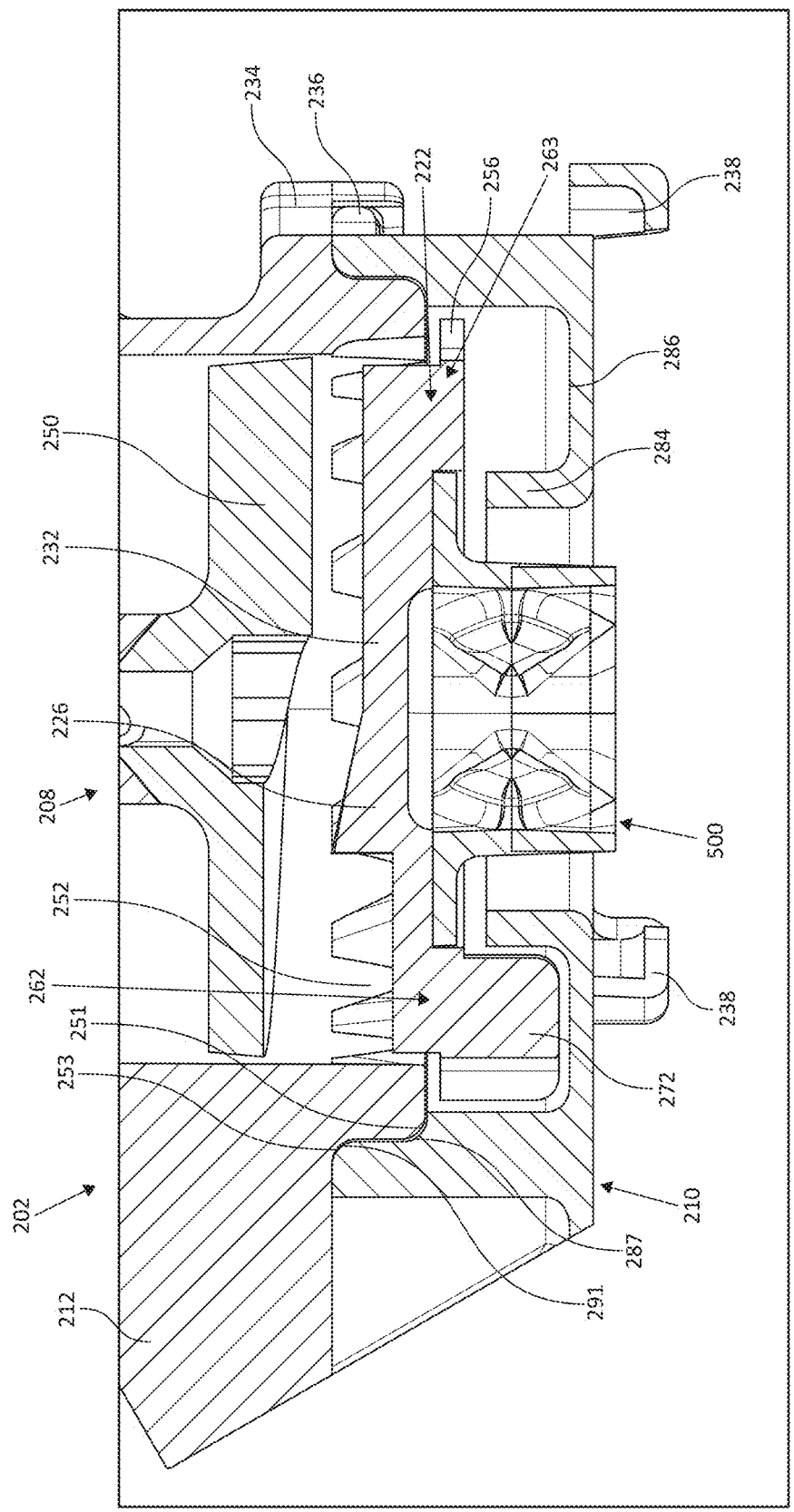

FIG. 10D illustrates a cross-section of the grinder housing 210 coupled to the hopper 202 with the grinder plate 222 and the drive coupling 500 at least partially enclosed therein. As shown, food is pressed down through the hopper 202 to the grinder plate 222 by the pusher 208 which can include a face 250 that is helical. The grinder plate 222 rotates to throw or eject food radially outward (e.g., toward the hopper teeth 252). Food can be cut and/or pushed by the lopper 232. Food can be directed radially outward by the agitator 226. Food can be thrown linearly outward by the agitator. The agitator 226 can disrupt and/or distribute food that is jammed in the hopper 202. The agitator 226 can direct food away from the center of the spinning grinder plate 222, which otherwise could be a dead space for food to collect. Food can be ground, which can include cutting, between the hopper teeth 252 of the hopper 202 and the upper portion 262 of the grinder plate 22. The hopper teeth 252 and/or gravity can direct the food downward toward the lower portion 263, which can include the plurality of teeth 256, of the grinder plate 222. Food can be ground, which can include cutting, between the hopper teeth 252 of the hopper 202 and the plurality of teeth 256 of the grinder plate 222. Food can be thrown to or through the gap(s) between the top portion 262, lower portion 263, and/or plurality of teeth 256 and the hopper teeth 252 of the hopper 202 for grinding. After grinding, food can pass (e.g., fall and/or be slung) to the bottom wall 286 of the grinder housing 210 where the food can be directed, pushed, or swept by the wiper 272 to exit the grinder housing 210 via the food exit ramp 237 to the press chamber 300 for pressing.

The grinder housing 210 can have a plurality of receiving pockets 238 which can be the same as or similar to the plurality of receiving pockets 234. The plurality of receiving pockets 238 can be circumferentially distributed around the grinder housing 210. The plurality of receiving pockets 238 can enable the grinder housing 210 to couple to the motor unit 216. Specifically, the plurality of receiving pockets 238 can receive tabs 240 of the motor unit 216. As described previously, the grinder housing 210 can twist lock onto the motor unit 216. In various embodiments, the motor unit 216 will not drive unless the grinder housing 210 is coupled to the motor unit 216, which can be determined with a magnetic switch or other sensor. The grinder housing 210 can have a plurality of tabs 236 which can enable the grinder housing 210 to couple to the hopper 202 by interacting with the receiving pockets 234 of the hopper 202. The grinder housing 210 can have a plurality of tabs 236 and receiving pockets 238, such as two, three, four, five, or more tabs 236 and/or receiving pockets 238.

As previously mentioned, the grinder housing 210 can have a one or more pivot joint protrusions 224. The pivot joint protrusions 224 can interface with the cover pivot joints 220 of the cover 206 to form the cover joint 214. The cover pivot joints 220 can be coupled to the pivot joint protrusions 224 by sliding the cover pivot joints 220 over the pivot joint protrusions 224. As discussed above, the cover pivot joints 220 enable the cover 206 to be rotated to different positions while remaining coupled to the grinder housing 210.

Drive Tip—FIGS. 11A-11D

FIGS. 11A-11D illustrate an example of the drive tip 600. The drive tip 600 can be interfaced with (e.g., inserted into) the drive coupling 500. The drive tip 600 can engage with the drive coupling 500 when the motor unit 216 is driving such that the drive coupling 500 is retained on the drive tip 600. When the motor unit 216 is not driving, the drive coupling 500 can be removed from the drive tip 600.

Figure 11B:
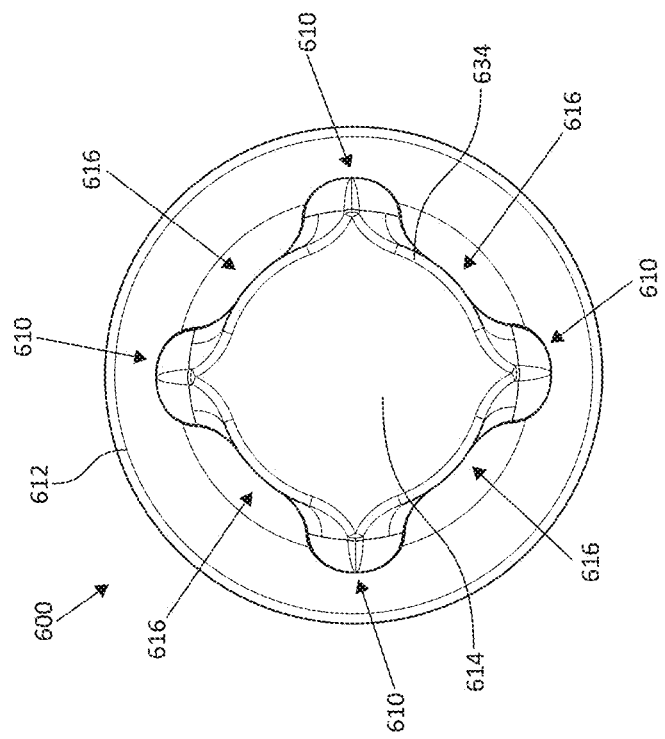
FIGS. 11A-11D illustrate various views of an example drive tip.
Figure 11A:
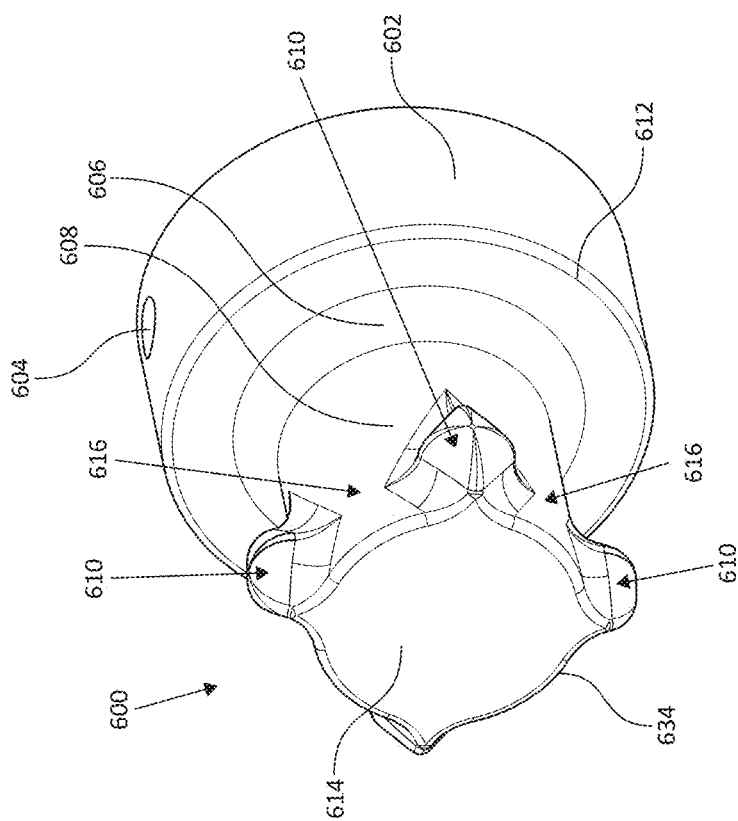
Figure 11D:
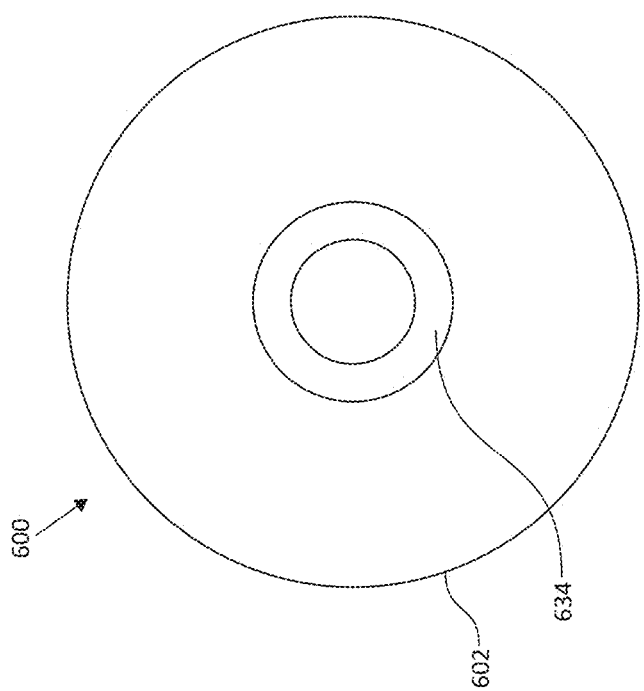
Figure 11C:
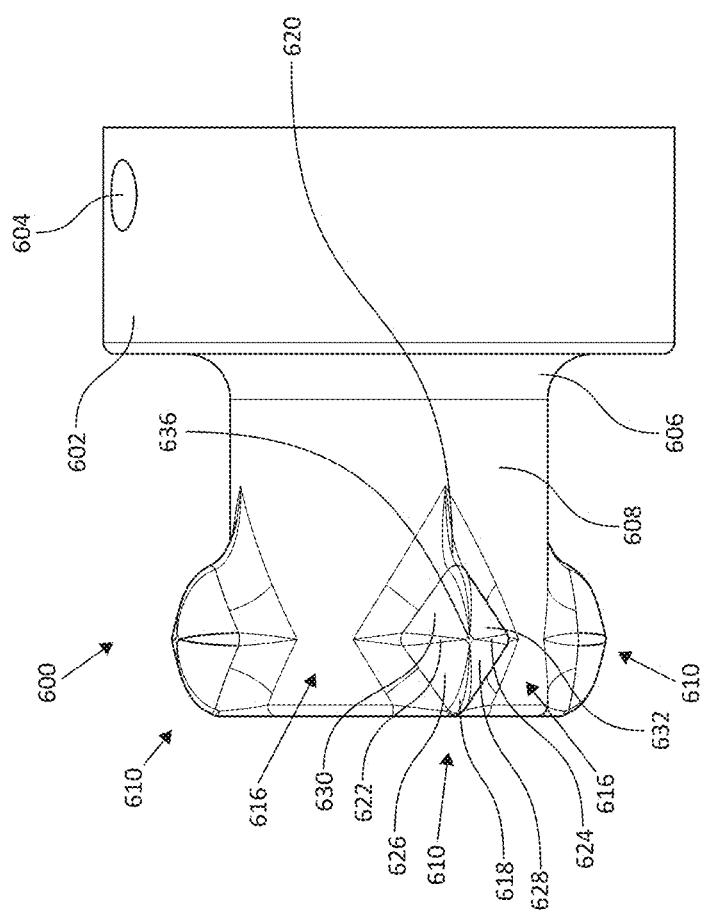

The drive tip 600 can have a plurality of engagement features, such as the drive protrusions 610. The drive protrusions 610 can be circumferentially distributed about the drive tip 600. The drive protrusions 610 can be separated by gaps 616. In some embodiments, four drive protrusions 610 are circumferentially distributed about the drive tip 600. In some embodiments, two, three, five, or more drive protrusions 610 are circumferentially distributed about the drive tip 600. The drive protrusions 610 can be circumferentially distributed on a cylindrical body or shaft 608. The cylindrical body or shaft 608 can have a top face 614 on an end thereof. The top face 614 can be flat or substantially flat with a curved periphery 234. The curved periphery 234 can help guide the drive tip 600 into the drive coupling 500 for coupling. The cylindrical body or shaft 608 can extend from a main cylindrical body 602. The cylindrical body or shaft 608 can have a periphery that is smaller than the main cylindrical body 602. A curve 606 can transition between the cylindrical body or shaft 608 and the main cylindrical body 602. A curve 612 can extend around a leading edge of the main cylindrical body 602. The main cylindrical body 602 can have, as shown in FIG. 11D, a receiving groove (e.g., aperture) 634 that can receive the shaft 228 of the motor unit 216. As shown in FIG. 11C, a groove (e.g., aperture) 604 can extend through the main cylindrical body 602 and into the receiving groove 634 such that a pin, bolt, screw, rod, or other device can extend through the groove 604 to engage with the shaft 228 of the motor unit 216, coupling the drive tip 600 to the shaft 228. In some embodiments, the receiving groove 634 can be sized to press-fit or snap-fit onto the shaft 228. In some embodiments, the shaft 228 can be inserted into the receiving groove 634 and coupled with a threaded connection, adhesive, epoxy, or other attachment method.

As shown in FIG. 11C, each one of the drive protrusions 610 can include a top longitudinal ridge 618, bottom longitudinal ridge 620, first lateral ridge 622, and/or second lateral ridge 624. The top longitudinal ridge 618 and the bottom longitudinal ridge 620 can be positioned on opposing sides of the drive protrusions 610. The first lateral ridge 622 and second lateral ridge 624 can be positioned on opposing sides of the drive protrusions 610. A first top surface 626 can extend between the top longitudinal ridge 618 and the first lateral ridge 622. A second top surface 628 can extend between top longitudinal ridge 618 and the second lateral ridge 624. A first bottom surface 630 can extend between the bottom longitudinal ridge 620 and the first lateral ridge 622. A second bottom surface 632 can extend between the second lateral ridge 624 and the bottom longitudinal ridge 620. The first top surface 626, second top surface 628, first bottom surface 630, and second bottom surface 632 can curve toward the cylindrical body or shaft 608. The first top surface 626, second top surface 628, first bottom surface 630, and second bottom surface 632 can curve away from an apex 636. The first top surface 626 and the second bottom surface 632 can extend in opposing directions. The second top surface 628 and first bottom surface 630 can extend in opposing directions. The top longitudinal ridge 618, bottom longitudinal ridge 620, first lateral ridge 622, and/or second lateral ridge 624 can define a change of curvature direction between the first top surface 626, second top surface 628, first bottom surface 630, and/or second bottom surface 632.

Figure 12:
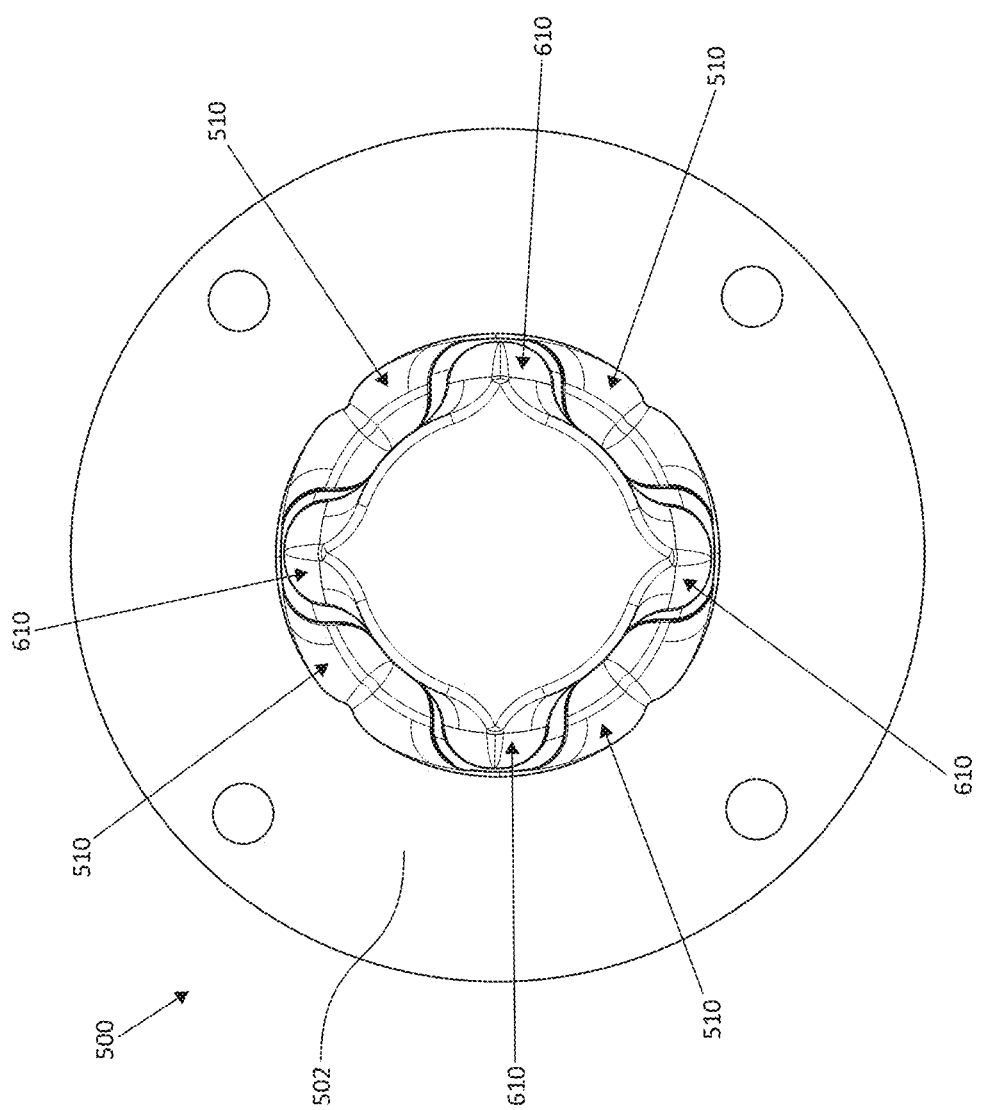
FIG. 12 illustrates the drive tip of FIGS. 11A-11D interfacing with the drive coupling of FIGS. 7A-7C.

The drive tip 600 can be inserted into the drive coupling 500 such that the apex 636 of the drive protrusions 610 of the drive tip 600 extend past the center surface 521 of the grip protrusions or internal protrusions 510 of the drive coupling 500. As shown in FIG. 12, the drive protrusions 610 of the drive tip 600 can extend into the gaps 524 between the grip protrusions or internal protrusions 510 of the drive coupling 500, which can also place the grip protrusions or internal protrusions 510 of the drive coupling 500 in the gaps 616 between the drive protrusions 610 of the drive tip 600. The curved characteristics of the drive protrusions 610 and the grip protrusions or internal protrusions 510 can enable the drive tip 600 to be inserted into the drive coupling 500 without requiring precise alignment. The drive tip 600 and drive coupling 500 do not need to be locked together before driving the motor unit 216 because the motor unit 216 automatically retains the drive coupling 500 on the drive tip 600. This can advantageously allow a user to quickly assemble the drive coupling 500 onto the drive tip 600.

When the motor unit 216 is not driving the drive shaft 228, the drive tip 600 and the drive coupling 500 can be decoupled. When the motor unit 216 is driving the drive shaft 228, the drive protrusions 610 of drive tip 600 can engage with the plurality of grip protrusions or internal protrusions 510 of the drive coupling 500, thereby retaining the drive coupling 500 on the drive tip 600. In some embodiments, the second bottom surface 632 of the drive protrusions 610 of the drive tip 600 can engage with the second top surface 517 of the plurality of grip protrusions or internal protrusions 510 of the drive coupling 500. In certain variants, the first bottom surface 630 of the drive protrusions 610 of the drive tip 600 can engage with the first top surface 516 of the plurality of grip protrusions or internal protrusions 510 of the drive coupling 500.

Figure 13:
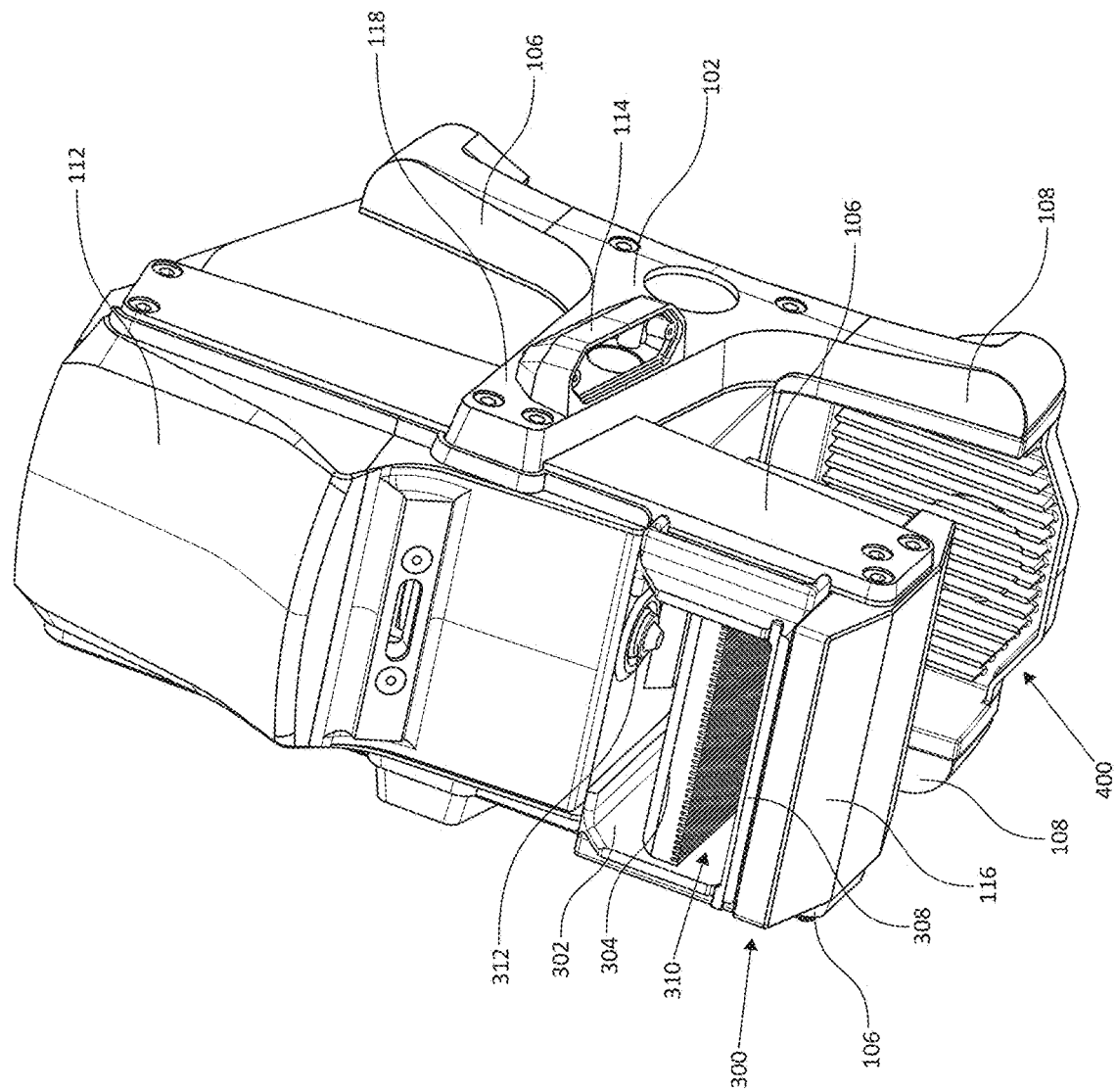
FIGS. 13 and 14 illustrate various views of an example press chamber of the juicing device of FIG. 1.
Figure 14:
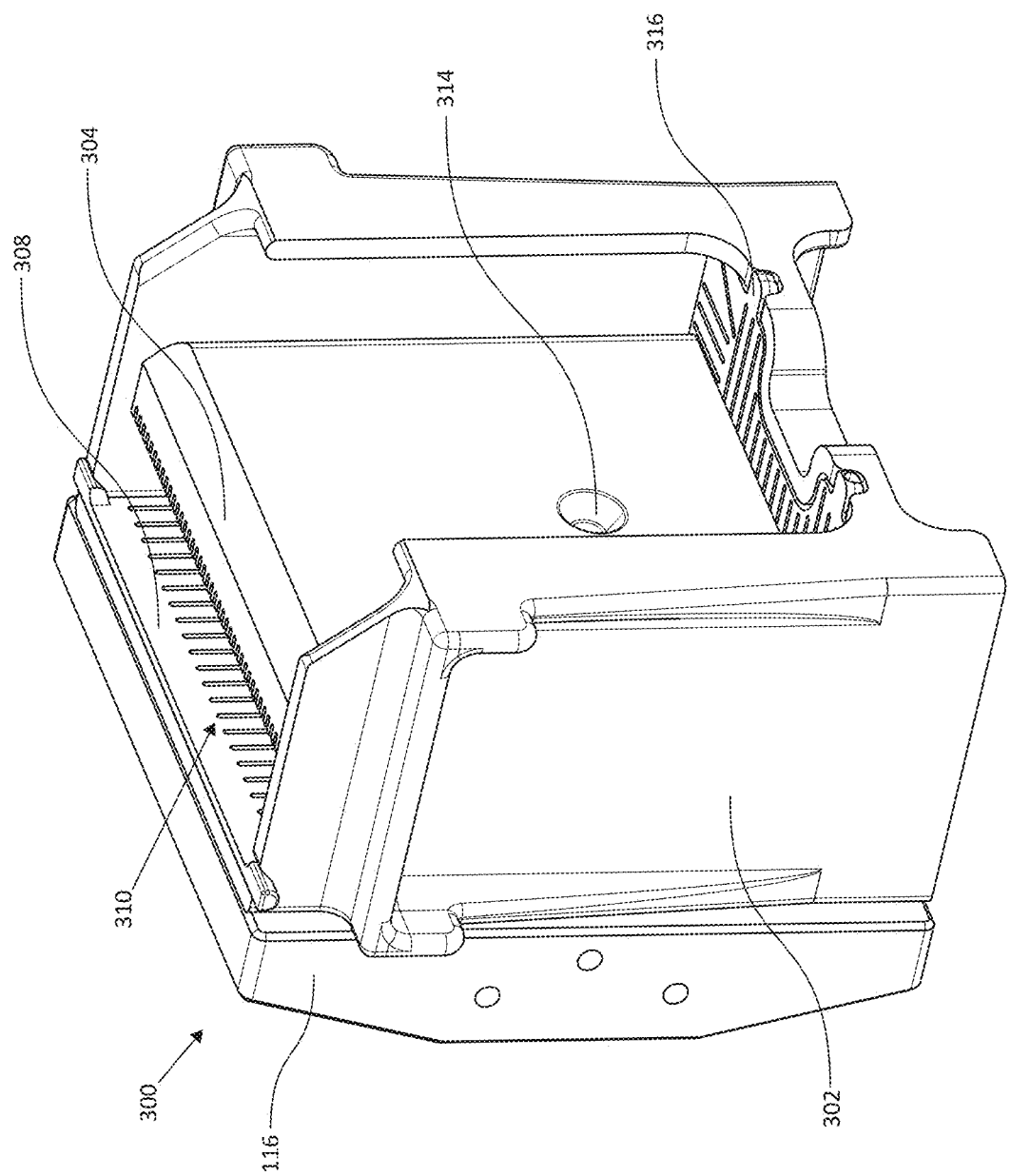

Press Chamber Assembly—FIGS. 13 and 14

FIGS. 13 and 14 illustrate an example of the press chamber 300. The press chamber 300 can be supported by one or more (e.g., a pair of) front arms 106 of the frame 102. The press chamber 300 can be positioned over (e.g. cantilevered above) the drip tray 400. The press chamber 300 can have the opening 310 through which ground food can enter. The opening 310 can provide access to the press box 302.

The press box 302 can support and/or contain a disposable filter, such as a single-use bag. The filter can be placed in the press box 302 through the opening 310. Food exiting the grinder housing 210 can fall into and be held in the filter. The filter can screen out some or all particulate from the juice produced from the food.

A moveable platen 304 can be positioned in the press box 302 and used to press ground food to extract juices. The movable platen 304 can move relative to (e.g., toward and away) the front wall of the press box 302, front comb 308, and/or fixed platen 116. A shaft 312 can move to push the movable platen 302. In some embodiments, the shaft 312 can couple to the movable platen 304 such that the shaft can move the movable platen 304 toward and away from the front wall of the press box 302, front comb 308, and/or fixed platen 116. As shown in FIG. 14, the movable platen 304 can have a recess 314 into which the shaft 312 can extend. This can facilitate a secure connection between the shaft 312 and the movable platen 304.

As shown, on some embodiments, an end of the shaft has a frustoconical section and a flat section (e.g., in a plane generally perpendicular to a longitudinal axis of the shaft 312). The radial size of the frustoconical section can be less than that of the flat section. In certain embodiments, the flat section and the frustoconical section are configured to engage with the movable platen 304. In some embodiments, the frustoconical can aid in automatically aligning the movable platen 304 relative to the shaft 312. In certain implementations, the flat section can provide a stable region in which to engage and apply force on the movable platen 304. This can reduce the chance of the movable platen 304 tilting relative to the shaft 312 during a pressing operation. In various embodiments, the end of the shaft can facilitate positioning and/or maintaining the movable platen 304 in a plane that is generally perpendicular to a longitudinal axis of the shaft 312.

During a pressing operation, the shaft 312 can extend toward the front wall 116, thereby moving the movable platen 304 toward the front wall 116. This reduces the space within the press box, thereby compressing the food inside and extracting juice. The shaft 312 can change speed during the pressing operation. For example, in some variants, the shaft 312 can increase in speed as the shaft 312 moves the movable platen 302 closer to the front wall of the press box 302, front comb 308, and/or fixed platen 116. The shaft 312 can move the movable platen 302 slow enough to preserve juice quality. The shaft 312 can move the movable platen 302 slowly at a beginning portion of a press cycle than at an end portion of the cycle. This can beneficially allow a 'cake' of the food to build up. In some embodiments, the shaft 312 can provide maximum pressing force at the end of press cycle to effectively extract juice. In some embodiments, the juicing device 100 will stop movement of the shaft 312 when the grinder assembly 200 is rotated up, such as shown in FIG. 1A, causing the hopper support flange 212 and/or grinder housing support flange 204 to uncover the opening 310. In some embodiments, the juicing device 100 will restart movement of the shaft 312 when the grinder assembly 200 is rotated down, such as shown in FIG. 1B, causing the hopper support flange 212 and/or grinder housing support flange 204 to cover the opening 310.

The front comb 308 can be positioned between the movable platen 304 and the fixed platen 116. The fixed platen 116 can be coupled to the pair of front arms 106 such that the fixed platen 116 inhibits or prevents movement of the press box 302 as the moveable platen 304 moves toward the front wall of the press box 302, front comb 308, and/or fixed platen 116. Fluid extracted from compression within the press chamber 300 can drip down the front comb 308 (e.g. down the backside of the front comb 308), through a bottom comb 316, and/or toward the drip tray 400. The fluid extracted can be collected by a vessel placed on the drip tray 400. The drip tray 400 can collect spilled fluid or food to enable a user to conveniently and quickly clean after use. The drip tray 400 can be removably secured between the fixed front legs 108 of the frame 10. In various embodiments, the drip tray 400 can be removed from the rest of the device 100 and transported (e.g., to a cleaning area) without requiring movement of the entire device 100.

Press Box—FIGS. 15A and 15B

FIGS. 15A and 15B show an example of the press box 302. The press box 302 has a front box wall 318, opposing box side walls 320, and a bottom box wall 334. The press box 302 can be a single component. In some implementations, the press box has been unitarily formed, such as during an injection molding operation.

As shown, the press box 302 can have one or more (e.g., a pair of) rear retaining flanges 321. The rear retaining flanges 321 can retain the movable platen 304 in the press box 302. The rear retaining flanges 321 can be coupled to ends of the pair of opposing box side walls 320 that are opposite the front box wall 318.

The press box can have features that aid in positioning the press box 302 in the frame 102. In some variants, each of the box side walls 320 can have one or more (e.g., a pair of) rear ramps 330 that gradually extend away from the respective box side wall 320 until reaching a rear tab 326. Each of the box side walls 320 can have one or more (e.g., a pair of) front ramps 328 that gradually extend away from the respective box side wall until reaching a front tab 324. The rear ramps 330 and the front ramps 328 can help to automatically guide the press box 302 between the front support arms 106. The gradual extension of the rear ramps 330 and the front ramps 328 away from the box side walls 320 can help to secure the press box 302 between the front support arms 106 by providing an increasingly tighter fit as the press box 302 is lowered between the front support arms 106.

The front tabs 324 and the rear tabs 326 can support the press box 302 on the front arms 106. For example, in some embodiments, the press box 302 hangs on the arms 106 by the tabs 324, 326 (e.g., by a physical interference between the arms 106 and tabs 324, 326). This can provide a stable support for the press box 302 as well as a providing ready removal of the press box 302 from the frame 102, such as by a user simply lifting the press box 302 off of the arms 106. In certain implementations, the press box 302 is held in the frame 102 by gravity. In some embodiments, the press box 302 is not locked or latched to the frame 102.

As illustrated, the press box 302 can include handles 331, such as an undercut in the area between the tabs 324, 326. This can provide a convenient place for a user to grasp and lift the press box 302 off of the frame 102. As shown, the handles 331 can be offset from a base of the tabs 324, 326, thereby spacing the handles 331 apart from the arm 106 to provide space for a user to grasp the handle when the press box 302 is hanging on the arms 106. The handles 331 can be integral to the press box 302.

In some embodiments, the press box 302 includes a strut 340, such as on each side of the press box 302. As illustrated, the strut 340 can extend between one of the front tabs 324 and one of the rear tabs 326. The strut 340 can increase the rigidity and/or strength of the press box 302. In some implementations, the handle 331 is part of the strut 340.

The bottom wall 334 can include an outlet 338. The bottom box wall 334 can slope and/or be angled downward toward the outlet 338. The outlet 338 can have different peripheries, which can include circular, polygonal, irregular, and/or others. A curve 336 can define the transition between the front box wall 318 and the bottom box wall 334. The curve 336 can define the transition between the box side walls 320 and the bottom box wall 334. The curve 336 can define the transition between the side box walls 320 and the front box wall 318. The curves 336 can help to inhibit or prevent food or liquid from being stuck in the press box 302.

The press box 302 can include features to engage with other features of the device 100. For example, the box side walls 320 can each have a groove 322 proximate the front box wall 318 that can receive a portion of the front comb 308. In some embodiments, the press box 302 includes one or more (e.g., a pair of) notches 332 that can receive a portion of the bottom comb 316. The notches 332 can aid in properly positioning and/or securing (e.g. orienting) the bottom comb 316 in the press box 302, as described herein.

Figure 16B:
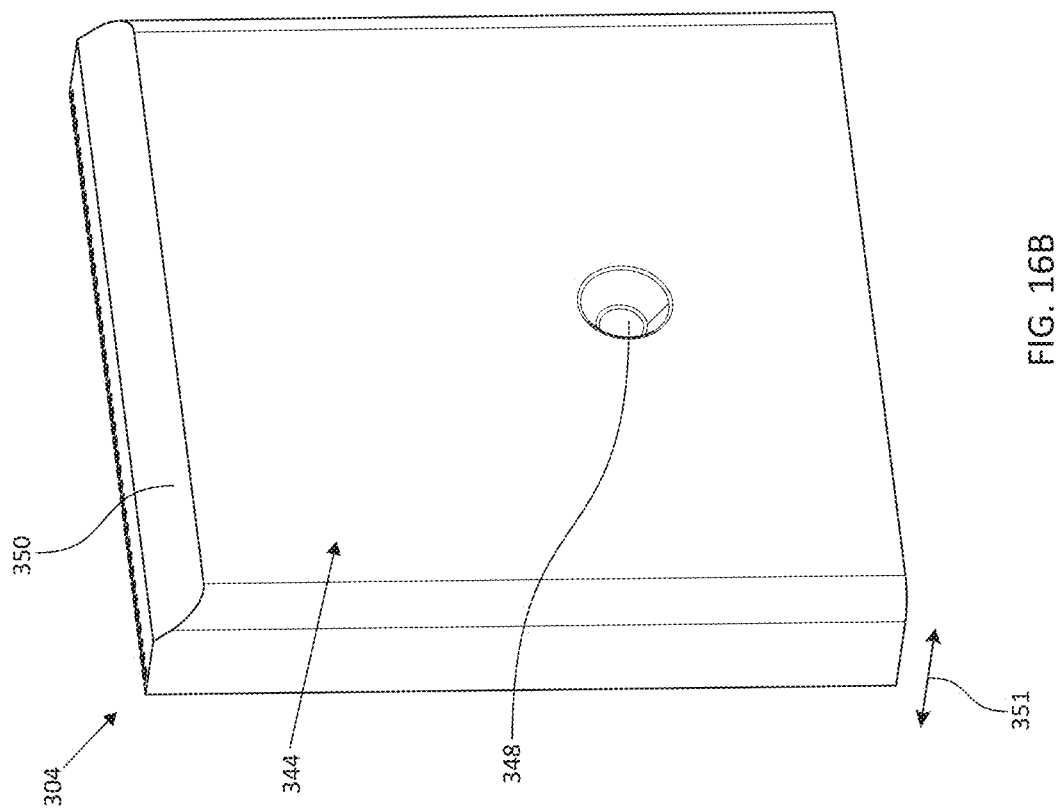
FIGS. 16A and 16B illustrate various views of a movable platen.
Figure 16A:
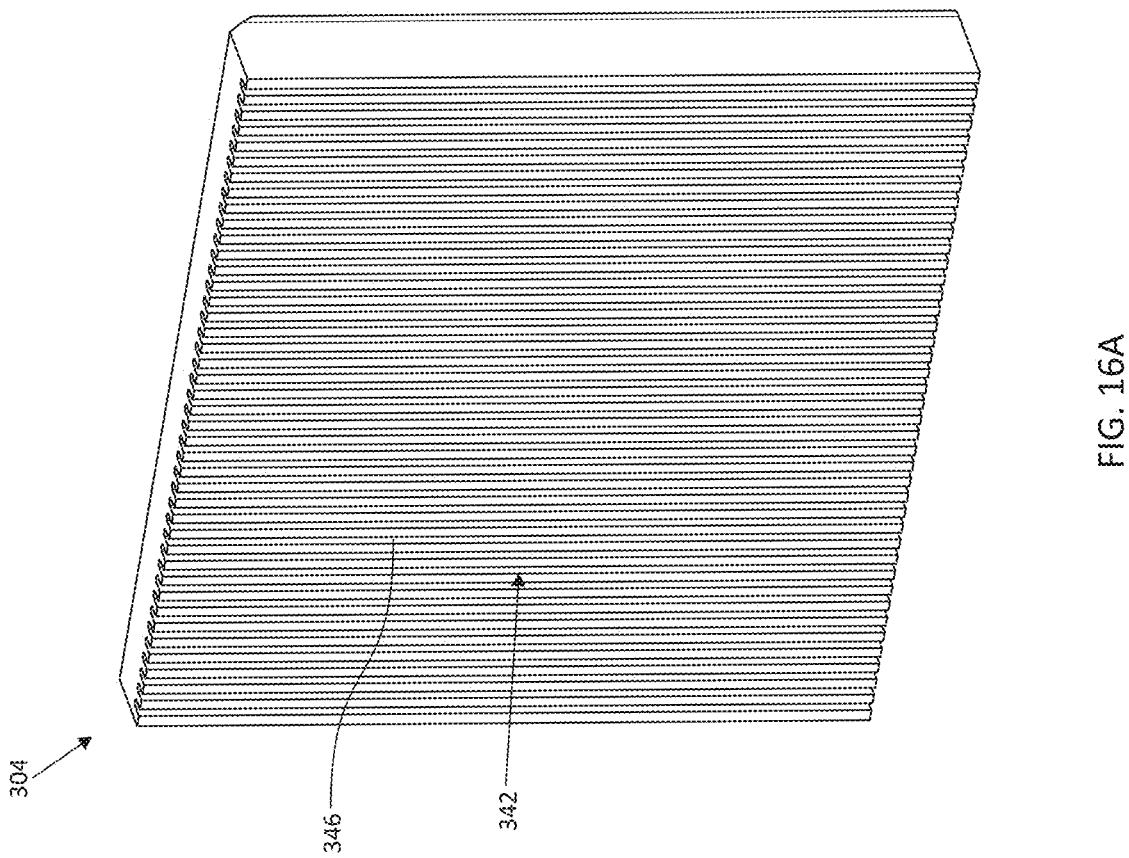

Movable Platen—FIGS. 16A and 16B

FIGS. 16A and 16B show an example of the movable platen 304. The movable platen 304 can have a front face 342 and a back face 344. The front face 342 can have a plurality of elongate grooves 346. The elongate grooves 346 can direct liquid to flow toward the bottom box wall 334. In certain implementations, the elongate grooves 346 can allow for drainage of the extracted juice. Other drainage features providing a fluid pathway can be implemented. The front face 342 can have a width to fit within the press box 302, such that the sides of the front face 342 are proximate the opposing side walls 320 of the press box. The front face 342 can be larger than the back face 344. A curve 350 can at least partially transition between the front face 342 and the back face 344. The movable platen 304 can have a thickness 351 that reduces the risk that the movable platen 304 will tip during pressing and/or movement. For example, the movable platen 304 can have a thickness of at least about ⅛ of the width and/or height of the movable platen 304.

The back face 344 can have an shaft engagement feature, such as a recess 348 that can abut with and/or receive the shaft 312. The recess 348 can have a shape that corresponds to the shape of the end of the shaft 312. For example, the recess 348 can have a frustoconical portion and/or and a flat portion. In some embodiments, the flat portion of the end of the shaft 312 is not received in the recess 348 and/or abuts with a generally planal portion of the back face 344. In certain implementations, the recess 348 is centrally located on the back face 344. In some variants, the recess 348 is offset from a central location on the back face 344. For example, as illustrated, the recess 348 can be closer to a bottom of the movable platen 304 than to a top of the movable platen 304. In some implementations, the recess 348 is spaced apart from the bottom of the movable platen 304 by a distance of less than or equal to about ⅓ of the height of the movable platen 304. In a configuration, the back face 344 can have rearwardly extending conical projections (e.g., pins), similar to the movable platen 1304 described below. The rearwardly extending conical projections can pierce a portion of a disposable filter (e.g., filter bag) placed in the press chamber 300 to secure the disposable filter. The hopper support flange 212 can secure (e.g., with friction, pinching) a portion of the disposable filter placed in the press chamber 300 by positioning the portion of the disposable filter between the hopper support flange 212 and the fixed platen 116. The hopper support flange 212 and/or the rearwardly extending conical projections can be used to secure the front and rear of the disposable filter. There can be a gap between the movable platen 304 and the hopper support flange 212 and/or grinder housing support flange 204, making the use of the conical projections advantageous for securing the disposable filter.

Front Comb—FIGS. 17A-17C

With reference to FIGS. 17A-17C, an example of the front comb 308 is shown. The front comb 308 can be sized to fit within the press box 302. The front comb 308 can have one or more rods or dowels 352, as shown in FIG. 17A. The rods or dowels 352 can extend in opposing directions. The rods or dowels 352 can be placed into the notches or grooves 322 of the box side walls 320 such that the front comb 308 is secured in place. The front comb 308 can be positioned proximate the front box wall 318.

The front comb 308 can have a plurality of elongate fluid passages (e.g., grooves or through-apertures) 356 separated by elongate bars 354. In some embodiments, the elongate fluid passages 356 can allow for juice drainage. Other drainage features providing a fluid pathway can be implemented. The elongate bars 354 and/or elongate fluid passages 356 can direct fluid to flow toward the bottom box wall 334 during pressing. The elongate fluid passages 356 can be generally vertical when the comb 308 is installed in the press box 302. The elongate fluid passages 356 can provide an easy uninhibited path out by gravity and/or liquid pressure.

The front comb 308 can include a panel 358 that extends between the elongate bars 354. The panel 358 can help to maintain the structural integrity of the front comb 308. A top portion of the panel 358 can be a curve 360, which can reduce the risk that food will get stuck in the front comb 308. The curve 360 can make the front comb 308 easier to clean and/or comply with regulatory requirements.

Figure 18B:
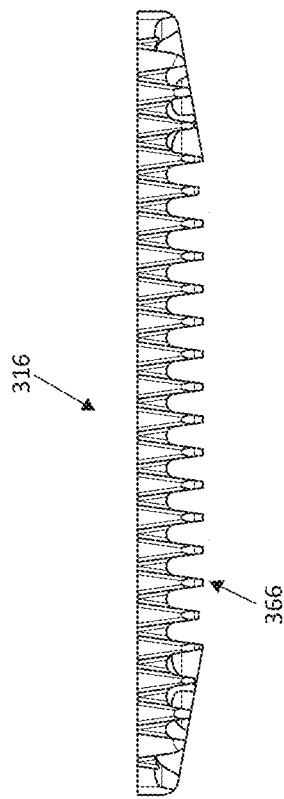
FIGS. 18A-18C illustrate various views of a bottom comb.
Figure 18C:
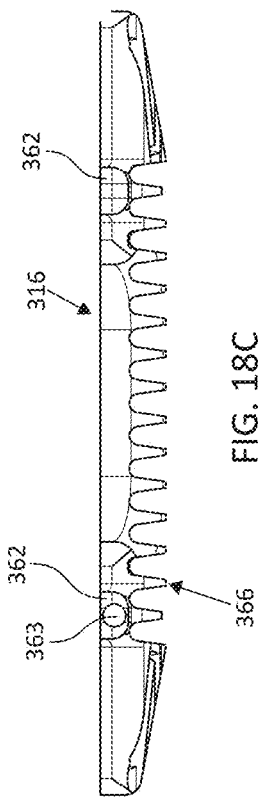
Figure 18A:
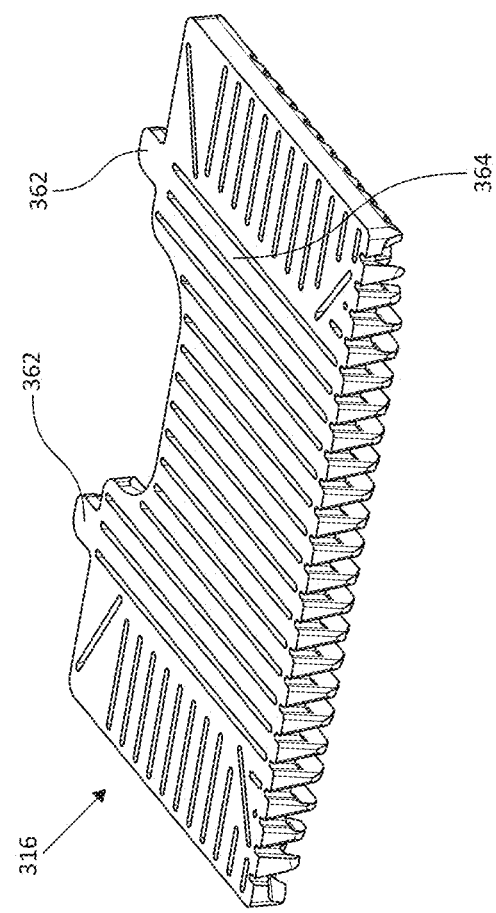

Bottom Comb—FIGS. 18A-18C

An example of the bottom comb 316 is shown in FIGS. 18A-18C. The bottom comb 316 can be sized to fit in the press box 302. The bottom comb 316 can have one or more tabs 362 that can be received into the notches 332 of the press box 302, thereby securing the bottom comb 316 in the press box 302. The tabs 362 can aid in positioning and/or securing the bottom comb 316 in the press box 302. The bottom comb 316 can include a plurality of fluid passages (e.g., grooves or through-apertures) 364 through which fluid can drain to the outlet 338 in the bottom box wall 334 of the press box 302. The tabs 362 can aid in the removal of the bottom comb 316 from press box 302. In some embodiments, a user can grasp one or more of the tabs 362 to remove the bottom comb 316. One of the tabs 362 can include a magnet 363, shown in FIG. 18C, that can be used to operate a magnetic switch. The magnet 363 can ensure that the bottom comb 316 is correctly installed (e.g., oriented) into the press chamber box 302, such that the motor unit 216 will not drive and/or shaft 312 will not be actuated by the juicing device 100, unless the tab 362 with the magnet 363 is placed into the correct notch 332. The bottom portion 366 of the bottom comb 316 can be configured to engage (e.g., rest on) the bottom box wall 334. The bottom portion 366 of the bottom comb 316 can extend to engage with the sloped and/or angled bottom box wall 334. For example, the bottom portion 366 can have a slope that corresponds to the slope of the bottom box wall 334 of the press box 302. In some implementations, the bottom comb 316 is a separate component from and/or does not directly connect to the front comb 308.

Figure 19:
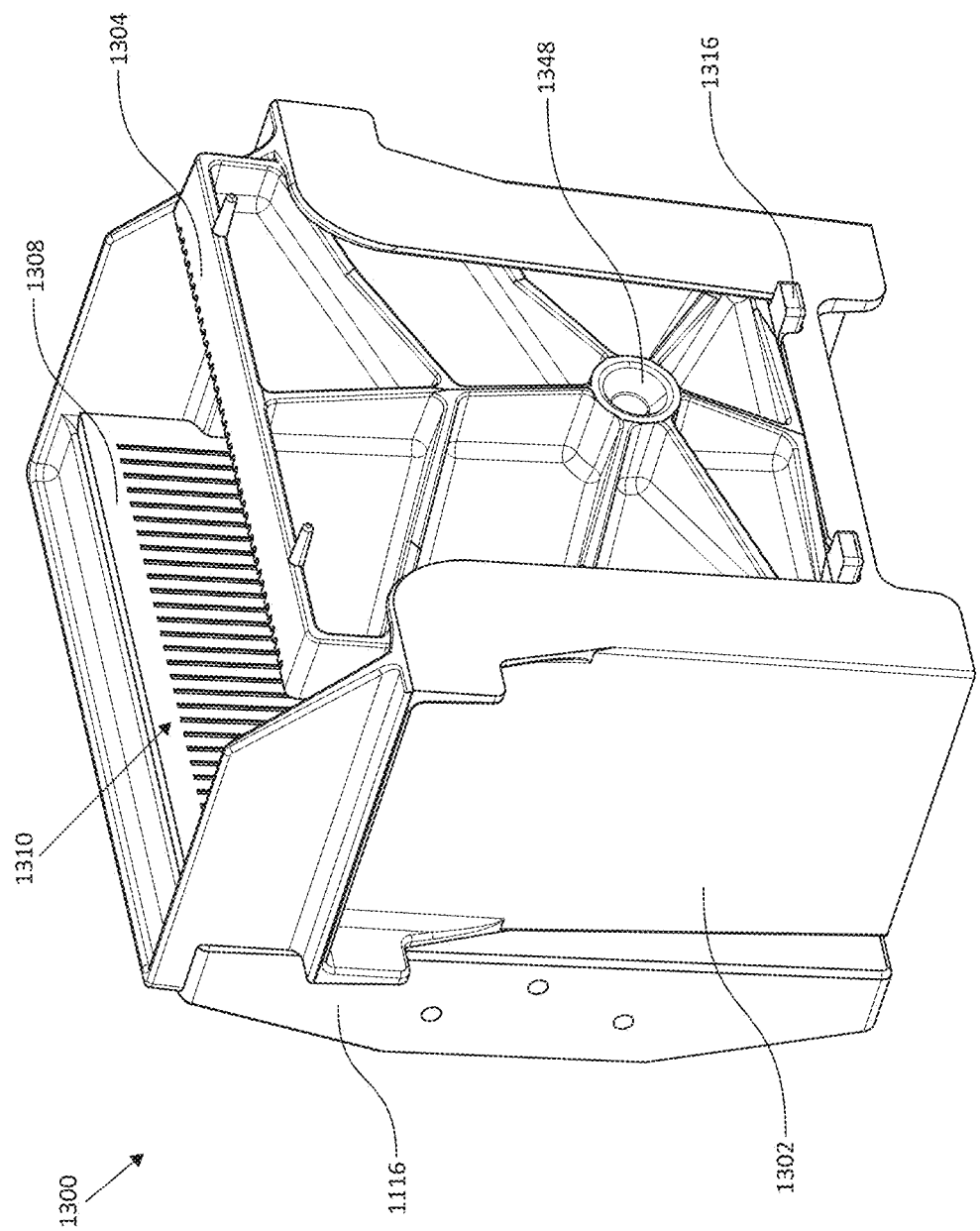
FIG. 19 illustrates another example press chamber of the juicing device of FIG. 1.

Another Press Chamber Assembly—FIG. 19

With reference to FIG. 19, another example of a press chamber 1300 is illustrated. The press chamber 1300 can include any of the features of the press chamber 300. For example, the features of press chamber 1300 that are similarly numbered to the features of press chamber 300 can be the same or similar. The press chamber 1300 can be used in the juicing device 100.

The press chamber 1300 can be supported by one or more front arms 106 of the frame 102 such that the press chamber 300 is positioned over the drip tray 400. The press chamber 1300 can have an opening 1310 through which ground food can enter. The opening 1310 can provide access to a press box 1302. A disposable filter, such as a single-use bag, can be placed through the opening 1310 and into the press box 1302 such that food exiting the grinder housing 210 is directed into the disposable filter or single-use bag.

A moveable platen 1304 can be positioned in the press box 302 and used to press ground food to extract juices. The movable platen 1304 can move toward a front wall of the press box 1302, a front comb 1308, and/or a fixed platen 1116. The movable platen 1304 can have a recess 1348 that mates with the shaft 312, such as by receiving the shaft 312.

The front comb 1308 can be positioned between the movable platen 1304 and the fixed platen 1116. During a pressing operation, the moveable platen 1304 is moved toward the front wall of the press box 1302, front comb 1308, and/or fixed platen 1116, thereby compressing the food in the press box and extracting juice. Fluid extracted from compression within the press chamber 1300 can drip down through the bottom comb 1316 and toward a drip tray 400. The fluid extracted can be collected by a vessel placed on the drip tray 400. In some embodiments, the juicing device 100 will stop movement of the shaft 312 when the grinder assembly 200 is rotated up, such as shown in FIG. 1A, causing the hopper support flanges 212 and/or grinder housing support flange 204 to uncover the opening 1310. In some embodiments, the juicing device 100 will restart movement of the shaft 312 when the grinder assembly 200 is rotated down, such as shown in FIG. 1B, causing the hopper support flanges 212 and/or grinder housing support flange 204 to cover the opening 1310.

Another Press Box—FIGS. 20A and 20B

FIGS. 20A and 20B illustrate an example of the press box 1302 of the press chamber 1300. The press box 1302 can include any of the features of the press box 302. For example, the features of press box 1302 that are similarly numbered to the features of press box 302 can be the same or similar.

The press box 1302 can include a front box wall 1318, one or more opposing box side walls 1320, and a bottom box wall 1334. The press box 1302 can have one or more rear retaining flanges 1321. The rear retaining flanges 1321 can help to retain the movable platen 1304 in the press box 1304. The rear retaining flanges 1321 can be coupled to ends of the pair of opposing box side walls 1320 that are opposite the front box wall 1318. The box side walls 1320 can each have a rail or ridge 1370. The rail or ridge 1370 can support the front comb 1304 and/or the movable platen 1340. The movable platen 1340 can slide along the rail or ridge 1370 as the movable platen 1340 moves towards and away from the front wall of the press box 1302, front comb 1308, and/or fixed platen 1116.

Each of the box side walls 1320 can have one or more rear ramps 1330 that gradually extend away from the respective box side wall 1320 until reaching a rear tab 1326. Each of the box side walls 1320 can have one or more front ramps 1328 that gradually extend away from the respective box side wall 1320 until reaching a front tab 1324. The rear ramps 1330 and the front ramps 1328 can help a user position the press box 1302 between the front support arms 106. The rear ramps 1330 and the front ramps 1328 can start at a higher position on the box side walls 1320 compared to the rear ramps 1330 and front ramps 1328. The gradual extension of the rear ramps 1330 and the front ramps 1328 away from the box side walls 1320 can help to secure the press box 1302 between the front support arms 106 by providing an increasingly tighter fit as the press box 1302 is lowered between the front support arms 106.

The front tabs 1324 and the rear tabs 1326 can support the press box 1302 on the front arms 106. A strut 1340 can extend between each of the pair of front tabs 1324 and the pair of rear tabs 1326, which can provide rigidity and/or strength to the press box 1302. The strut 1340 can form a handle for gasping by a user.

The bottom box wall 1334 can slope and/or be angled downward toward an outlet 1338. The outlet 1338 can be an oblong shape. A curve 1336 can define the transition between the front box wall 1318 and the bottom box wall 1334. A curve 1336 can define the transition between the box side walls 1320 and the bottom box wall 1334. A curve 1336 can define the transition between the box side walls 1320 and the front box wall 1318. The curve 1336 can help to inhibit or prevent food or liquid from being stuck in the press box 1302.

The press box 1302 can have one or more notches 1332 that can receive a portion of the bottom comb 316. The one or more notches notches 1332 can facilitate properly positioning and/or securing the bottom comb 1316 in the press box 1302, as described herein. The notches 1332 can be positioned proximate the rear retaining flanges 1321 such that the rear retaining flanges 1321 can guide the bottom comb 1316 into position.

The press box 1302 can have a flange 1368. The flange 1368 can extend horizontally to overlap the fixed platen 1116, as shown in FIG. 19. As illustrated, the flange 1368 can have a generally horizontal portion (e.g., a shelf) and a generally vertical portion (e.g., a lip) that extends upwardly from the generally horizontal portion. The flange 1368 can be configured to contain juice that is emitted upward and/or toward a front of the press box 1302 and/or to stop juice from spilling between the press box 1302 and the fixed platen 116, which would cause a mess and require additional cleaning.

In various embodiments, the press box 1302 comprises a single integral unit. For example, the press box 1302 can be formed during an injection molding operation. In several embodiments, the press box 1302 is made of plastic (e.g., polypropylene, high density polyethylene, etc.) or metal (e.g., stainless steel, aluminum, etc.).

Movable Platen—FIGS. 21A-21C

With reference to FIGS. 21A-21C, an example of the movable platen 1304 of the press chamber 1300 is shown. The moveable platen 1304 can be injection molded. The movable platen 1304 can include any of the features of the movable platen 304. For example, the features of movable platen 1304 that are similarly numbered to the features of movable platen 304 can be the same or similar.

The movable platen 1304 can have a front face 1342 and a back face 1344. The front face 1342 can have a plurality of elongate grooves 1346. The elongate grooves 1346 can direct liquid to flow toward the bottom box wall 1334. In some embodiments, the elongate grooves (e.g., fluid passageways) 1346 can facilitate drainage of the extracted juice. The elongate grooves 1342 can be vertical, which can direct fluid downward with gravity and/or fluid pressure. The front face 1342 can have a width to fit within the press box 302, such that the sides of the front face 1342 are proximate the opposing side walls 320 of the press box.

The movable platen 1304 can have one or more flanges 1372. The flanges 1372 can be positioned on opposing sides of the movable platen 1304, such as on opposing top corners. The pair of flanges 1372 can support the movable platen 1304 on the rails or ridges 1370 of the press box 1302 as the movable platen 1304 moves. The pair of flanges 1372 can slide along the rails or ridges 1370 of the press box 1302. In some implementations, the movable platen 1304 hangs on the flanges 1372. In certain variants, the bottom of the movable platen 1304 is spaced apart from the bottom wall 1334 of the press box 1302 and/or bottom comb 1316.

As shown, the back face 1344 can include ribs 1376. The ribs 1376 can increase the strength and/or rigidity of the movable platen 1304. In some embodiments, ribs 1376 allow for a reduced thickness of and/or a decrease in the total amount of material used in forming the movable platen 1304. As shown, in certain implementations, a plurality of the ribs 1376 intersect at the recess 1348. The recess 1348 can receive the end of the shaft 312.

As illustrated, the movable platen 1304 can include a peripheral rib 1377 that extends around a periphery of the back face 1344. As shown in FIG. 21C, the peripheral rib 1377 and/or the movable platen 1304 can have a varying thickness. For example, the peripheral rib 1377 and/or the moveable platen 1304 can be thinner at the bottom and thicker at the top. This taper can facilitate injection molding. In some embodiments, the taper can enable the movable platen 1304 to sit correctly in the in the press box 1302 for movement and/or engagement with the front comb 130 and/or fixed platen 116. The angles of the fixed platen 116 and front comb 1308, relative to the movable platen 1304, should facilitate a balanced force when the shaft 314 presses the movable platen 1304 to the front comb 1308 and fixed platen 116.

The front face 1342 or the peripheral rib 1377 can be angled and/or tapered. For example, the front face 1342 or the peripheral rib 1377 can be angled toward the back face 1344, such by at least about 5°. In some implementations, the thickness of the front face 1342 or the peripheral rib 1377 changes as a function of the location along the height of the movable platen 1304.

As illustrated, a top of the movable platen 1304 can include rearwardly extending conical projections 1374. In a configuration, the back face 1344 can have rearwardly extending conical projections 1374 (e.g., pins). The rearwardly extending conical projections 1374 can pierce a portion of a disposable filter (e.g., filter bag) placed in the press chamber 1300 to secure the disposable filter. The hopper support flange 212 can secure (e.g., with friction, pinching) a portion of the disposable filter placed in the press chamber 300 by positioning the portion of the disposable filter between the hopper support flange 212 and the fixed platen 1116. The hopper support flange 212 and/or the rearwardly extending conical projections 1374 can be used to secure the front and rear of the disposable filter. There can be a gap between the movable platen 1304 and the hopper support flange 212 and/or grinder housing support flange 204, making the use of the conical projections 1374 advantageous for securing the rear of the disposable filter.

Figure 22C:
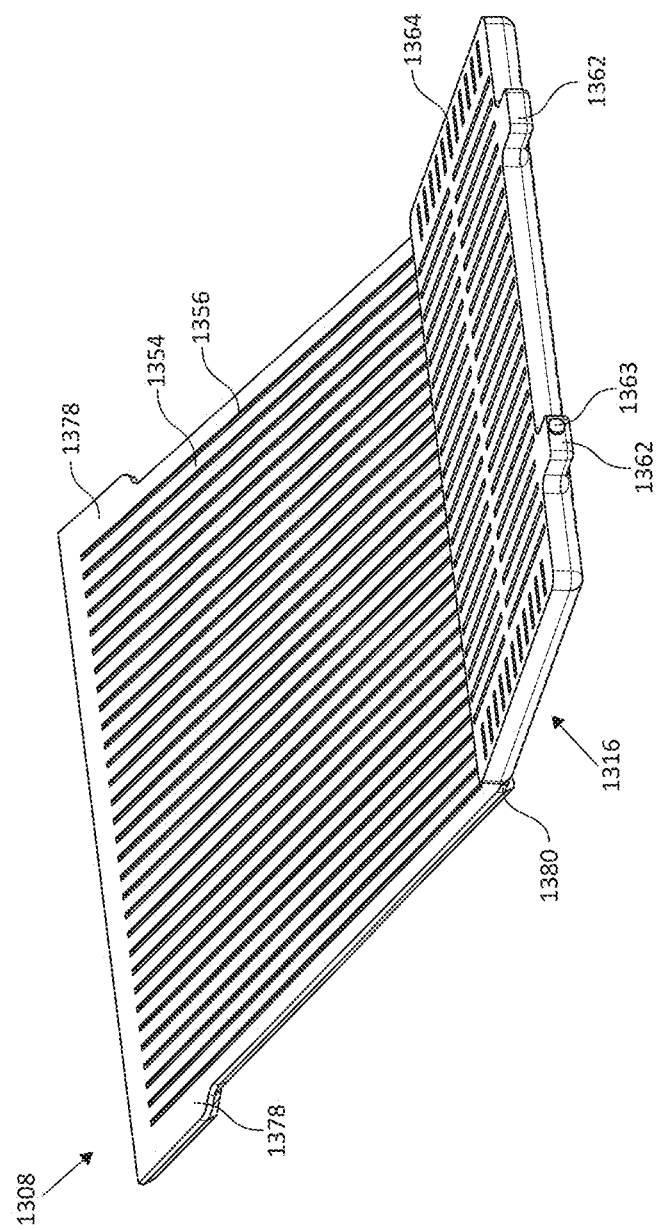

Front Comb and Bottom Comb—FIGS. 22A-22C

FIGS. 22A-22C show examples of the front comb 1308 and bottom comb 1316. The front comb 1308 and bottom comb 1316 can include any of the features of the front comb 308 and bottom comb 316, respectfully. The features of front comb 1308 and bottom comb 1316 that are similarly numbered to the features of front comb 308 and bottom comb 316 can be the same or similar.

The front comb 1308 can be sized to fit within the press box 1302. The front comb 1308 can be positioned proximate the front box wall 1318. The front comb 1308 can have one or more flanges 1378. The flanges 1378 can be positioned on opposing sides of the front comb 1308. The flanges 1378 can support the front comb 1308 on the rails or ridges 1370 of the press box 1302. For example, the front comb 1308 can hang on the flanges 1378.

The front comb 308 can have a plurality of elongate fluid passages (e.g., grooves or through-apertures) 1356. The elongate fluid passages 1356 can be separated by elongate bars 1354. The elongate fluid passages 1356 can facilitate drainage of juice extracted during pressing. The elongate fluid passages 1356 can be vertically, such that gravity and fluid pressure direct the extracted juice downward toward the bottom comb 1316. The elongate bars 1354 and/or elongate fluid passages 1356 can direct fluid to flow toward the bottom box wall 1334 during compression.

The bottom comb 1316 can be sized to fit in the press box 1302. The bottom comb 1316 can have one or more tabs 1362 that can be received into the grooves 1332 of the press box 1302, thereby securing the bottom comb 1316 in place. In some embodiments, the tabs 1362 can help ensure that the bottom comb 1316 is correctly positioned in the press box 1302. The tabs 1362 can aid in the removal of the bottom comb 1316 from press box 302. In some embodiments, a user can grasp one or more of the tabs 1362 to remove the bottom comb 1316. One of the tabs 1362 can include a magnet 1363, shown in FIG. 18C, that can be used to operate a magnetic switch. The magnet 1363 can ensure that the bottom comb 1316 is correctly installed (e.g., oriented) into the press chamber box 1302, such that the motor unit 216 will not drive and/or the shaft 312 will not be actuated by the juicing device 100, unless the tab 1362 with the magnet 1363 is placed into the correct notch 1332. The bottom comb 1316 can include a plurality of fluid passages (e.g., grooves or through-apertures) 1364 through which fluid can drain to the outlet 1338 of the bottom box wall 1334. The bottom portion 1366 of the bottom comb 1316 can be configured to engage the bottom box wall 1334. The bottom portion 1366 of the bottom comb 1316 can extend to engage with the sloped and/or angled bottom box wall 334.

The combs 1308, 1316 can be abutted and/or connected (e.g., directly). In some implementations, the front comb 1308 is coupled to the bottom comb 1316 via a hinge 1380. In a configuration, the front comb 1308 and bottom comb 1316 are rigidly connected together. The hinge 1380 can be a living hinge, such as a thin fin of material that extends between the front comb 1308 and the bottom comb 1316. The hinge 1380 can enable the front comb 1308 and the bottom comb 1316 to move (e.g., rotate) to different positions relative to each other, such as is shown in FIGS. 22A and 21C. In some implementations, during a pressing operation in which the combs 1308, 1316 are positioned in the press box 1302, the angle between the combs 1308, 1316 is approximately 90°, at least about 70° and/or less than or equal to about 110°, or otherwise. A front comb 1308 and bottom comb 1316 that couple together, such as with a hinge, can aid in correctly positioning the front comb 1308 and the bottom comb 1316 in the press box chamber 1302, reduces the number of separate components, and/or can facilitate cleaning.

Figure 23:
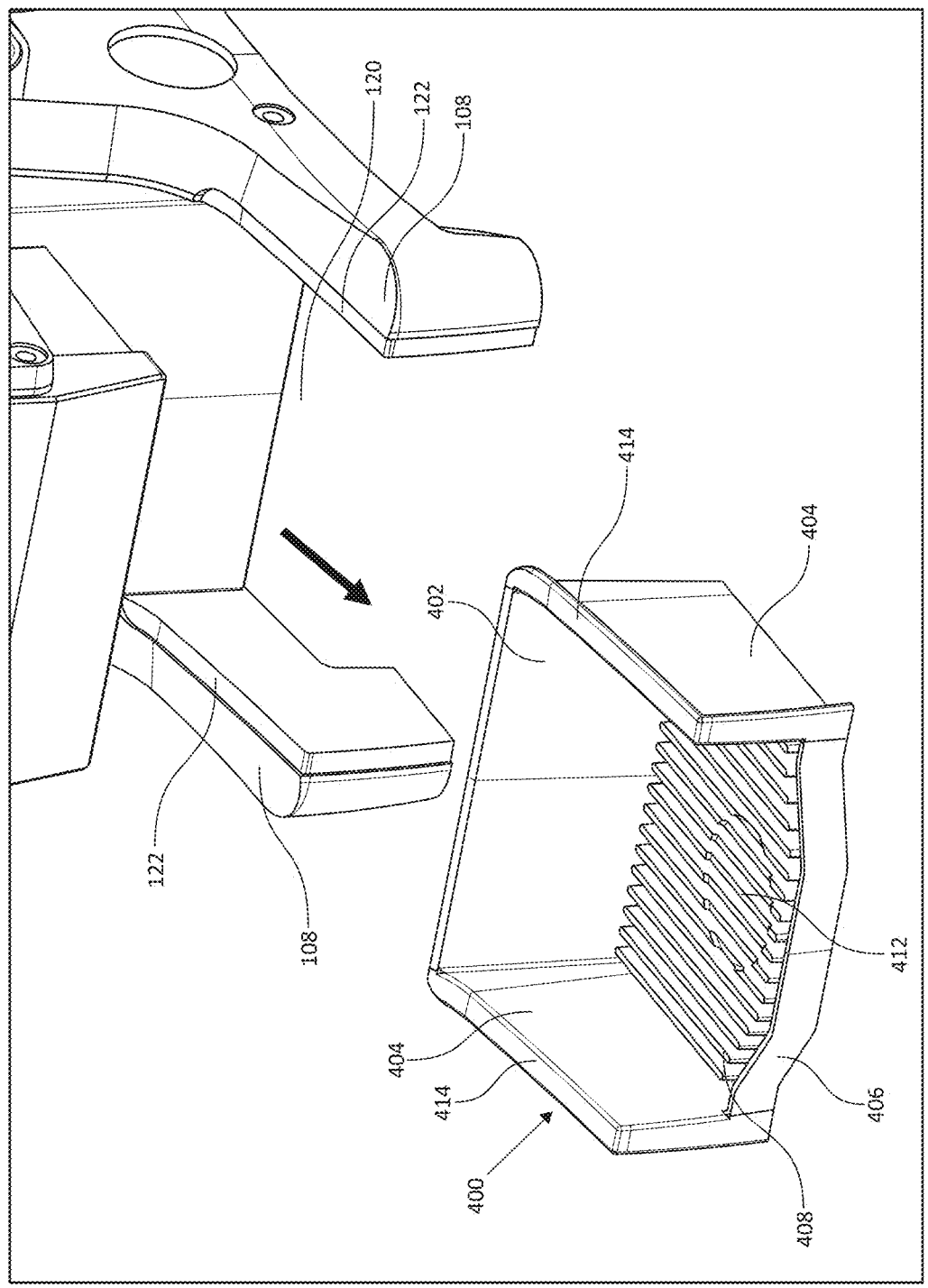
FIG. 23 illustrates an example of a drip tray of the juicing device of FIG. 1.

Drip Tray—FIG. 23

FIG. 23 illustrates an example of the drip tray 400. The drip tray 400 can have a rear wall 402, opposing side walls 404, and a bottom wall 406. The bottom wall 406 can extend between the rear wall 402, opposing side walls 404, and the bottom wall 406. The bottom wall 406 can include a plurality of ribs 408. The plurality of ribs 408 can extend generally vertically up from the bottom wall 406 such that liquids spilled into the drip dray flow between the ribs 408. The side walls 404 can have flanges 414.

The drip tray 400 can include an indicator of the outlet from the press box 302. The recess or indicator can denote where to place a vessel to collect liquid draining from the press box 302. As shown, in some embodiments the indicator comprises a recessed region 412 in the ribs 408. The recessed region 412 can help to support and/or secure the vessel. The recessed region 412 can be circular and/or other shapes.

The drip tray 400 can be retained in a receiving region 120 of the juicing device 100. The receiving region 120 can extend between the front legs 108. The front legs 108 can have rails 122 that can receive the flanges 414. For example, the flanges 414 can slide on the rails 122. The drip tray 400 can collect liquid and/or food that spills during the juicing process, thereby reducing mess. The drip tray 400 can be configured to be readily removed from the rest of the device 100. In certain variants, the drip tray 400 is sized to receive a bottom portion of the press chamber 300 and/or press box 302. This can enable a user to place the press chamber 300 and/or press box 302 in the drip tray 400 for conveniently transporting such components together, such as to a cleaning area.

Figure 24:
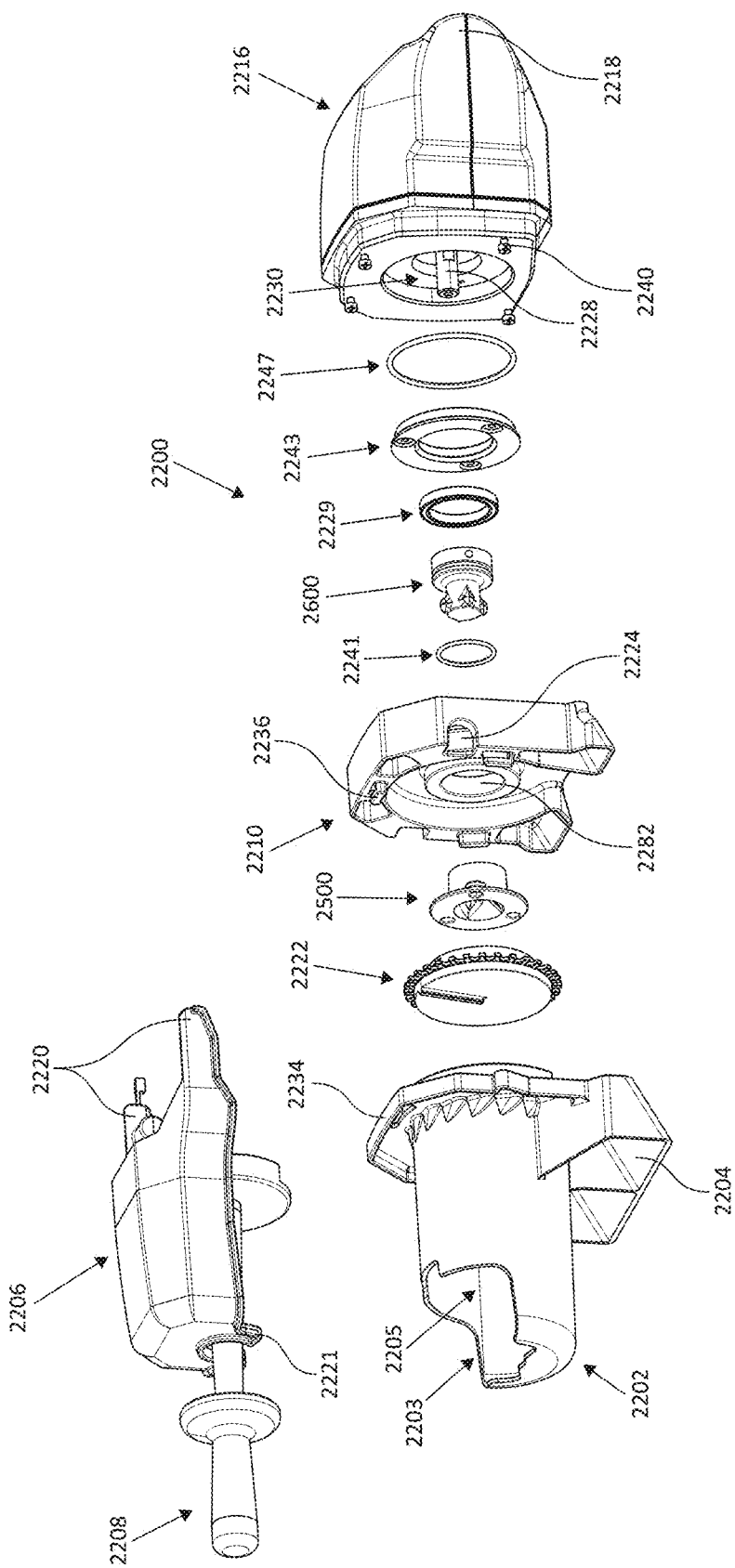
FIG. 24 illustrates an exploded view of another example grinder assembly.

Another Grinder Assembly—FIG. 24

With reference to FIG. 24, another example of a grinder assembly 2200 is illustrated. The grinder assembly 2200, and the components thereof, can include any of the features of the grinder assembly 200. For example, the features of grinder assembly 2200 that are similarly numbered to the features of grinder assembly 2200 can be the same or similar. Additionally, the grinder assembly 2200 can be different from the grinder assembly 200 as described and illustrated herein. The grinder assembly 2200 can be used in the juicing device 100.

FIG. 24 shows an exploded view of the grinder assembly 2200. The grinder assembly 2200 can include a hopper 2202. The hopper 2202 can include a chute configured to receive and hold food to be ground. The hopper 2202 can include a plurality of first mating elements (e.g., keyed holes, receiving apertures 2234), which can be positioned around the chute thereof. The keyed holes 2234 can interface with a corresponding plurality of second mating elements (e.g., tabs, receiving pockets 2236), which can be positioned around a grinder housing 2210 (e.g., around an opening 2282 thereof). In some embodiments, the receiving pockets 2236 of the grinder housing 2210 can be inserted into the plurality of keyed holes 2234 of the hopper 2202 and engage (e.g., twist over) a portion of the peripheries defining the plurality of keyed holes 2234 of the grinder housing 2210 such that the hopper 2202 is securely coupled to the grinder housing 2210. The engaged receiving pockets 2236 and keyed holes 2234 can present a physically interference against axial movement of the hopper 2202 relative to the grinder housing 2210.

As illustrated, the grinder assembly 2200 can include a grinder plate 2222. The grinder plate 2222 can be configured to grind the food and/or to radially fling the ground food, as discussed in more detail herein. The grinder plate 2222 can be fixedly coupled to a drive coupling 2500 such that rotation of the drive coupling 2500 results in the rotation of the grinder plate 2222. The drive coupling 2500 can be an annular structure. The hopper 2202 and grinder housing 2210 can at least partially enclose the grinder plate 2222 and the drive coupling 2500.

The cover 2206 can couple to the grinder housing 2210. A cover pivot joint 2220 of the cover 2206 can interface with the pivot joint receiver (e.g., receiving recess, slot 2224) of the grinder housing 2210 to form a cover joint similar to the cover joint 214 described in reference to FIGS. 1A and 1B, enabling the cover 2206 to rotate up or down to cover and uncover the opening 2203 of the hopper 2202. The cover 2206 can have an aperture (e.g., groove) 2221 through which a pusher 2208 can extend such that the pusher 2208 is coupled to the cover 2206 and/or can be moved in the inner cavity 2205 of the hopper 2202 while the cover 2206 is covering the opening 2203.

The drive coupling 2500 can extend through an opening 2282 of the grinder housing 2210 to engage with a drive tip

2600. The drive tip 2600 can be part of or coupled to (e.g., a cap on) a drive shaft 2228 of a motor unit 2216, such that rotation of the drive shaft 2228 causes rotation of the drive tip 2600. The drive coupling 2500 can engage with the drive tip 2600 such that the drive coupling 2500 is retained on the drive tip 2600 when the drive shaft 2228 of the motor unit 2216 is rotating. The drive coupling 2500 can be decoupled from the drive tip 2600 when the motor unit 2216 is not rotating the drive shaft 2228 and drive tip 2600. The drive tip 2600 can be at least partially positioned within an opening 2230 of the motor unit 2216. As described herein, the drive coupling 2500 and drive tip 2600 can be configured to facilitate operative engagement.

A ring (e.g., bearing holder 2243) can be inserted into the opening 2230 of the motor unit 2216 to receive the bearing 2229. A seal (e.g., O-ring 2247) can be positioned around the bearing holder 2243 to engage an inner wall of the motor unit 2216 that defines the opening 2230. The seal can be configured to inhibit the flow of material into the opening 2230 and/or towards the drive shaft 2228. The bearing holder 2243 can receive a bearing 2229 that can be positioned around the drive tip 2600. The bearing 2229 can help to inhibit or prevent misalignment of the drive tip 2600 while allowing for the rotation thereof. The drive tip 2600 can have a seal (e.g., O-ring 2241) positioned around the drive tip 2600 to inhibit the flow of material between the drive tip 2600 and the bearing 2229 and/or the bearing holder 2243.

Figure 32A:
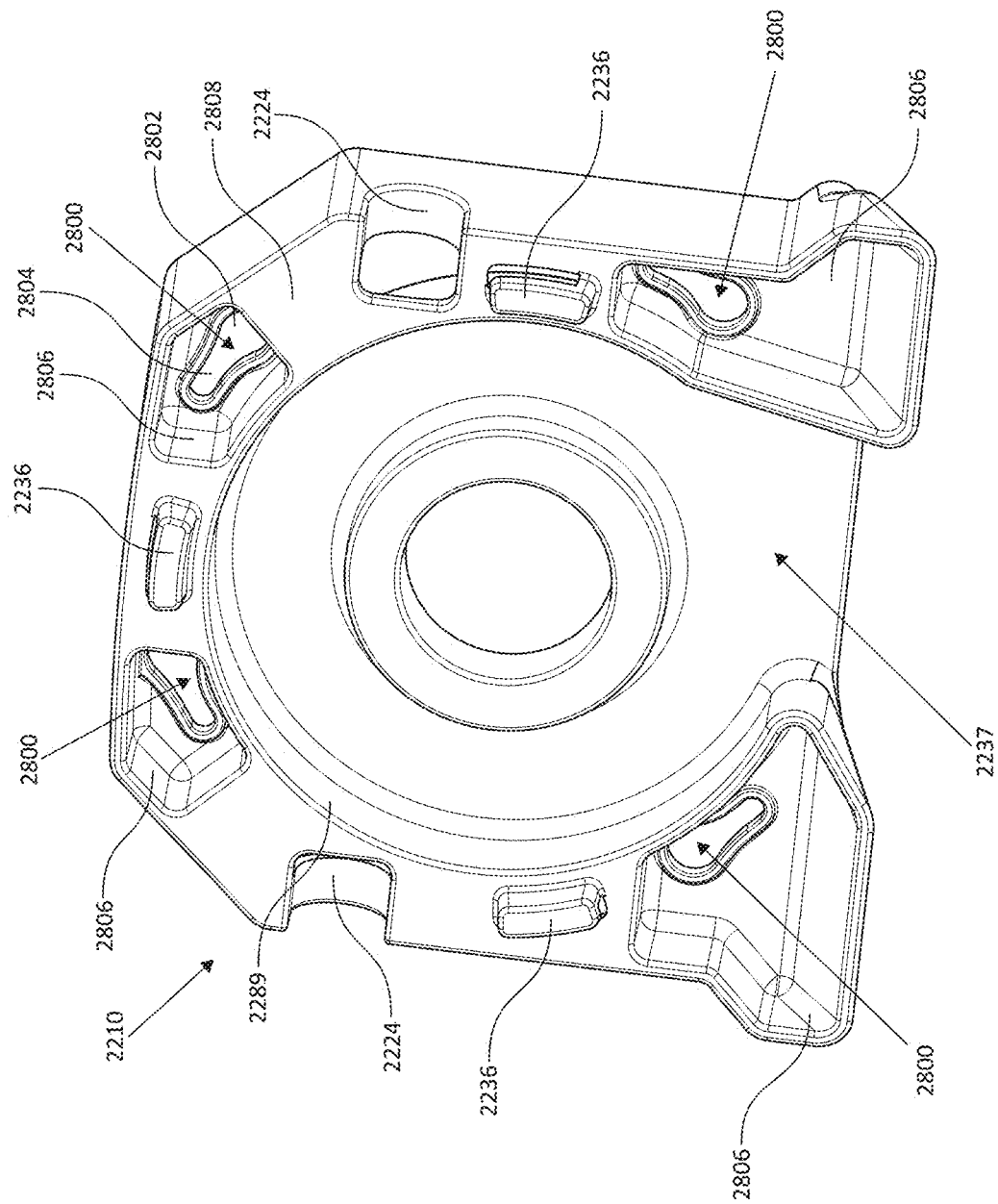
FIGS. 32A-32C illustrate various views of another example grinder housing.
Figure 32B:
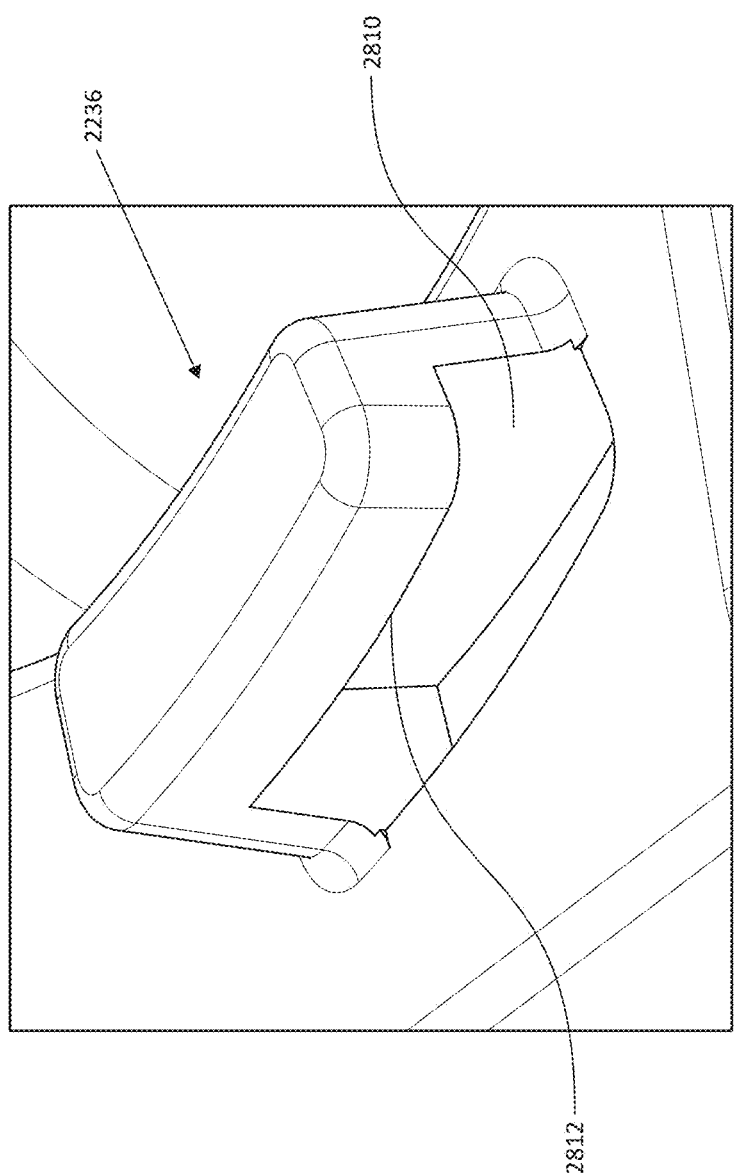
Figure 32C:
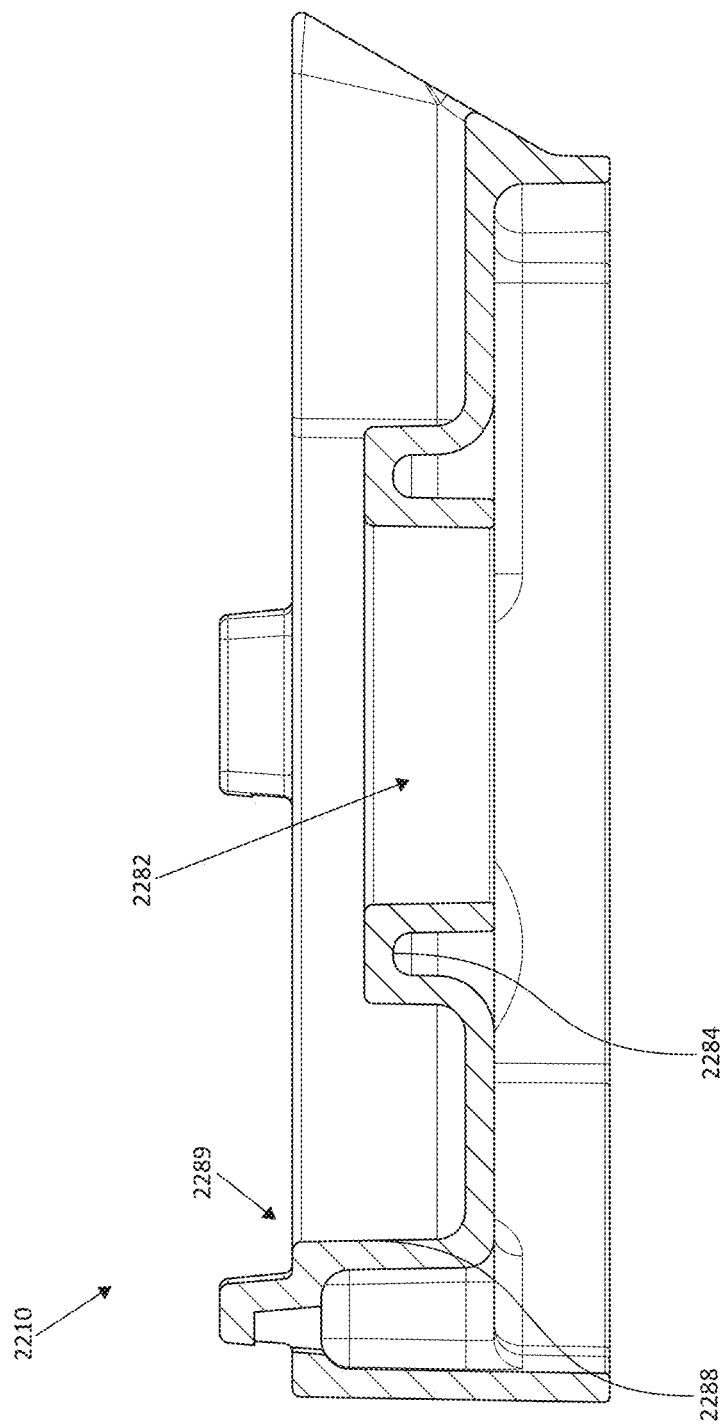

The grinder housing 2210 can have a plurality of first mating features (e.g., keyed holes, receiving apertures), which are described in more detail in reference to FIGS. 32A-32C. The first mating features can be positioned around the opening 2282. The receiving apertures can interface with a plurality of second mating features (e.g., bolts, protrusions, shoulder bolts 2240) positioned around the drive shaft 2228 of the motor unit 2216 (e.g., circumferentially distributed around the drive shaft 2228). The grinder housing 2210 can be maneuvered to insert the shoulder bolts 2240 into each of the receiving apertures of the grinder housing 2210 and rotated to couple the grinder housing 2210 and the motor unit 2216 and/or at least partially enclose the drive tip 2600.

In certain implementations, the hopper 2202, cover 2206, grinder plate 2222, drive coupling 2500, and grinder housing 2210 are together called the hopper unit. In certain embodiments, the hopper unit also includes the pusher 2208. In some embodiments, the hopper unit can be removed from the motor unit 2216 and/or other components of the juicing device 100. This can facilitate convenient cleaning of the hopper unit. In some embodiments, removal of the hopper unit is accomplished by decoupling the receiving apertures of the grinder housing 2210 from the plurality of shoulder bolts 2240 of the motor unit 2216. In some variants, the hopper 2202, pusher 2208, and cover 2206 can be decoupled from the juicing device 100 for cleaning as a combined unit. This can be accomplished by decoupling the keyed holes 2234 of the hopper 2202 from the plurality of receiving pockets 2236 of the grinder housing 2210.

In various embodiments, the juicing device 100 is configured to not operate when the hopper 2202 is disconnected. For example, in some embodiments, the juicing device 100 is configured such that the motor unit 2216 will not drive the drive shaft 2228 (or the drive tip 2600, drive coupling 2500, and/or grinder plate 2222) if the hopper 2202 is decoupled from the grinder housing 2210 and/or if the grinder housing 2210 is decoupled from the motor unit 2216, which can increase safety of use. Coupling of the hopper 2202 to the grinder housing 2210 and/or the grinder housing 2210 to the motor unit 2216 can be detected via a magnetic switch or other mechanism. In some embodiments, opening of the cover 2206, which can include the configuration shown in FIG. 39A, can cause the motor unit 2216 to not drive the drive shaft 2228. In some embodiments, closing the cover 2206, which can include the configuration shown in FIG. 39B, can enable automatic restarting of the motor unit 2216 to drive the drive shaft 2228.

Figure 25A:
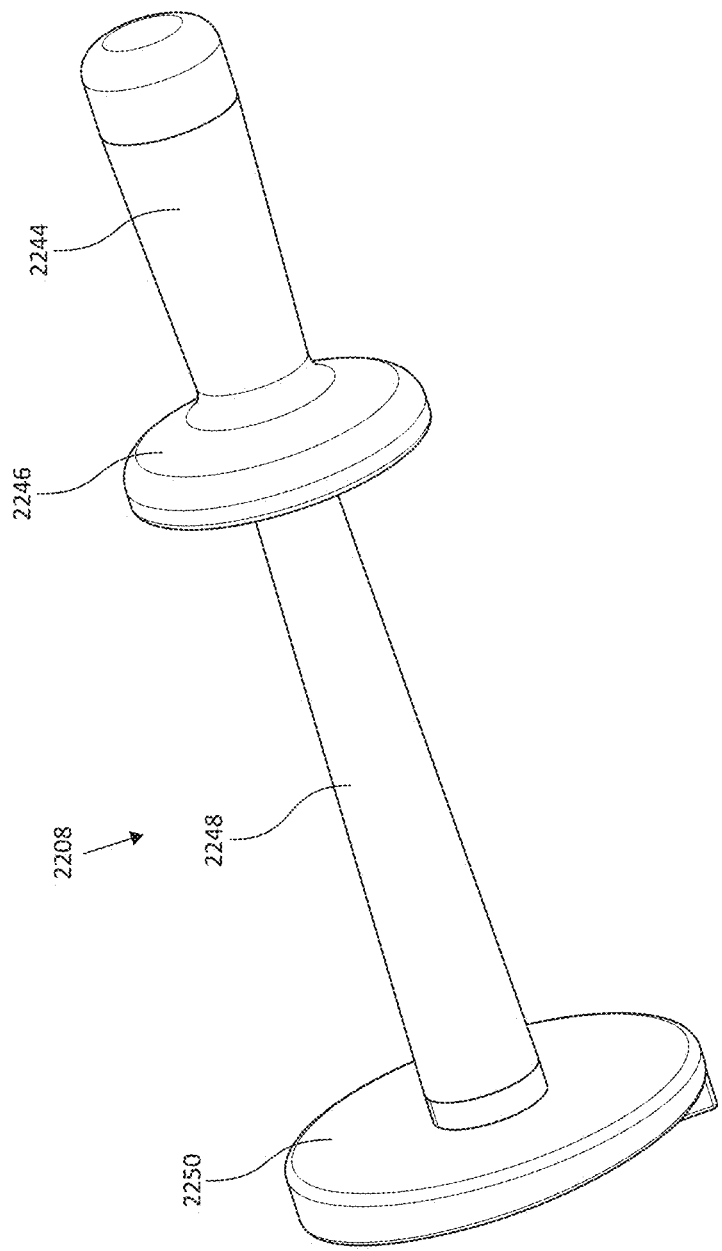
FIG. 25A illustrates a view of another example pusher.
Figure 25B:
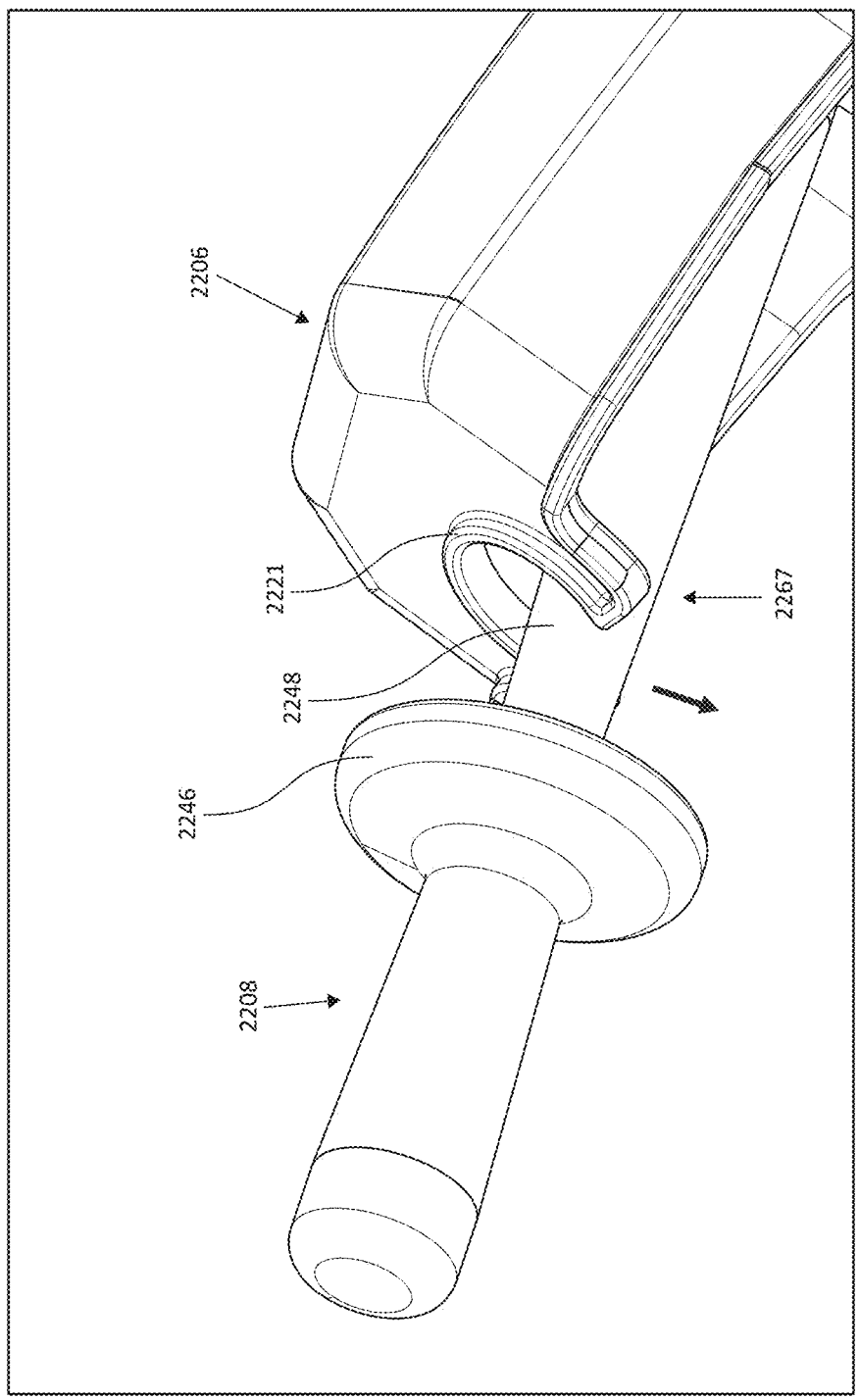
FIGS. 25B and 25C illustrate various views of the pusher of FIG. 25A being used with an example cover.
Figure 25C:
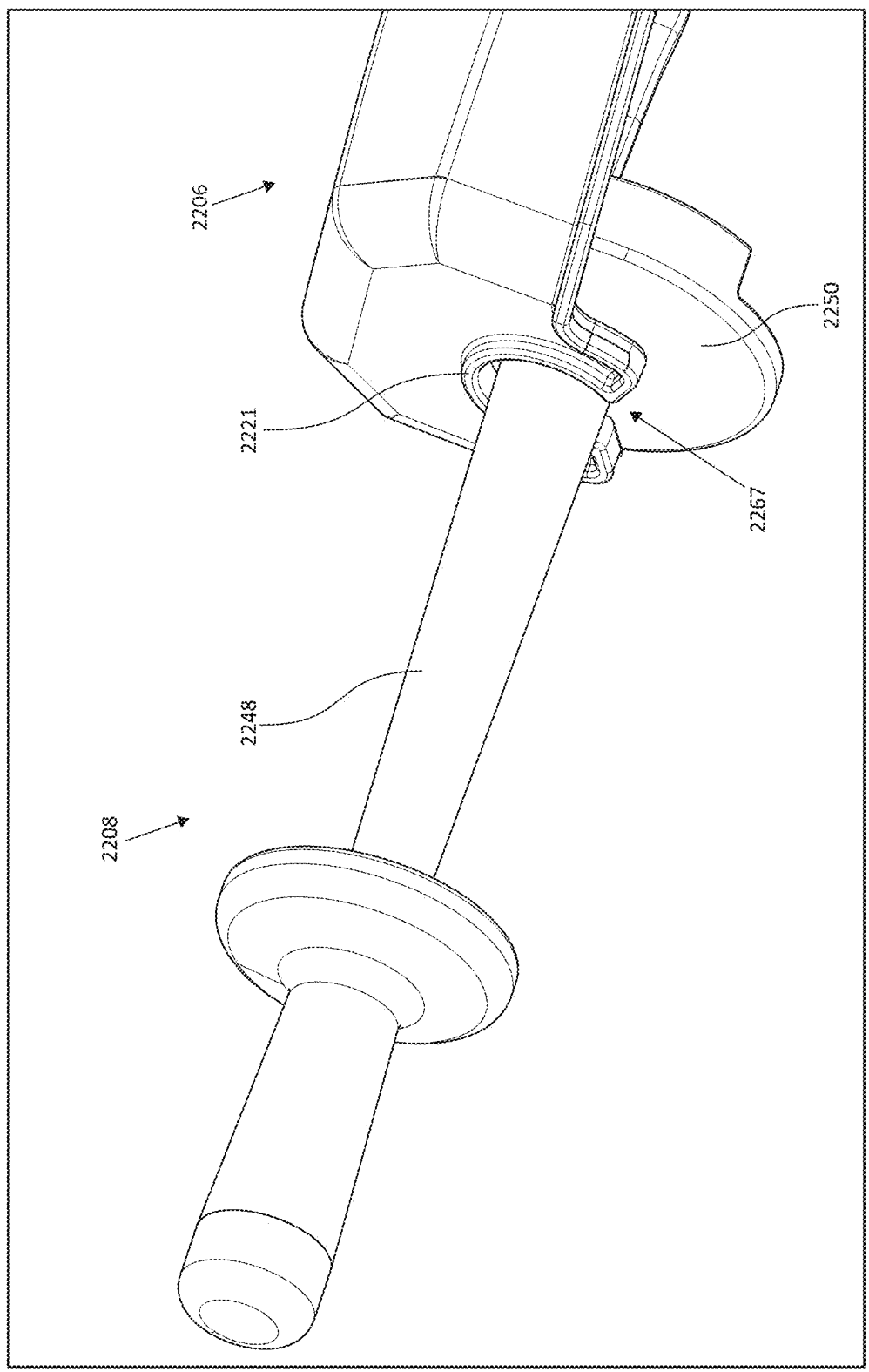

Another Pusher—FIGS. 25A-25C

With reference to FIGS. 25A-25C, another example of a pusher 2208 is illustrated. The pusher 2208 can include any of the features of the pusher 208. For example, the features of pusher 2208 that are similarly numbered to the features of pusher 208 can be the same or similar. Additionally, the pusher 2208 can be different from the pusher 208 as described and illustrated herein. The pusher 2208 can be used in the juicing device 100.

The pusher 208 can include a handle 2244 that can be grasped by a user. The pusher 2208 can have a shaft 2248. The shaft 2248 can extend between a retainer 2246 and a face 2250. The shaft 2248 can be tapered. As illustrated, the shaft 2248 can have a periphery or cross-sectional size that increases in a direction from the retainer 2246 to the face 2250. As shown in FIG. 25B, the periphery of the shaft 2248 proximate the retainer 2246 can be sized to pass through a gap (e.g., opening 2267) in the wall of the cover 2206 defining the aperture 2221 (such as in the direction of the arrow in FIG. 25B). As shown in FIG. 25C, the periphery of the shaft 2248 proximate the face 2250 can be sized such that the shaft 2248 does not pass through the opening 2267. In some embodiments, an outside diameter of a first end of the shaft 2248 is less than an inside diameter of the opening 2267 and/or an outside diameter of a second end of the shaft 2248 is greater than the inside diameter of the opening 2267. The tapered shaft 2248 can advantageously inhibit or prevent the inadvertent removal of the pusher 2208 from the aperture 2221 when the cover 2206 is opening or closing while still allowing a user to easily manipulate the portion of the tapered shaft 2248 with the smaller periphery to the opening 2267 for removal.

Another Cover—FIGS. 26A and 26B

With reference to FIGS. 26A and 26B, another example of a cover 2206 is illustrated. The cover 2206 can include any of the features of the cover 206. For example, the features of cover 2206 that are similarly numbered to the features of cover 206 can be the same or similar. Additionally, the cover 2206 can be different from the cover 206 as described and illustrated herein. The cover 2206 can be used in the juicing device 100.

The cover 2206 can obstruct the opening 2203 that provides access to an inner cavity 2205 of the hopper 2202. The cover 2206 can include one or more cover pivot joints 2220. The cover pivot joints 2220 can each have a pivot member (e.g., cylinder, pin 2269). The pin 2269 can engage with a slot 2224 of the grinder housing 2210, as described in more detail herein, such that the cover 2206 is rotatably coupled to the grinder housing 2210. The cover 2206, as described above, can have an aperture 2221 that receives the tapered shaft 2248 of the pusher 2208. The opening 2267 in the wall of the cover 2206 that defines the aperture 2221 can allow the user to selectively remove the pusher 208 therefrom depending on the portion of the tapered shaft 2248 at the opening 2267, as detailed above.

Another Hopper—FIGS. 27A-27D

With reference to FIGS. 27A and 27B, another example of a hopper 2202 is illustrated. The hopper 2202 can include any of the features of the hopper 202. For example, the features of hopper 202 that are similarly numbered to the features of hopper 202 can be the same or similar. Additionally, the hopper 2202 can be different from the hopper 202 as described and illustrated herein. The hopper 202 can be used in the juicing device 100.

As mentioned above, the hopper 2202 can have the opening 2203 that allows access into the inner cavity 2205. A lower wall 2207 (e.g., a curved wall) can define a portion of the opening 2203. The lower wall 2207 can receive a portion of the pusher 2208 and/or can accommodate a portion of the cover 2206 surrounding the aperture 2221.

The hopper 2202 can have a flange 2231. The flange 2231 can be proximate the exit 2213 of the hopper 2202. The flange 2231 can engage an interfacing surface 2808 of the grinder housing 2210 when coupled thereto. The hopper 2202 can have one or more keyed holes 2234 (e.g., two, three, four, etc.), which can be positioned in the flange 2231. The keyed holes 2234 can be positioned around the chute of the hopper 2202. In some embodiments, the keyed holes 2234 can be positioned around a central axis of the inner cavity 2205.

Each of the keyed holes 2234 can have an engagement portion (e.g., periphery, projection, tab 2257) that can engage with a receiving pocket 2236 of the grinder housing 2210 to couple the hopper 2202 to the grinder housing 2210. The tab 2257 can narrow the size of the keyed hole 2234. As described elsewhere herein, the user can insert the receiving pocket 2236 into the keyed hole 2234 and rotate the hopper 2202 relative to grinder housing 2210 to engage the tab 2257 with the receiving pocket 2236.

The hopper 2202 can have one or more rotation impeding elements (e.g., projections, tabs, flanges, ears 2239). The ears 2239 can be a portion of the flange 2231. The ears 2239 can impede rotation of the hopper 2202 when the cover 2206 is closed. For example, the ears 2239 can engage with the cover pivot joints 2220 when the cover 2206 is closed, thereby presenting a physical interference. When the cover 2206 is open, the physical interference is not present, so the hopper 2202 can be free to rotate.

The hopper 2202 can include food grinding features, such as a plurality of hopper teeth (fixed teeth) 2252. The hopper 2202 can, in some embodiments, include an indicator 2259 of the location of the teeth 2252 on an outer surface 2261. This can advantageously indicate to a user the location of the teeth 2252 from the outside of the hopper 2202.

The hopper 2202 can have a wall 2820 extending from an end thereof. The wall 2820 can surround the exit 2213. The wall 2820 can be annular in shape. As detailed elsewhere herein, an outer surface of the wall 2820 can engage and/or be proximate a wall 2288 of the grinder housing 2210. An inner surface of the wall 2820 can engage food material as it is being processed. The wall 2820 can guide food material as it is being processed. The wall 2820 can have a gap 2822 (e.g., opening) that allows food material to pass therethrough. The gap 2822 can enable food material to move (e.g., flow) through the food exit ramp 2237 of the grinder housing 2210 and toward a press chamber.

Figure 27D:
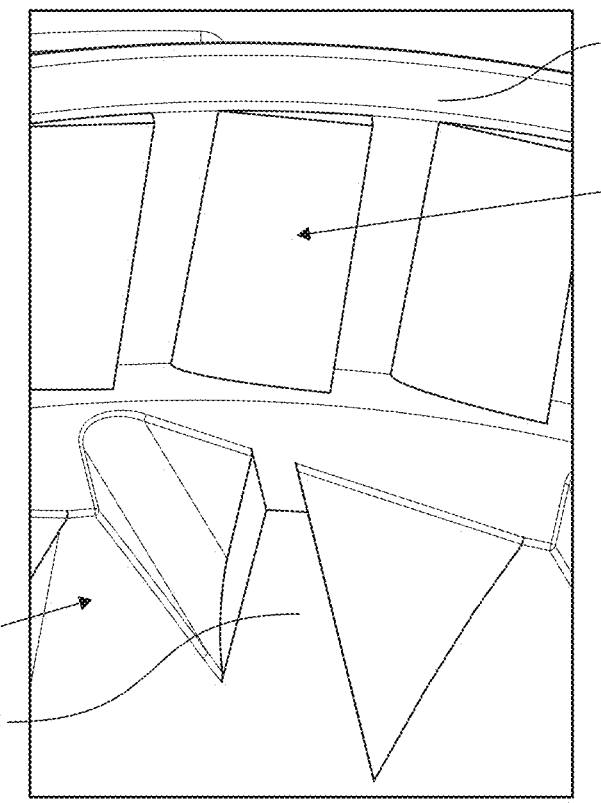
FIGS. 27C and 27D illustrate various views of another example hopper.
Figure 27C:
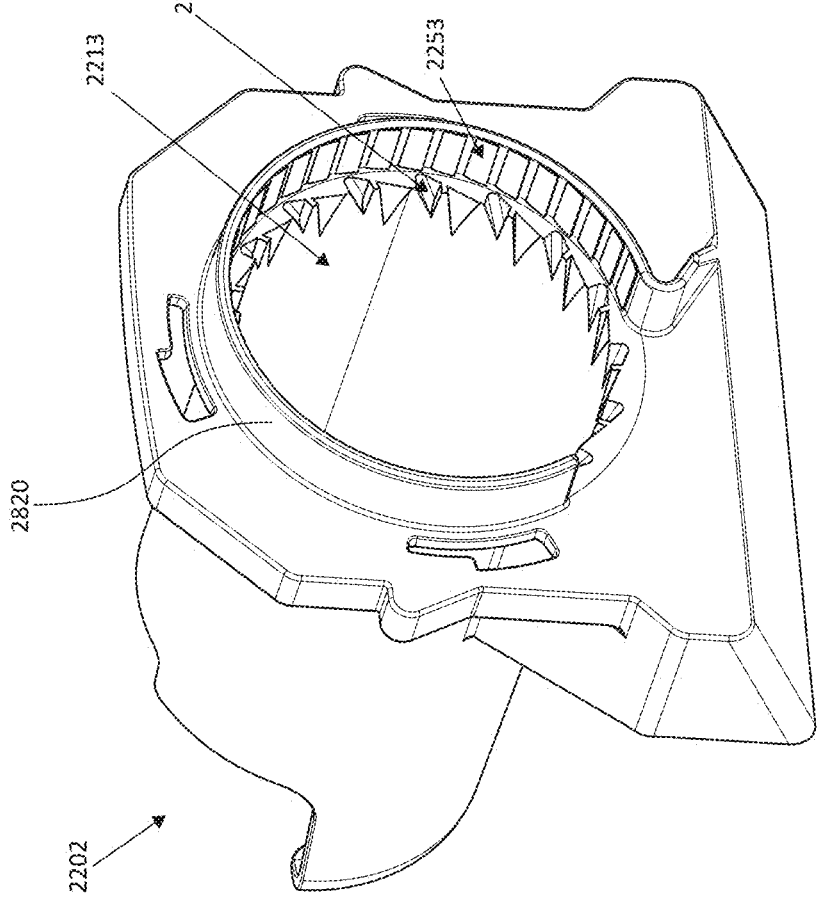

With reference to FIGS. 27C and 27D, the hopper 2202 is shown with a variation to the plurality of hopper teeth 2252, which can result in the plurality of hopper teeth 2252 more aggressively cutting food material. In certain embodiments, the hopper 2202 can include projections (e.g., protrusion, tooth, profile) 2251, such as at least one of the projections 2251 between circumferentially adjacent teeth 2252. In some implementations, the projection 2251 divides (e.g., splits or partitions) a tooth of the plurality of hopper teeth 2252. Stated differently, the projection 2251 can divide an opening adjacent to a tooth of the plurality of hopper teeth 2252. In some variants, each or one or more of the plurality of hopper teeth 2252 can include an associated projection 2251. The projection(s) 2251 can provide additional edges, corners, and/or surfaces upon which food material can be cut. For example, there can be an increased opportunity for food material to be cut as the lopper 2232 sweeps the food material around the plurality of hopper teeth 2252. The projection 2251 can effectively reduce the size of the opening of an individual tooth of the plurality of hopper teeth 2252 such that food material can be cut and/or ground to smaller pieces before passing therethrough. In some variants, the surface(s) of the plurality of hopper teeth 2252, which can include the projection(s) 2251, can be textured, such as with dimples, bumps, grooves, ridges, etc.

With reference to FIGS. 27C and 27D, the hopper 2202 is shown with cutting ledges (e.g., teeth, edges) 2253. The ledges 2253 can be disposed on an interior surface of the wall 2820. The ledges 2253 can further grind and/or cut food material as the wiper 2272 sweeps food toward the gap 2822 in the wall 2820. In some embodiments, food material can be pushed against the ledges 2253 by the wiper 2272 to be further ground and/or cut, such as when the food material is directed by the wiper 2272 toward the gap 2822 in the wall 2820 and/or through the food exit ramp 2237 of the grinder housing 2210 toward the press chamber.

In certain implementations, the ledges 2253 can effectively add an additional grinding and/or cutting stage for the grinder assembly 2200. First, food material can be cut by the lopper 2232 as the grinder plate 2222 is rotated by the motor unit 2216. Second, the lopper 2232 and/or upper portion 2262 of the grinder plate 2222 can push food material into the plurality of hopper teeth 2252, which can include the projection(s) 2251, for further cutting and/or grinding. Third, the teeth 2256 of the grinder plate 2222 can pull food material from the plurality of hopper teeth 2252 and further cut and/or grind the food material. Fourth, the wiper 2272 can push food against the ledges 2253 as the wiper directs food material toward the gap 2822 in the wall 2820. The addition of the ledges 2253 can result in a finer grind of the food material, which can be desirable for juicing.

Figure 28B:
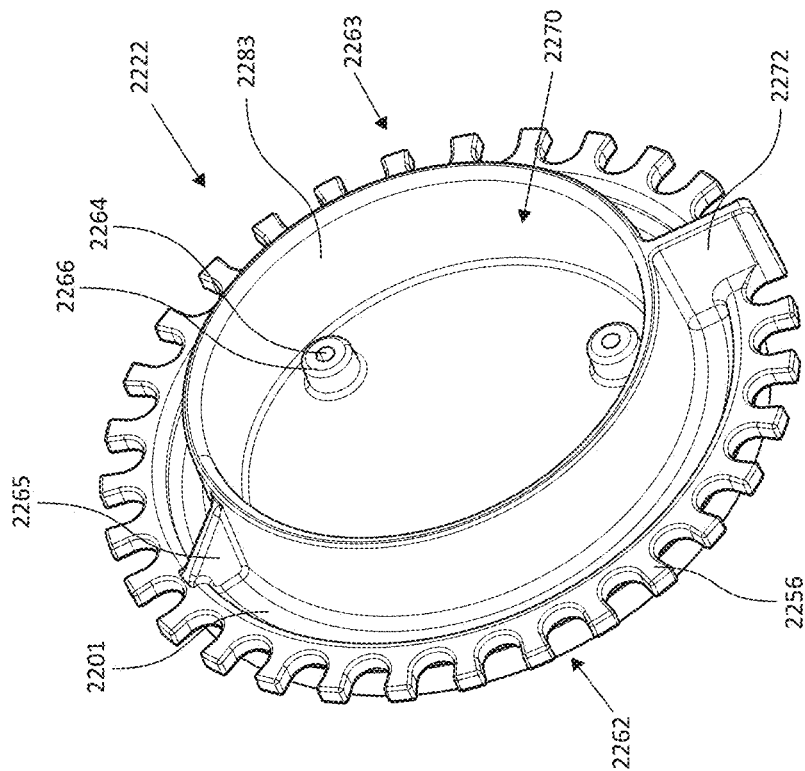
FIGS. 28A-28C illustrate various views of another example grinder plate.
Figure 28A:
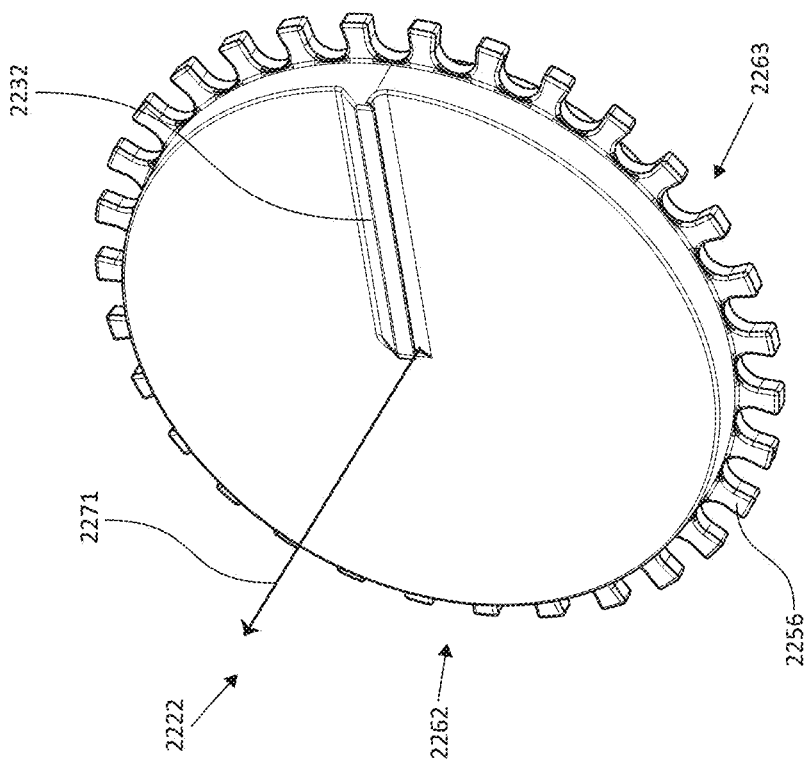
Figure 28C:
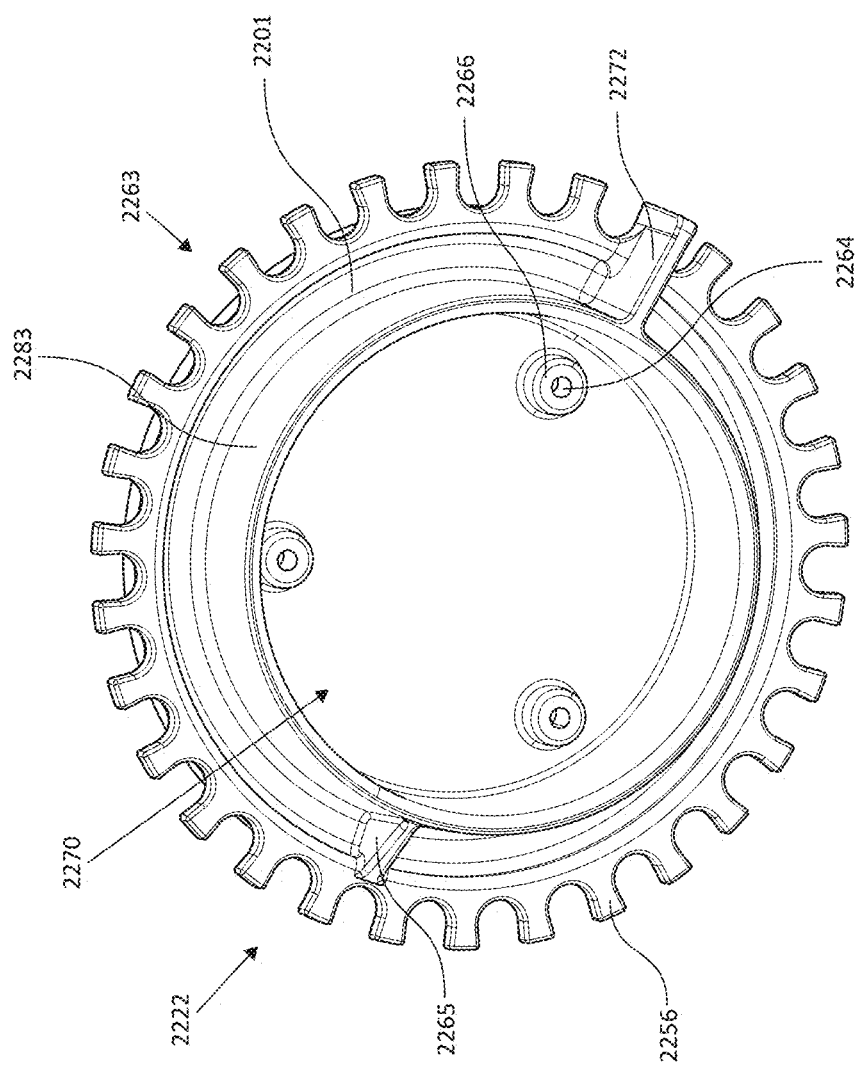

Another Grinder Plate—FIGS. 28A-28C

With reference to FIGS. 28A-28C, another example of a grinder plate 2222 is illustrated. The grinder plate 2222 can include any of the features of the grinder plate 222. For example, the features of grinder plate 2222 that are similarly numbered to the features of grinder plate 2222 can be the same or similar. Additionally, the grinder plate 2222 can be different from the grinder plate 222 as described and illustrated herein. The grinder plate 2222 can be used in the juicing device 100.

The grinder plate 2222 can have an upper portion 2262, a lower portion 2263, and an axis of rotation 2271. During operation of the device 100, the grinder plate 2222 can rotate about the axis of rotation 2271. The lower portion 2263 of the grinder plate 2222 can have a plurality of teeth 2256. The lower portion 2263 can have a wall (e.g., annular wall 2283). The annular wall 2283 can define a receiving region (e.g., cavity, pocket 2270) to receive at least a portion of the drive coupling 2500 therein. The annular wall 2283 can inhibit food material from flowing to the drive coupling 2500 during operation. An external surface of the annular wall 2283, opposite the axis of rotation 2271, can engage food material during processing and inhibit the movement of the food material radially inward. The lower portion 2263 can have a recess (e.g., annular groove 2201). The annular groove 2201 can circumferentially surround the annular wall 2283.

The grinder plate 2222 can have one or more engagement features (e.g., protrusions 2266) that engage with the drive coupling 2500, which can cause rotation of the drive coupling 2500 to rotate the grinder plate 2222. The protrusions 2266 can be positioned within the pocket 2270. The protrusions 2266 can be adapted to be easily inserted into recesses 2530 of the drive coupling 2500 for convenient alignment for coupling the grinder plate 2222 to the drive coupling 2500 with bolts or similar mechanisms. The protrusions 2266 can have holes 2264 to allow bolts (e.g., pins, rods, rivets, etc.) to couple the drive coupling 2500 to the grinder plate 2222.

In some embodiments, the lower portion 2263 includes a wiper 2272. The wiper 2272, as explained elsewhere herein, can be used to maneuver (e.g., push) food material through the grinder housing 2210. The wiper 2272 can extend from the radially outermost end of one of the teeth 2256 to the outside surface of the annular wall 2283. The wiper 2272 can extend across the annular groove 2201. The wiper 2272 can disrupt the annular groove 2201. The wiper 2272 can extend a length of the annular wall 2283. The wiper 2272 can be the width of one of the plurality of teeth 2256.

In some embodiments, the lower portion 2263 can include a second wiper 2265. The second wiper 2265 can extend across the annular groove 2201. The second wiper 2265 can disrupt the annular groove 2201. The second wiper 2265 can extend from the gap between adjacent teeth 2256 to the annular wall 2283. The second wiper 2265 can be the width of one of the teeth 2256 and/or the gap between adjacent teeth 2256. The second wiper 2265 can be positioned at the opposite side of the lower portion 2263 as the wiper 2272. The second wiper 2265 can be one-hundred and eighty degrees from the wiper 2272. In some embodiments, the second wiper 2265 is at other orientations relative to the wiper 2272. The second wiper 2265 can have an angled edge that extends from proximate the gap between adjacent teeth 2256 to the annular wall 2283.

The upper portion 262 can have a lopper 2232. The lopper 232 can be configured to push and/or cut food as the grinder plate 222 rotates. As shown, the upper portion 262 can have a generally flat face. The lopper 2232 can project upwardly from such face. In some embodiments, the upper portion 262 does not have an agitator. In some variants, the different feature(s) and/or surface(s) of the grinder plate 2222 can have a textured surface, such as a roughened surface, which can contribute to producing a finer grind. In some embodiments, the grinder plate 2222 can be formed by coupling multiple components or pieces (e.g., coupling multiple pieces of plastic and/or sheet metal together). In some embodiments, the lopper 2232 and/or wiper 2272 can be coupled to the upper portion 2262 and/or lower portion 2263. In some embodiments, the grinder plate 2222 is formed via one investment cast, which can be made of stainless steel.

Figure 29B:
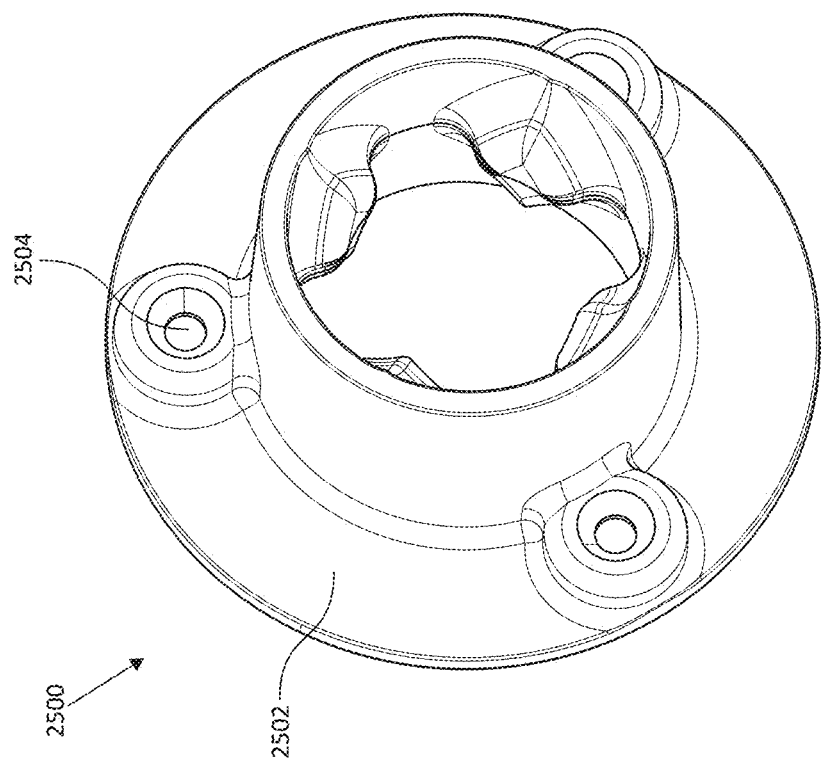
FIGS. 29A and 29B illustrate various views of another example drive coupling.
Figure 29A:
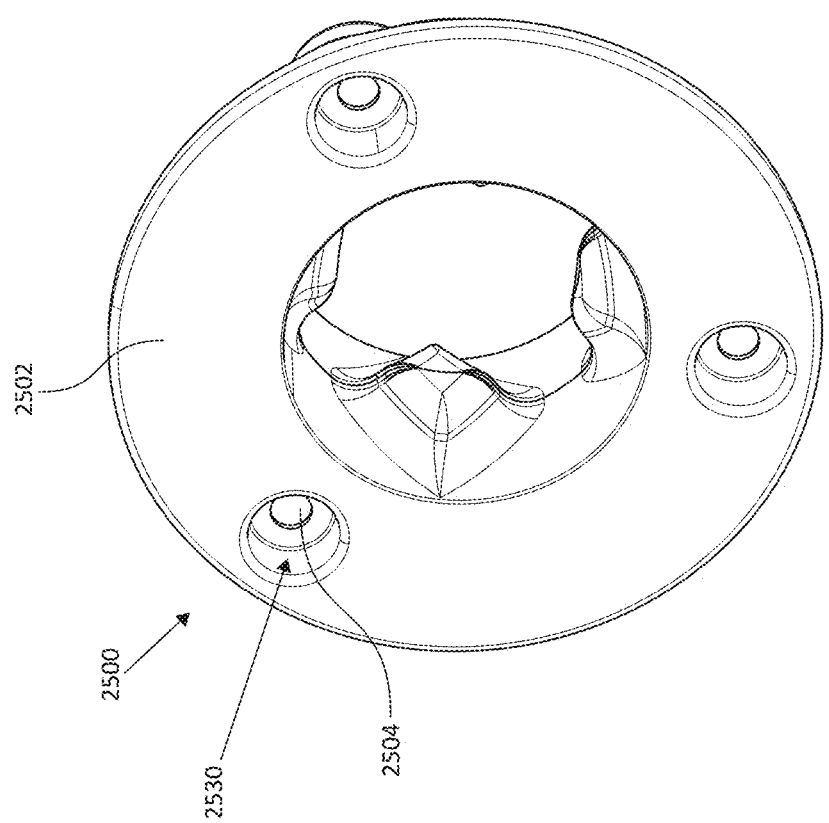

Another Drive Coupling—FIGS. 29A-29C

With reference to FIGS. 29A-29C, another example of a drive coupling 2500 is illustrated. The drive coupling 2500 can include any of the features of the drive coupling 500. For example, the features of drive coupling 2500 that are similarly numbered to the features of drive coupling 500 can be the same or similar. Additionally, the drive coupling 2500 can be different from the drive coupling 500 as described and illustrated herein. The drive coupling 2500 can be used in the juicing device 100.

The drive coupling 2500 can have a flange 2502 that is sized to mate with (e.g., fit within) the pocket 2270 of the grinder plate 2222. In some embodiments, the radially outermost edge of the flange 2502 interfaces and/or is proximate an inner surface of the annular wall 2283. The driver coupling 2500 can have grooves (e.g., indentations, recesses 2530) that receive the protrusions 2266 of the grinder plate 2222 for convenient alignment. The recesses 2530 can have holes 2504 that allow bolts (e.g., pins, rods, rivets, etc.) to couple the drive coupling 2500 to the grinder plate 2222.

Figure 30:
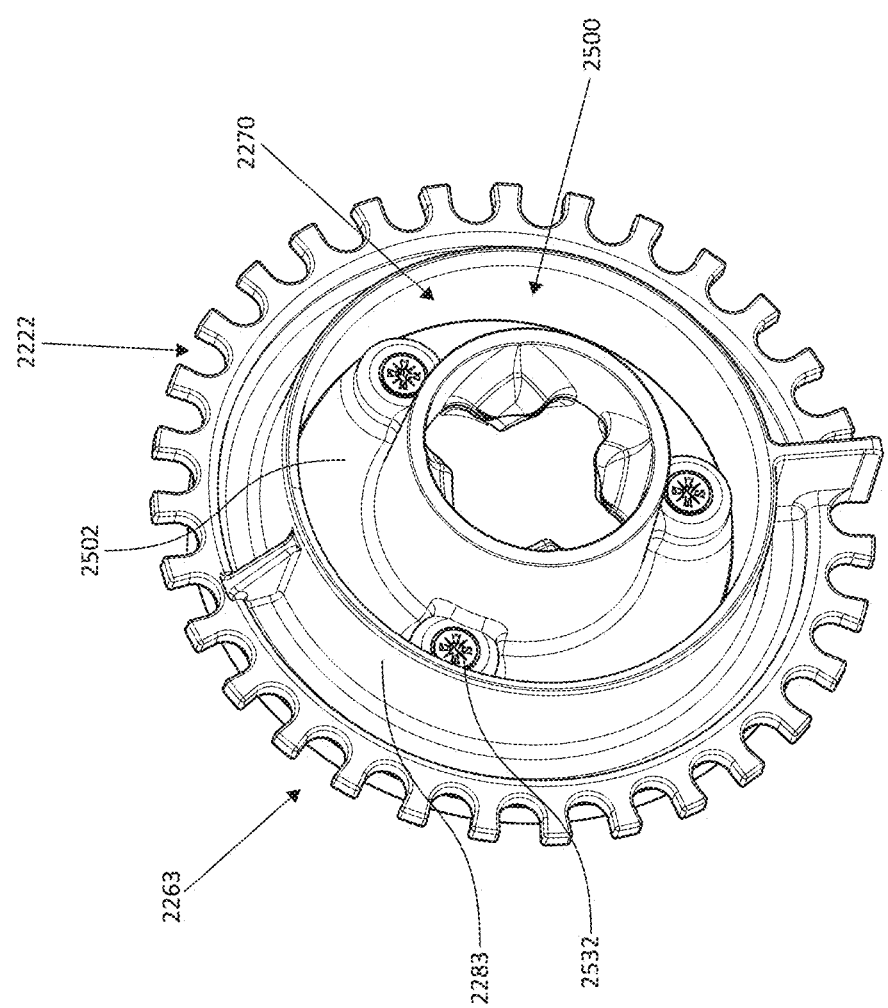
FIG. 30 illustrates the grinder plate of FIGS. 28A-28C coupled to the drive coupling of FIGS. 29A and 29B.

Grinder Sub-Assembly—FIG. 30

FIG. 30 illustrates the assembled drive coupling 2500 and grinder plate 2222. The drive coupling 2500 can couple to the lower portion 2263 of the grinder plate 2222. The flange 2502 of the drive coupling 5200 can be inserted into the pocket 2270 surrounded by the annular wall 2283. Bolts 2532 or other similar devices can be inserted through the hole 2504 of the drive coupling 2500 and the hole 2264 of the grinder plate 2222.

Figure 31B:
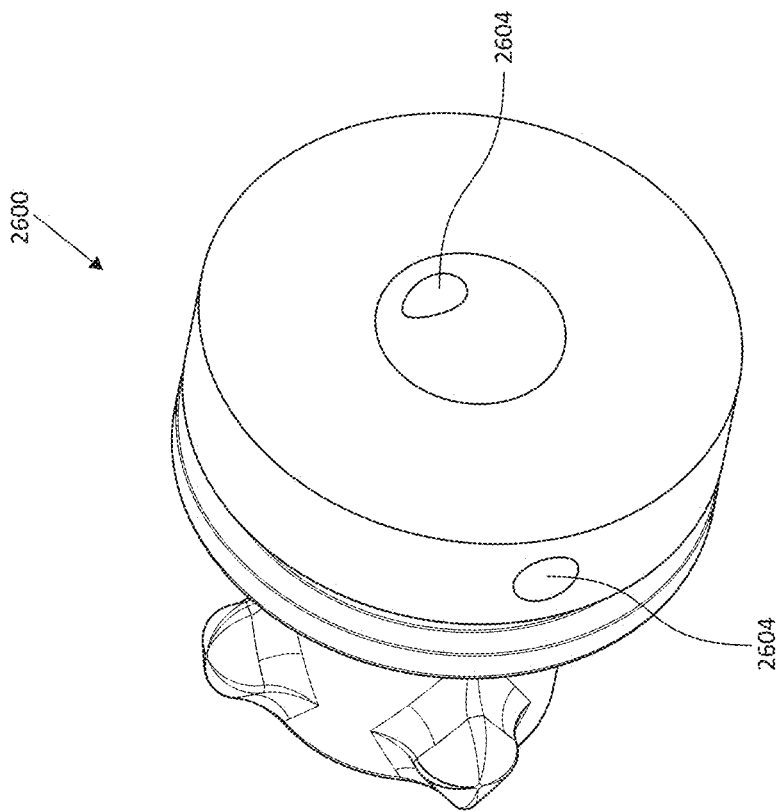
FIGS. 31A and 31B illustrate various views of another example drive tip.
Figure 31A:
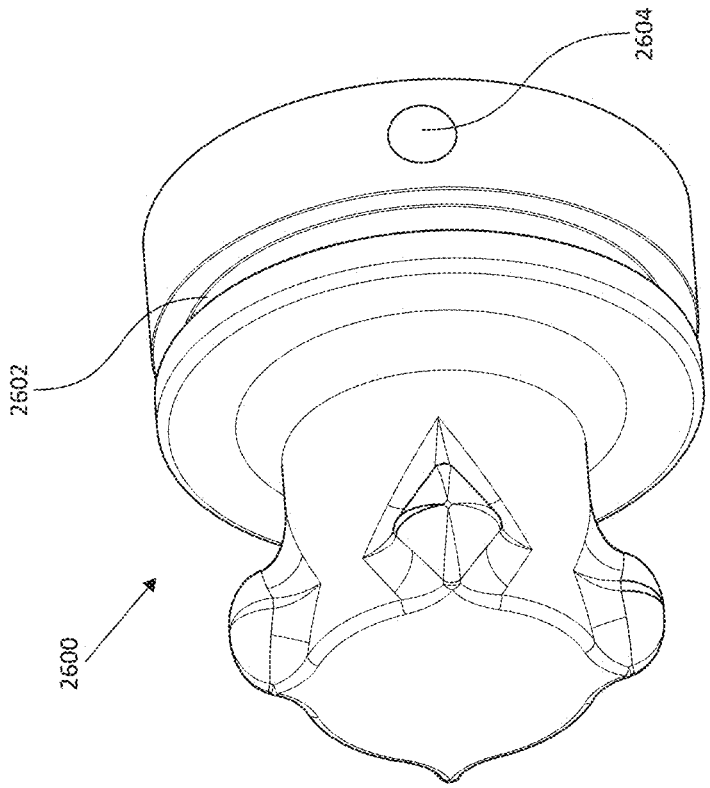

Another Drive Tip—FIGS. 31A and 31B

With reference to FIGS. 31A and 31B, another example of a drive tip 2600 is illustrated. The drive tip (also called a drive cap) 2600 can include any of the features of the drive tip 600. For example, the features of drive tip 2600 that are similarly numbered to the features of drive tip 600 can be the same or similar. Additionally, the drive tip 2600 can be different from the drive tip 600 as described and illustrated herein. The drive tip 2600 can be used in the juicing device 100.

The drive tip 2600 can have a groove 2602 (e.g., channel) that can receive a seal (e.g., O-ring 2241). As explained elsewhere herein, the groove 2602 can receive the O-ring 2241 to inhibit the flow of material between the drive tip 2600 and the bearing 2229 and/or the bearing holder 2243, as shown in FIG. 24. The drive tip 2600 can have one or more holes 2604 into which bolts or similar mechanisms can be inserted to couple the drive tip 2600 to the drive shaft 2228.

Another Grinder Housing—FIGS. 32A-32C

With reference to FIGS. 32A-32C, another example of a grinder housing 2210 is illustrated. The grinder housing 2210 can include any of the features of the grinder housing 210. For example, the features of grinder housing 2210 that are similarly numbered to the features of grinder housing 210 can be the same or similar. Additionally, grinder housing 2210 can be different from the grinder housing 210 as described and illustrated herein. The grinder housing 210 can be used in the juicing device 100.

The grinder housing 2210 can have an interfacing surface 2808 that can engage with the flange 2231 of the hopper 2202. As described elsewhere herein, the grinder housing 2808 can have one or more first mating features (e.g., keyed holes, receiving apertures 2800). The receiving apertures 2800 can receive shoulder bolts 2240 to couple the grinder housing 2210 to the motor unit 2216. The receiving apertures 2800 can be positioned to align with the shoulder bolts 2240. The receiving apertures 2800 can have a receiving portion 2802 and a locking portion 2804. The receiving portion 2802 can be enlarged relative to the locking portion 2804 to allow for convenient insertion of the shoulder bolts 2240. The receiving portion 802 can have a diameter greater than the head size of the shoulder bolts 2240. The locking portion 2804 can be smaller relative to the receiving portion 2802. The locking portion 2804 can have a diameter that is greater than the shaft of the shoulder bolts 2240 but less than the head. This can inhibit or prevent a user from decoupling the grinder assembly 2210 from the motor unit 2216 without first rotating the grinder housing 2210 such that the shoulder bolts 2240 are positioned in the receiving portion 2802. Each of the receiving apertures 2800 can be positioned within a recess 2806, which can be in the interfacing surface 2808.

The grinder housing 2210 can have slots 2224 for rotatably coupling with cover pivot joints 2220 of the cover 2206. The slots 2224 can receive pins 2269 such that the cover 2206 is rotatably coupled to the grinder housing 2210.

The grinder housing 2210 can have one or more receiving pockets 2236. The receiving pockets 2236 can be positioned on the interfacing surface 2808. The receiving pockets 2236 can be used to couple the grinder housing 2210 to the hopper 2202 as detailed herein. The receiving pockets 2236 can be inserted into the keyed holes 2234 of the hopper 2202 and rotated to position the tabs 2257 of the keyed holes 2234 in the receiving region 2810 of the receiving pockets 2236, as shown in FIG. 32B. The retention surface 2812 can inhibit or prevent the decoupling of the hopper 2202 from the grinder housing 2210 without properly rotating the hopper 2202 relative to the grinder housing 2210.

As shown in FIG. 32C, the wall 2284 of the grinder housing 2210 can fold (e.g., fold back on itself) proximate the opening 2282. This can create a thicker wall proximate the opening 2282, which can make it less likely that food material will enter the opening 2282, increase strength, etc. The grinder housing 2210 can have a side wall 2289 that includes the wall 2288. As shown in FIG. 32A, the grinder housing 2210 can have a gap in the side wall 2289 to provide a food exit ramp 2237.

Figure 33:
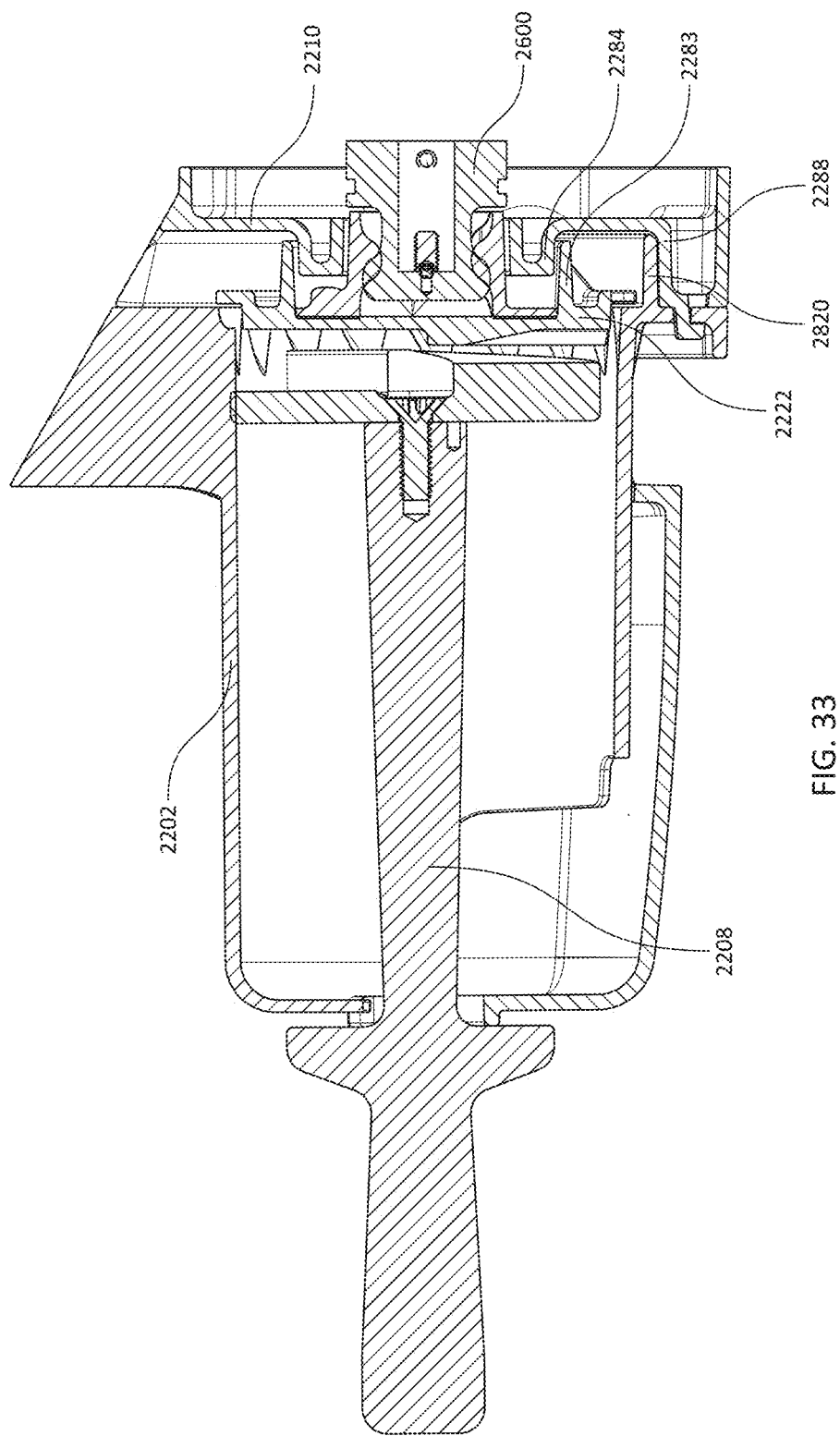
FIG. 33 illustrates a section view of the assembled pusher of FIG. 25A, cover of FIGS. 26A and 26B, hopper of FIGS. 27A and 27B, grinder plate of FIGS. 28A-28C, drive coupling of FIGS. 29A and 29B, drive tip of FIGS. 31A and 311B, and grinder housing of FIGS. 32A-32C.

Grinder Sub-Assembly—FIG. 33

FIG. 33 illustrates a section view of the assembled hopper 2202, pusher 2208, grinder housing 2210, drive coupling 2500, drive tip 2600, and grinder plate 2222. As shown, the wall 2820 of the hopper 2202 can be proximate the wall 2288 of the grinder housing 2210. The annular wall 2283 of the grinder plate 2222 can be proximate the wall 2284 of the grinder housing 2210. As shown, ground food material can be pushed by the wipers 2272, 2265 between the wall 2820 of the hopper 2202 and the annular wall 2283 of the grinder plate 2222 to the exit ramp 2237 of the grinder housing 2210.

Method of Assembling Grinder Assembly—FIGS. 34-39B

FIGS. 34-39B illustrate a method of assembling the grinder assembly 2200. Further non-limiting details regarding a method of assembly and/or use for a grinder assembly and/or juicing device can be found in Appendix A. In some embodiments, the motor unit 2216 is rotated upwards such that the components discussed herein stack generally vertically, which can reduced the risk that a component will inadvertently fall and be damaged during assembly.

Figure 34:
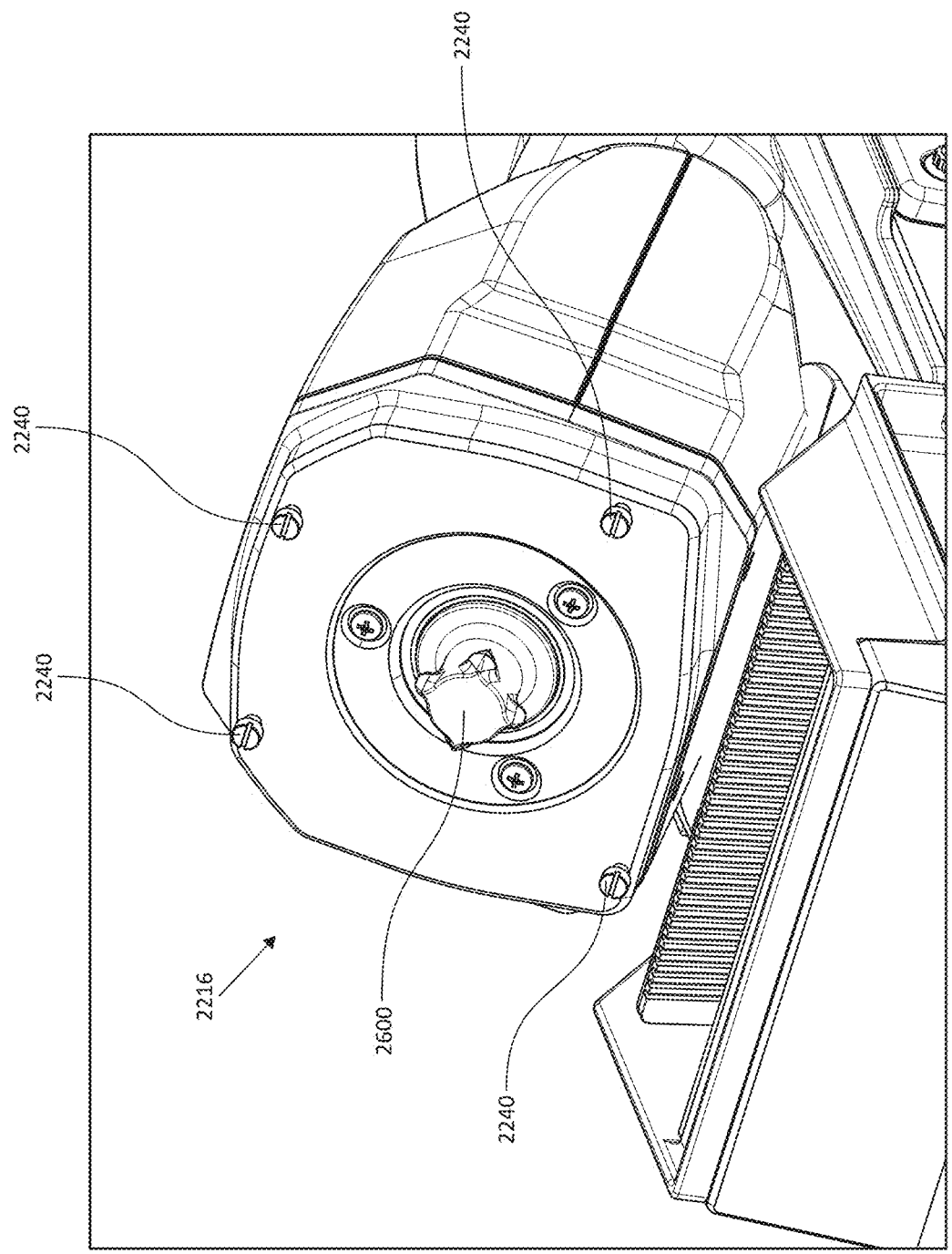
FIGS. 34-39B illustrate various views of a method of assembling a grinder assembly, such as the grinder assembly of FIG. 24.
Figure 35A:
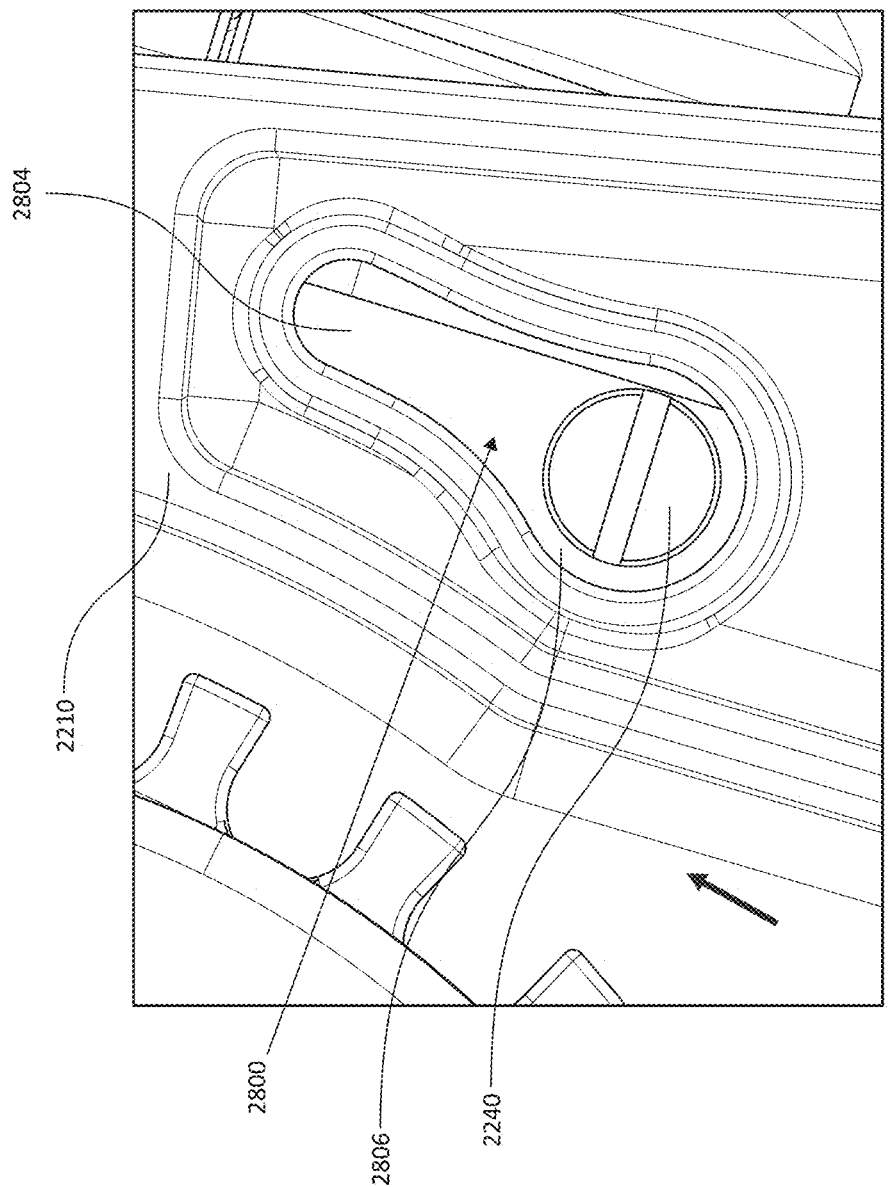
Figure 35B:
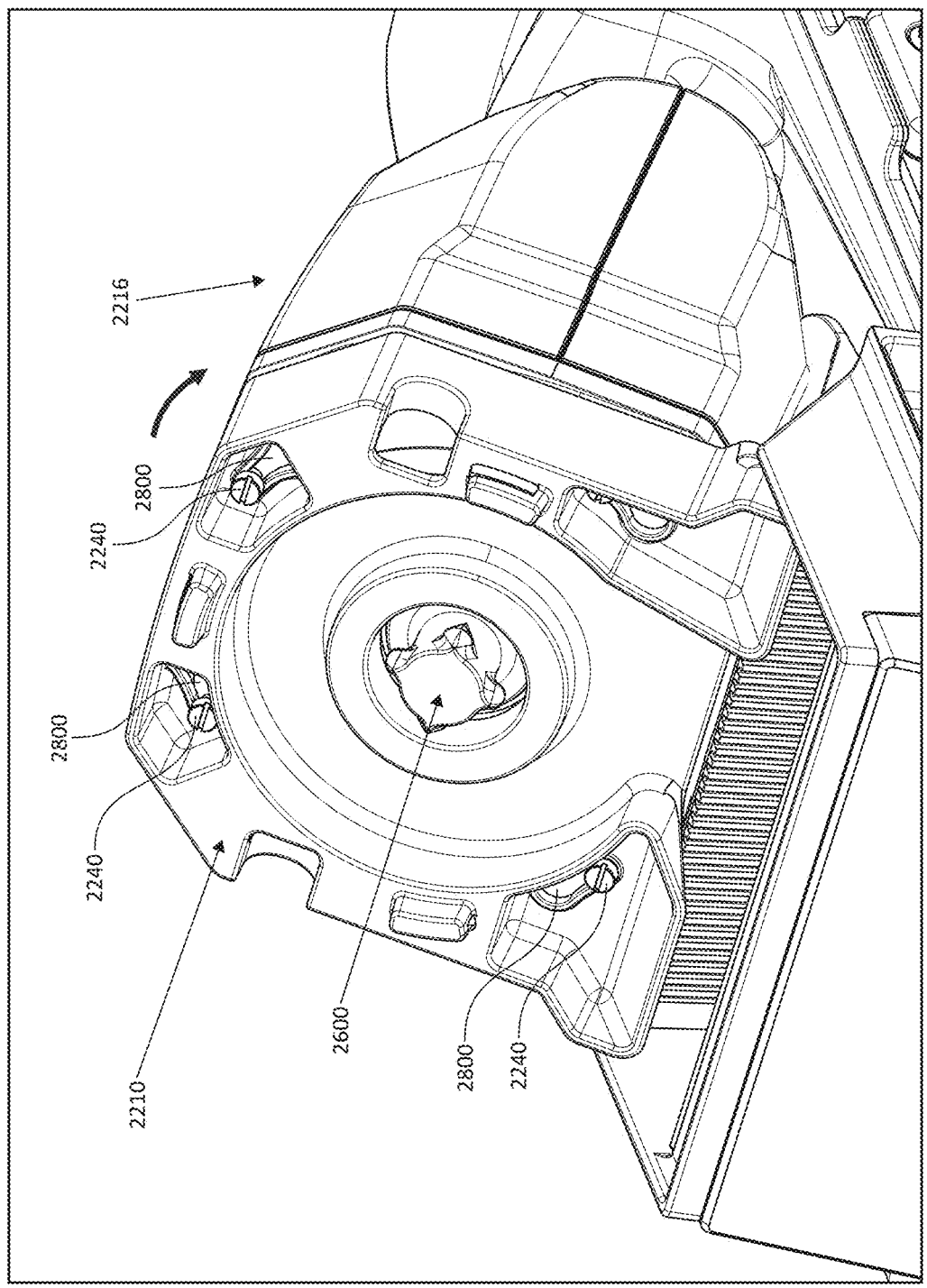

FIG. 34 illustrates the motor unit 2216 with a drive tip 2600 coupled to the drive shaft 2228. The motor unit 2216 has a plurality of shoulder bolts 2240 for coupling the motor unit 2216 to the grinder housing 2210. As shown in FIG. 35A, the user can position the receiving apertures 2800 of the grinder housing 2210 such that shoulder bolts 2240 are placed through the receiving portion 2806 and rotate the grinder housing 2210 relative to the motor unit 2216. As shown in FIG. 35B, the rotation of the grinder housing 2210 can place the shoulder bolts 2240 into the locking portion 2804 of the receiving apertures 2800, coupling the grinder housing 2210 to the motor unit 2216.

Figure 36:
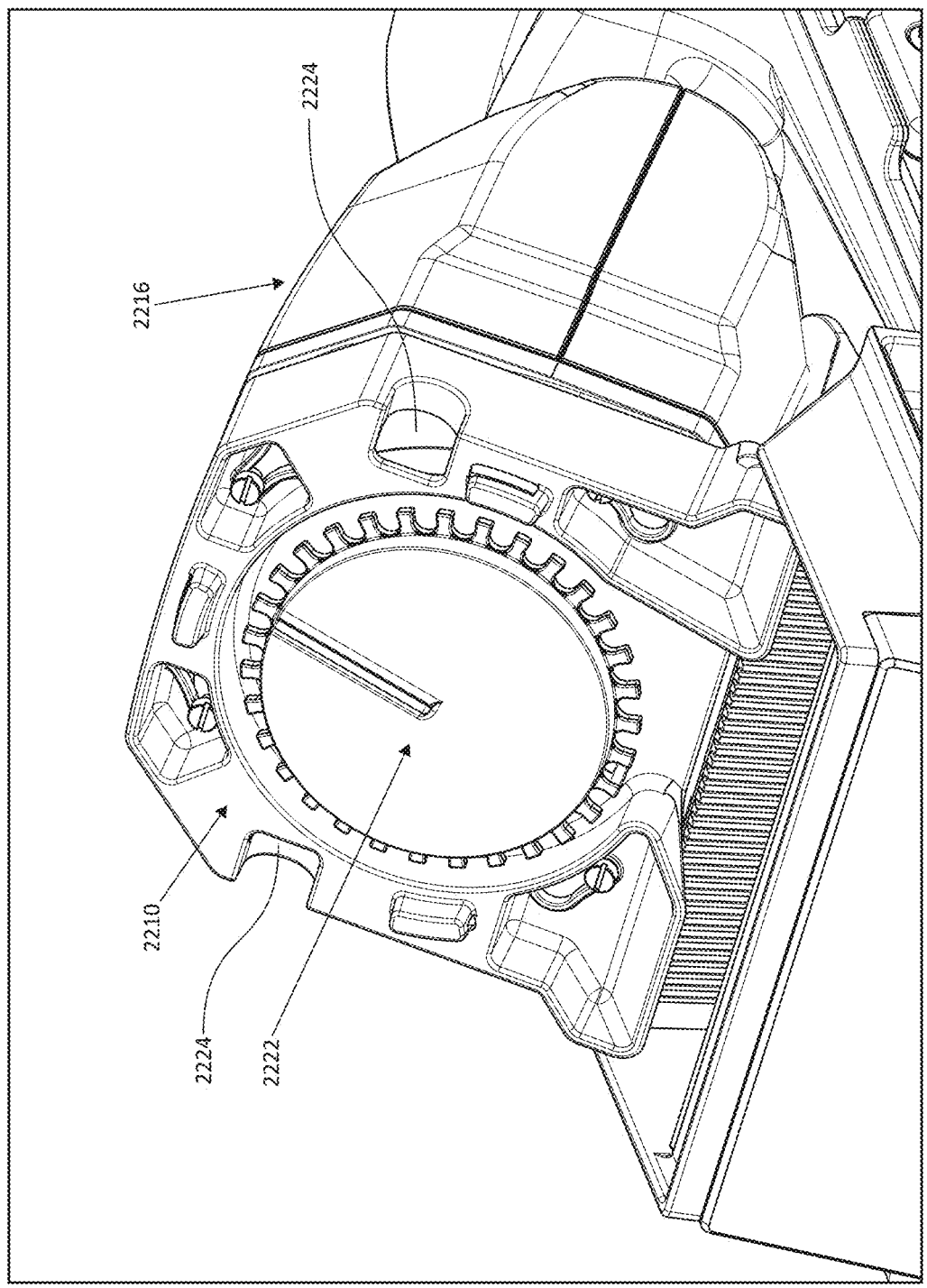

The drive coupling 2500 coupled to the grinder plate 2222 can be coupled to the drive tip 2600 by placing the drive coupling 2500 over the drive tip 2600, as illustrated in FIG. 36. As explained herein, the drive coupling 2500 can be decoupled from the drive tip 2600 when the motor unit 216 is not driving, but when the motor unit 216 is driving, the drive coupling 2500 and the drive tip 2600 engage such that the drive coupling 500 is retained on the drive tip 2600.

Figure 37:
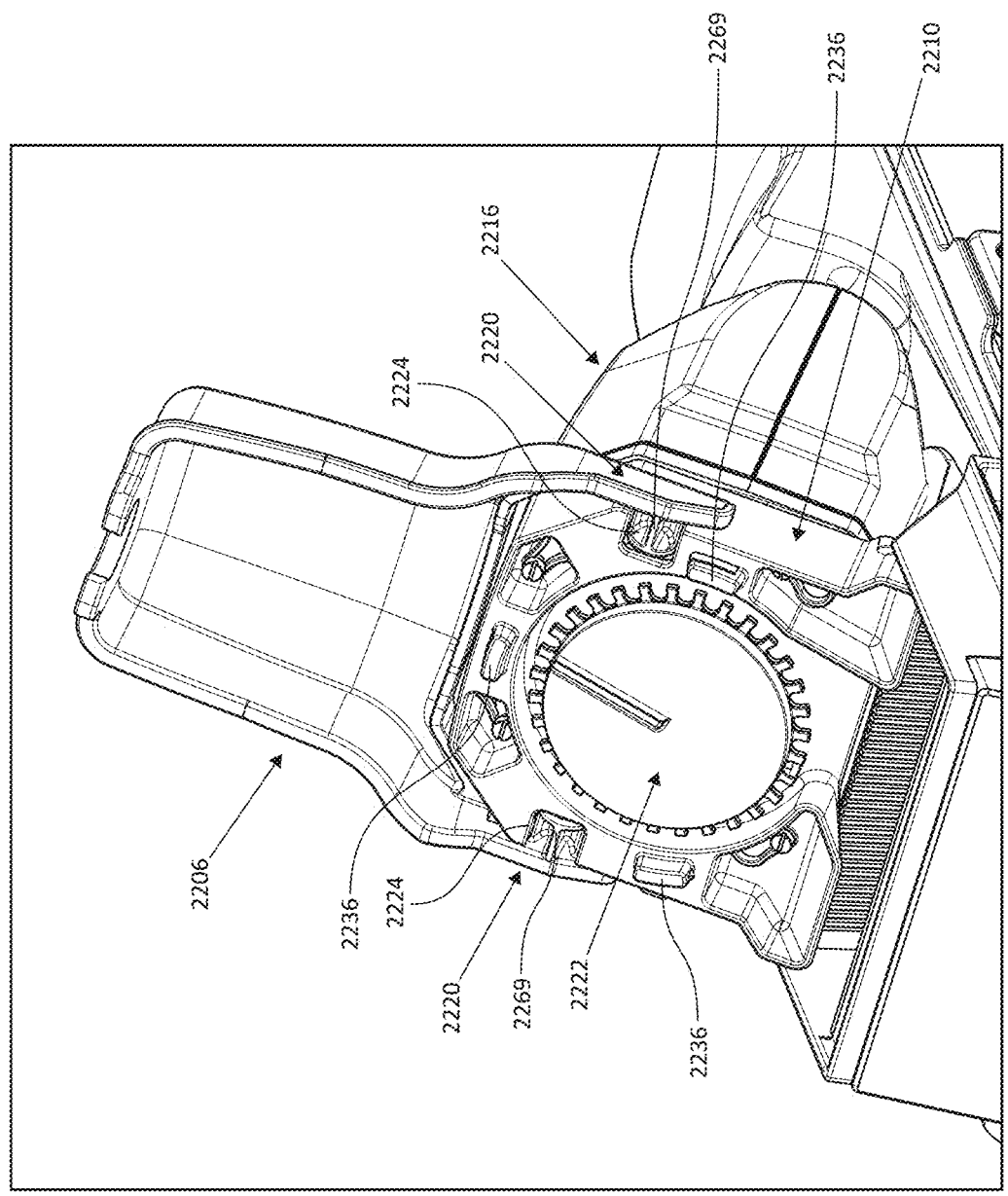

The cover 2206 can be coupled to the grinder housing 2210 by coupling the cover pivot joint 2220 with the slot 2224 of the grinder housing 2224, as shown in FIG. 37. The pin 2269 of the cover pivot joint 2220 can be inserted into the slot 2224 of the grinder housing 2210 such that the cover 2206 is rotatably coupled to the grinder housing 2210.

Figure 38A:
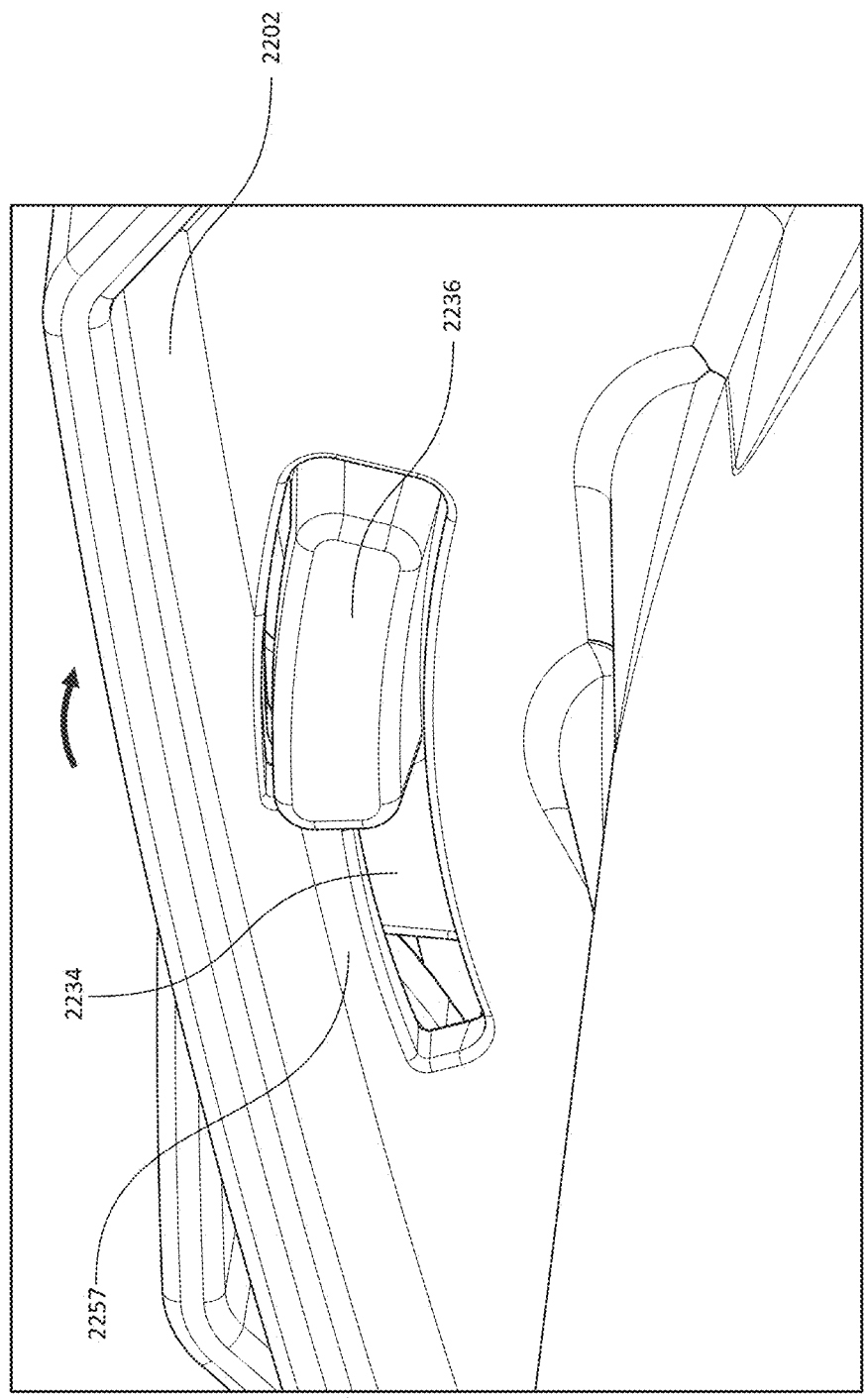
Figure 38B:
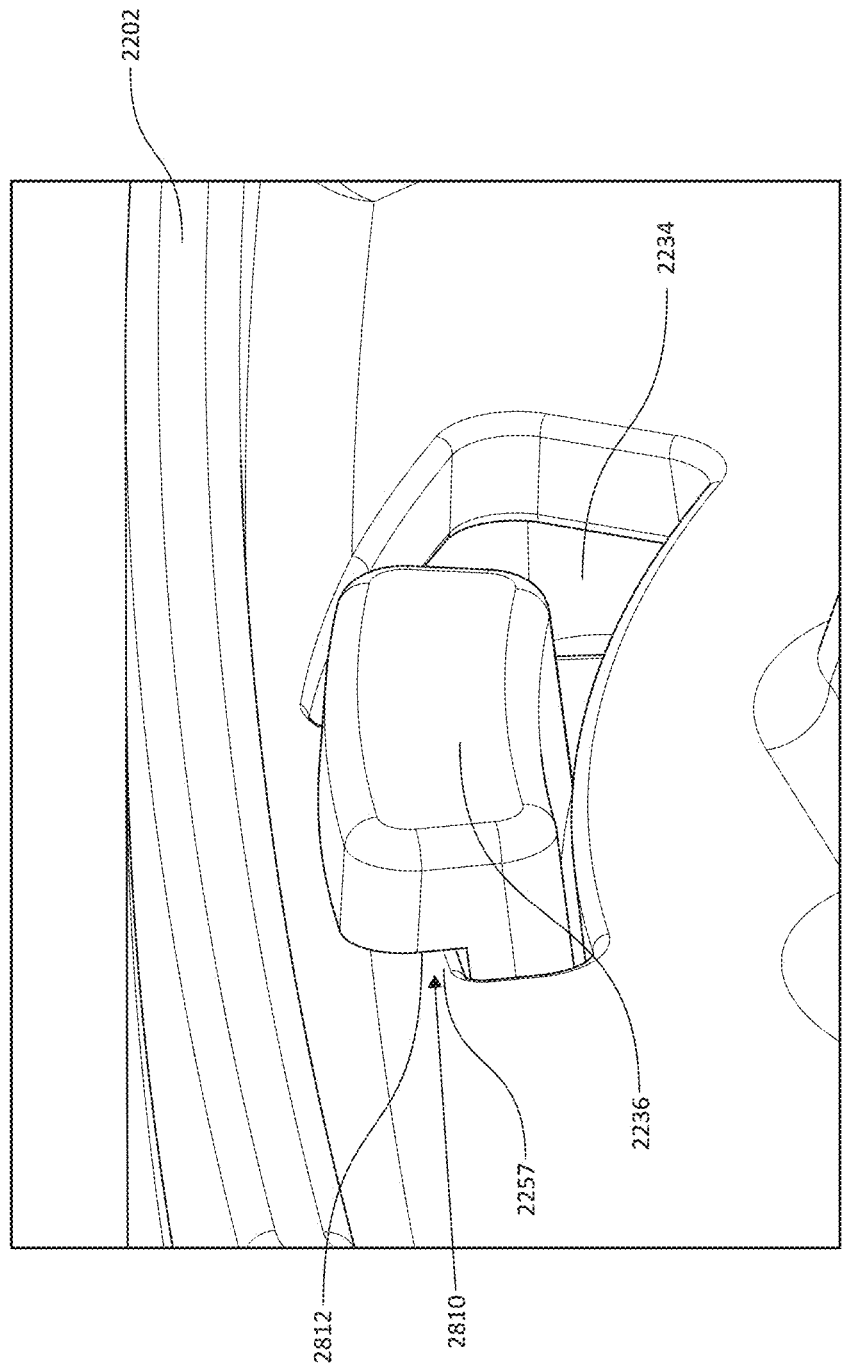
Figure 39A:
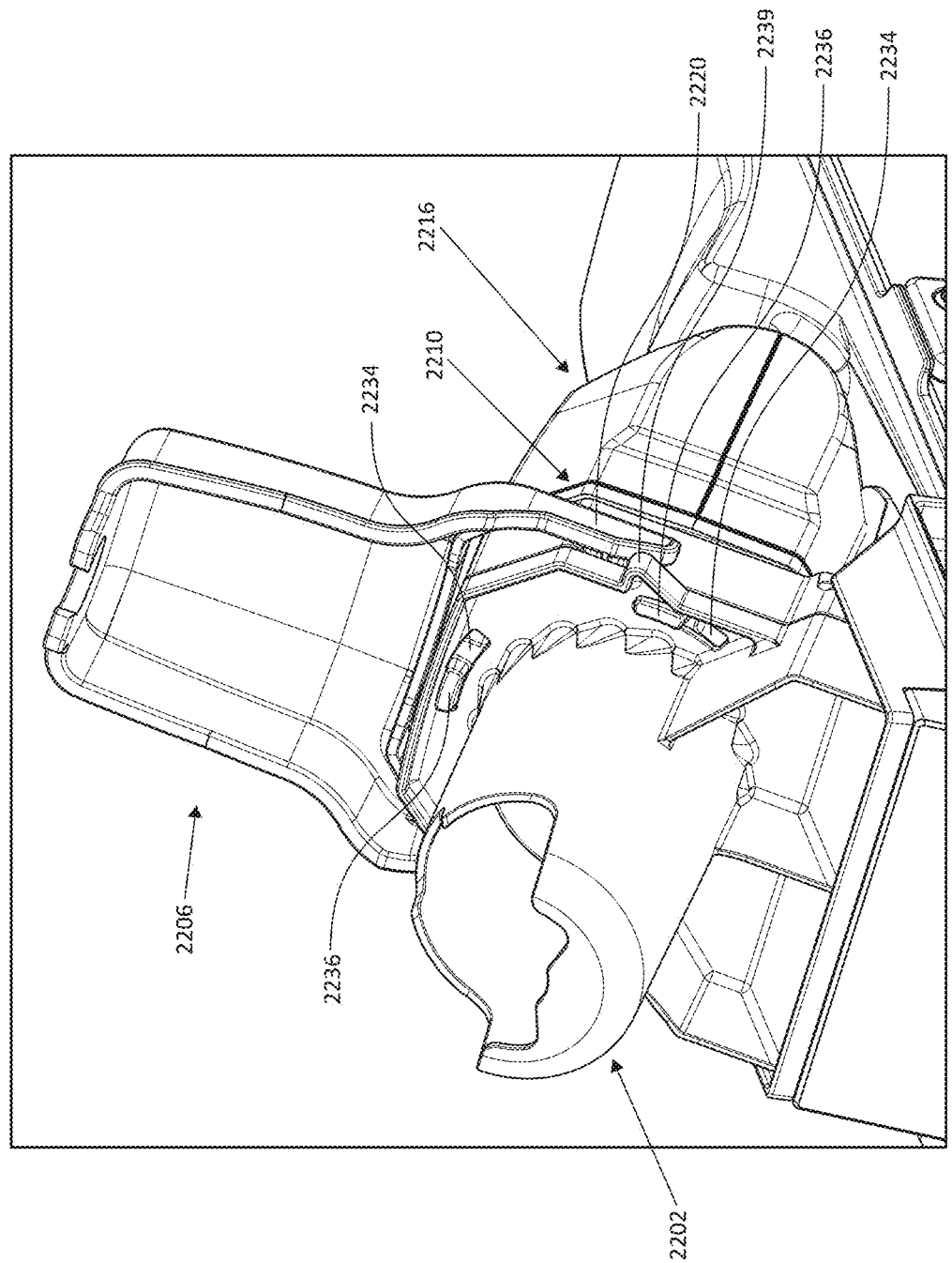
Figure 39B:
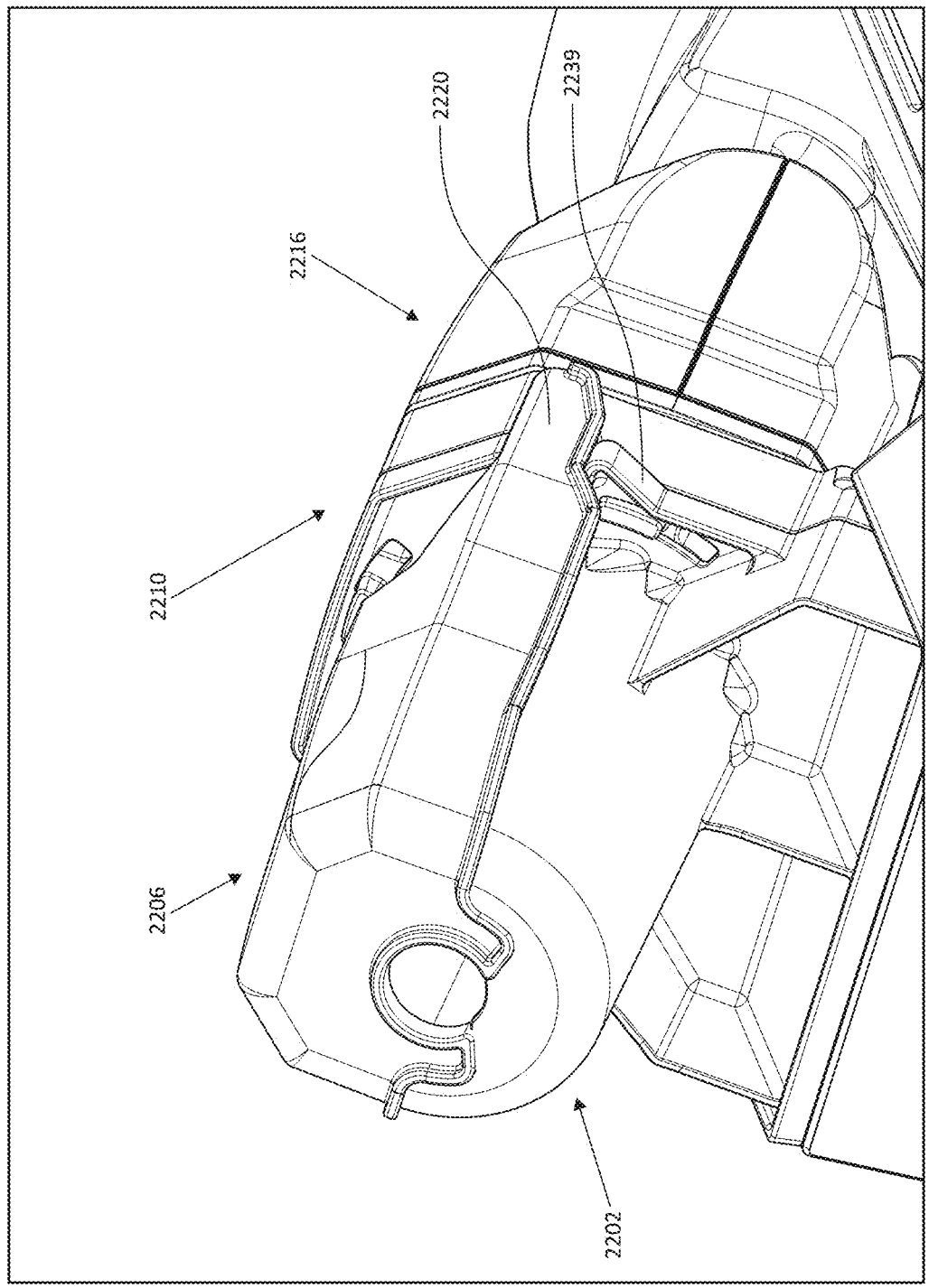

The hopper 2202 can be coupled to the grinder housing 2210 by inserting the receiving pockets 2236 of the grinder housing 2210 into the plurality of keyed holes 2234 of the hopper 2202, as shown in FIG. 38A. The hopper 2202 can then be rotated such that the tabs 2257 of the keyed holes 2234 are in the receiving region 2810 of the receiving pockets 2236, as shown in FIG. 38B. This places the retention surface 2812 over the tab 2257 such that a user cannot decouple the grinder housing 2210 and the hopper 2202 without first rotating the hopper 2202 to remove the tab 2257 from the receiving region 2810. As shown in FIG. 39A, the hopper 2202 is free to rotate to decouple from the grinder housing 2210. However, when the cover 2206 is closed, as shown in FIG. 39B, the ear 2239 of the hopper 2202 engages with the cover pivot joint 2220 of the cover 2206, thereby inhibiting or preventing rotation of (and removal of) the hopper 2202 relative to the grinder housing 2210.

Figures 40A, 40B:
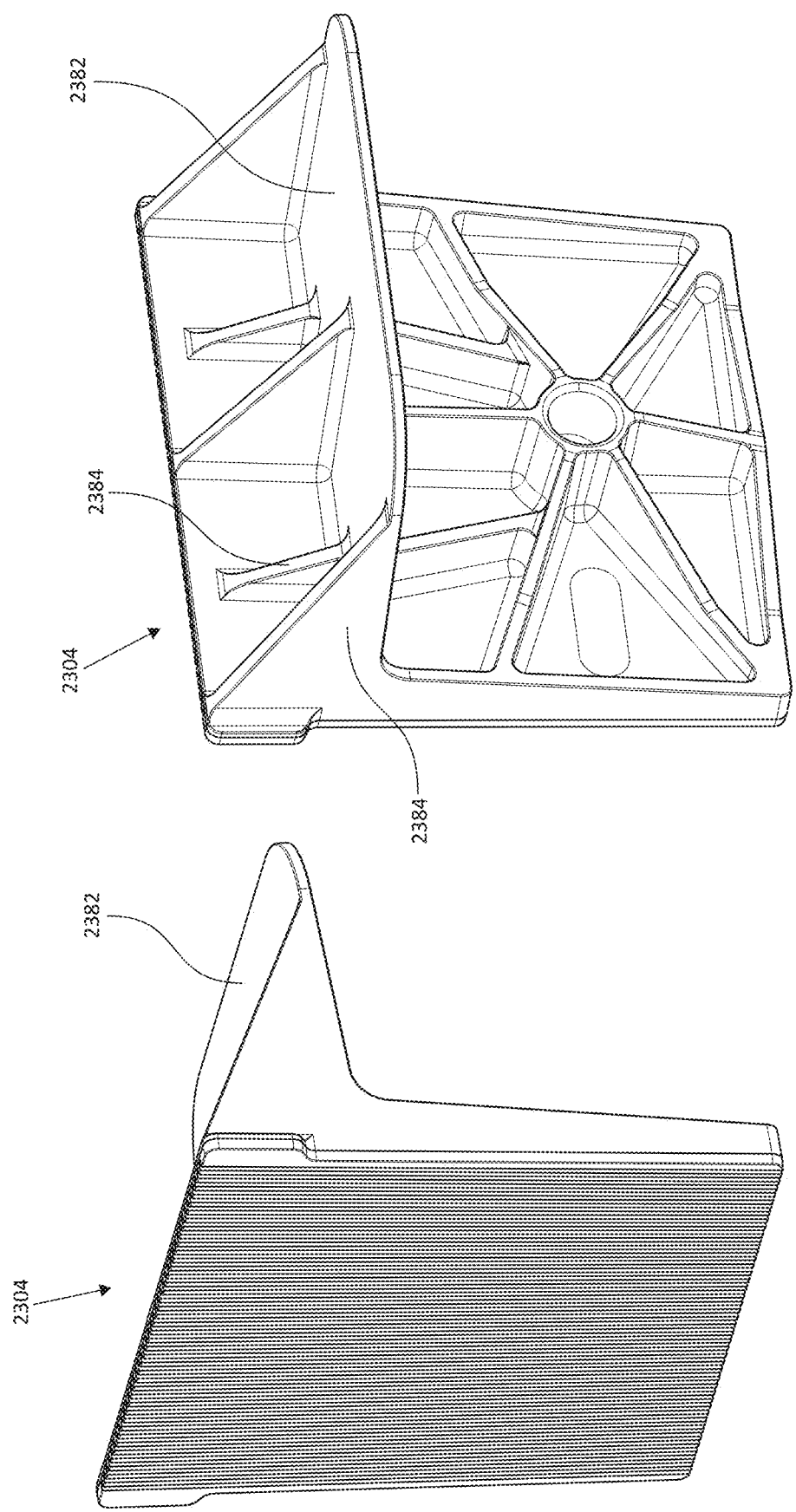
FIGS. 40A-40B illustrate various views of another example movable platen.
Figure 41:
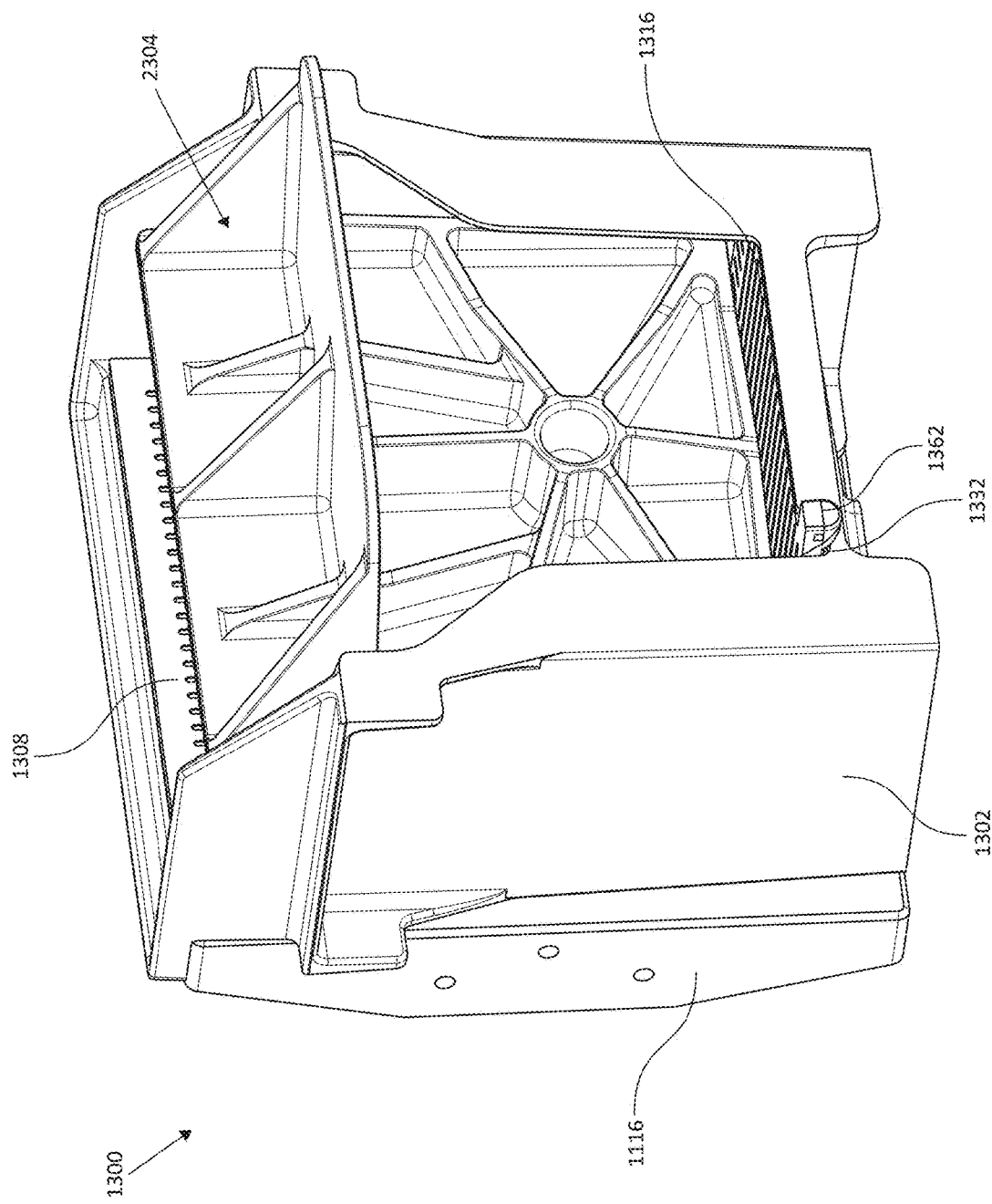
FIG. 41 illustrates the movable platen of FIGS. 40A-40B in the press box.

Another Movable Platen—FIGS. 40A, 40B, and 41

With reference to FIGS. 40A, 40B, and 41, another example of a moveable platen 2304 is illustrated. The moveable platen 2304 can include any of the features of the moveable platen 1304. For example, the features of moveable platen 2304 that are similarly numbered to the features of moveable platen 1304 can be the same or similar. Additionally, the moveable platen 2304 can be different from the moveable platen 1304 as described and illustrated herein. The moveable platen 2304 can be used in the juicing device 100. The movable platen can be received in the press box 1302. As illustrated in FIG. 41, the press box 1302 has a single notch 1332 that can receive a single tab 1362 of the bottom comb 1316, which can help to ensure that the bottom comb 1316 and/or front comb 1308 are correctly positioned in the press box 1302.

The moveable platen 2304 can have a panel (e.g., cover, drip shield 2382). The drip shield 2382 can have a plurality of supports 2384. The drip shield 2382 can catch food material flowing (e.g., dripping) from the grinder housing 2210 while the piston is moving the moveable platen 2304. This can advantageously collect dripping food material on a single easy to clean surface and/or inhibit food material (e.g., expressed juice) from dripping onto the piston.

Certain Terminology

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Terms of orientation used herein, such as "top," "bottom," "horizontal," "vertical," "longitudinal," "lateral," and "end" are used in the context of the illustrated embodiment. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular" or "cylindrical" or "semi-circular" or "semi-cylindrical" or any related or similar terms, are not required to conform strictly to the mathematical definitions of circles or cylinders or other structures, but can encompass structures that are reasonably close approximations.

The terms "approximately," "about," and "substantially" as used herein represent an amount close to the stated amount that still performs a desired function or achieves a desired result. For example, in some embodiments, as the context may permit, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may permit, the term "generally parallel" can refer to something that departs from exactly parallel by less than or equal to 20 degrees.

SUMMARY

Although the juicing devices, systems, and methods have been disclosed in the context of certain embodiments and examples, the scope of this disclosure extends beyond the specifically disclosed embodiments to other alternative embodiments and/or uses of the embodiments and certain modifications and equivalents thereof. Various features and aspects of the disclosed embodiments can be combined with or substituted for one another in order to form varying modes of the conveyor. The scope of this disclosure should not be limited by the particular disclosed embodiments described herein.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while operations may be depicted in the drawings or described in the specification in a particular order, such operations need not be performed in the particular order shown or in sequential order, and all operations need not be performed, to achieve the desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations. The described components and systems can generally be integrated together in a single product or packaged into multiple products. Additionally, other implementations are within the scope of this disclosure.

Some embodiments have been described in connection with the accompanying drawings. The figures are drawn to scale where appropriate, but such scale should not be interpreted as limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, any methods described herein may be practiced using any device suitable for performing the recited steps.

In summary, various embodiments and examples of juicing devices, systems, and methods have been disclosed. This disclosure expressly contemplates that various features and aspects of the disclosed embodiments can be combined with, or substituted for, one another. Accordingly, the scope of this disclosure should not be limited by the particular disclosed embodiments and examples described above, but should be determined only by a fair reading of the claims that follow.

The following is claimed:

1. A device for grinding and pressing food, comprising:
   a hopper having an inner cavity defined, at least in part, by an inner surface, wherein a plurality of fixed teeth are formed into the inner surface such that the plurality of fixed teeth circumferentially surround a portion of the inner cavity; and
   a grinder plate rotatable relative to the hopper, the grinder plate having a plurality of teeth, wherein a gap is present between the plurality of teeth of the grinder plate and the plurality of fixed teeth of the hopper;
   a motor unit configured to drive the grinder plate about an axis of rotation to grind food material received in the inner cavity of the hopper;
   a press box arranged to receive ground food material from the inner cavity of the hopper, the press box having a bottom wall and a front wall extending upward relative to the bottom wall; and
   a movable platen displaceable in a pressing direction toward the front wall of the press box to press ground food material between the movable platen and the front wall, wherein the movable platen includes a front face facing the front wall of the press box and a back face having a recess;
   wherein the movable platen has a drip shield extending from the back face in a direction opposite from the pressing direction, wherein the drip shield prevents food material from falling onto a piston arranged to engage the recess.

2. The device according to claim 1, further comprising a front comb disposed between the front wall of the press box and the movable platen and a bottom comb supported by the bottom wall of the press box, wherein the front comb and the bottom comb are coupled to one another by a hinge.

3. A device for pressing food, comprising:
a press box arranged to receive food material, the press box having a bottom wall and a front wall extending upward relative to the bottom wall;
a movable platen displaceable in a pressing direction toward the front wall of the press box to press food material between the movable platen and the front wall, the movable platen including a recess in a back face thereof;
wherein the movable platen has a drip shield extending from the back face in a direction opposite from the pressing direction; and
a piston having an end thereof received by the recess;
wherein the drip shield is arranged above the piston and prevents food material from falling onto the piston.

4. The device according to claim 3, further comprising a front comb disposed between the front wall of the press box and the movable platen and a bottom comb supported by the bottom wall of the press box, wherein the front comb and the bottom comb are coupled to one another by a hinge.

* * * * *